US010685054B2

(12) United States Patent
Crouse et al.

(10) Patent No.: US 10,685,054 B2
(45) Date of Patent: Jun. 16, 2020

(54) SYSTEM AND METHOD FOR MATHEMATICS ONTOLOGY EXTRACTION AND RESEARCH

(71) Applicant: ValueCorp Pacific, Inc., Westlake Village, CA (US)

(72) Inventors: Mark S. Crouse, Westlake Village, CA (US); Caroline McHolme Beam, Pleasant Hill, CA (US)

(73) Assignee: ValueCorp Pacific, Inc., Westlake Village, CA (US)

( * ) Notice: Subject to any disclaimer, the term of this patent is extended or adjusted under 35 U.S.C. 154(b) by 289 days.

(21) Appl. No.: 15/900,773

(22) Filed: Feb. 20, 2018

(65) Prior Publication Data

US 2018/0181653 A1   Jun. 28, 2018

Related U.S. Application Data

(63) Continuation of application No. 14/283,188, filed on May 20, 2014, now Pat. No. 9,898,531, which is a continuation of application No. 13/624,705, filed on Sep. 21, 2012, now Pat. No. 8,727,780.

(60) Provisional application No. 61/537,501, filed on Sep. 21, 2011.

(51) Int. Cl.
| | |
|---|---|
| G06F 16/00 | (2019.01) |
| G06F 16/36 | (2019.01) |
| G06F 16/93 | (2019.01) |
| G06F 16/25 | (2019.01) |
| G06F 16/31 | (2019.01) |

(52) U.S. Cl.
CPC ......... *G06F 16/367* (2019.01); *G06F 16/254* (2019.01); *G06F 16/316* (2019.01); *G06F 16/93* (2019.01)

(58) Field of Classification Search
CPC ...... G06F 16/367; G06F 16/93; G06F 16/316; G06F 16/254
USPC ........................................ 707/715
See application file for complete search history.

(56) References Cited

U.S. PATENT DOCUMENTS

| | | | | |
|---|---|---|---|---|
| 4,946,391 A  * | 8/1990 | Hawkins | ............ | G09B 5/04 |
| | | | | 273/237 |
| 9,799,041 B2 * | 10/2017 | Karty | ............ | G06N 3/126 |
| 2004/0161734 A1* | 8/2004 | Knutson | ............ | G06Q 30/02 |
| | | | | 434/335 |
| 2008/0295068 A1* | 11/2008 | Kendall | ............ | G06N 5/027 |
| | | | | 717/104 |

(Continued)

*Primary Examiner* — Hanh B Thai
(74) *Attorney, Agent, or Firm* — Richards Patent Law P.C.

(57) ABSTRACT

A method of extracting mathematical concepts from mathematical exercise representations includes the steps of accessing at least one document including a plurality of mathematical exercise representations, wherein each mathematical exercise representation comprises one or more algorithmic, linguistic, geometric, and graphic mathematical exercise representations; extracting each mathematical exercise representation to identify one or more mathematical concepts; identifying a relationship between a first mathematical concept and a second mathematical concept to identify a plurality of concept groups; populate an optimization table to associate at least one of the mathematical concepts and concept groups with one or more of the plurality of mathematical exercise representations; and optimize the optimization table to remove redundancies.

16 Claims, 31 Drawing Sheets

(56) References Cited

U.S. PATENT DOCUMENTS

| | | | | |
|---|---|---|---|---|
| 2009/0017427 A1* | 1/2009 | Kunz | ............... | G09B 7/00 |
| | | | | 434/188 |
| 2010/0332511 A1* | 12/2010 | Stockton | ............... | G06F 16/316 |
| | | | | 707/759 |
| 2011/0320454 A1* | 12/2011 | Hill | ............... | G06F 16/58 |
| | | | | 707/739 |
| 2013/0198117 A1* | 8/2013 | Upadhyaya | ............... | G06N 5/02 |
| | | | | 706/12 |
| 2013/0260359 A1* | 10/2013 | Park | ............... | G06Q 50/20 |
| | | | | 434/362 |

* cited by examiner

FIG. 2

| Prerequisites \ Dependencies | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1  | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2  | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 3  | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 |
| 4  | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 5  | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 |
| 6  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7  | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 8  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9  | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 1 | 0 | 0 | 0 | 0 | 0 | 0 |
| 19 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 |
| 21 | 0 | 0 | 0 | 0 | 0 | 0 | 0 | 0 | 0 | 0 | 0 | 0 | 0 | 0 | 1 | 0 | 0 | 0 | 0 | 1 | 0 | 0 | 0 | 0 | 0 |
| 22 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 24 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| Candidate Dependencies | | | |
|---|---|---|---|
| Identified Candidates: | | | |
| Sequence # ▽ | Phrase | Importance | Promote as Item |
| 1 | non-zero natural numbers | Must Know ▽ | ☑ |
| 2 | subset of the real numbers | ▽ | ☐ |
| 3 | fractional | Nice to Know ▽ | ☑ |

[OK] [Cancel]

*FIG. 14*

Parking Lot
[New Parking Lot] [Open] [Save] [Save As] [Down] [Up] [+] [-]
\ Lot One \ Lot Two \ Lot Three \ Lot Four \

⊟ 1.1 Addition
　⊟ 1.1.1 Subtraction

| Equation Table | | | | |
|---|---|---|---|---|
| Add | Remove | | | |
| Example Type | Textbook Problem | | Chapter Title | Sub-Section |
| Word Problem | "It is 5:45 A.M. daylight savings time the first Sunday in April. What time was it 6 hours and 45 minutes ago?" | | Time | 3.16 |

Add | Remove

Distillations (Concept Line Items)

Rationale and Comments:

OK | Cancel

FIG. 18

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 6 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 7 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 1 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 17 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

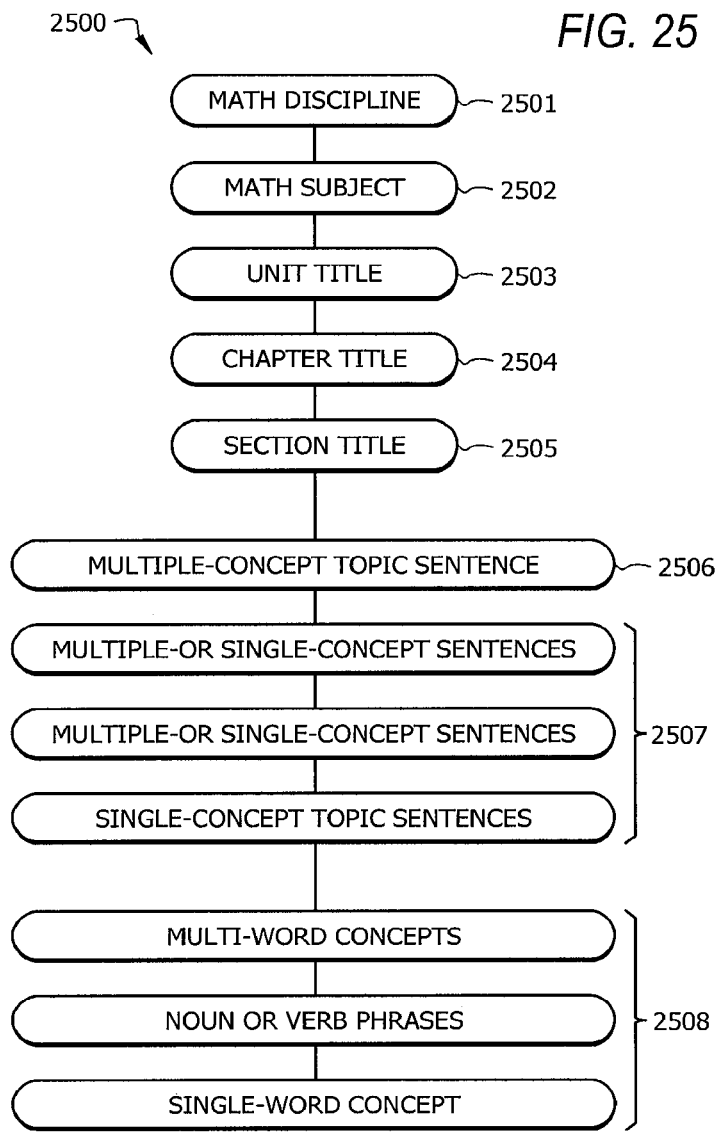

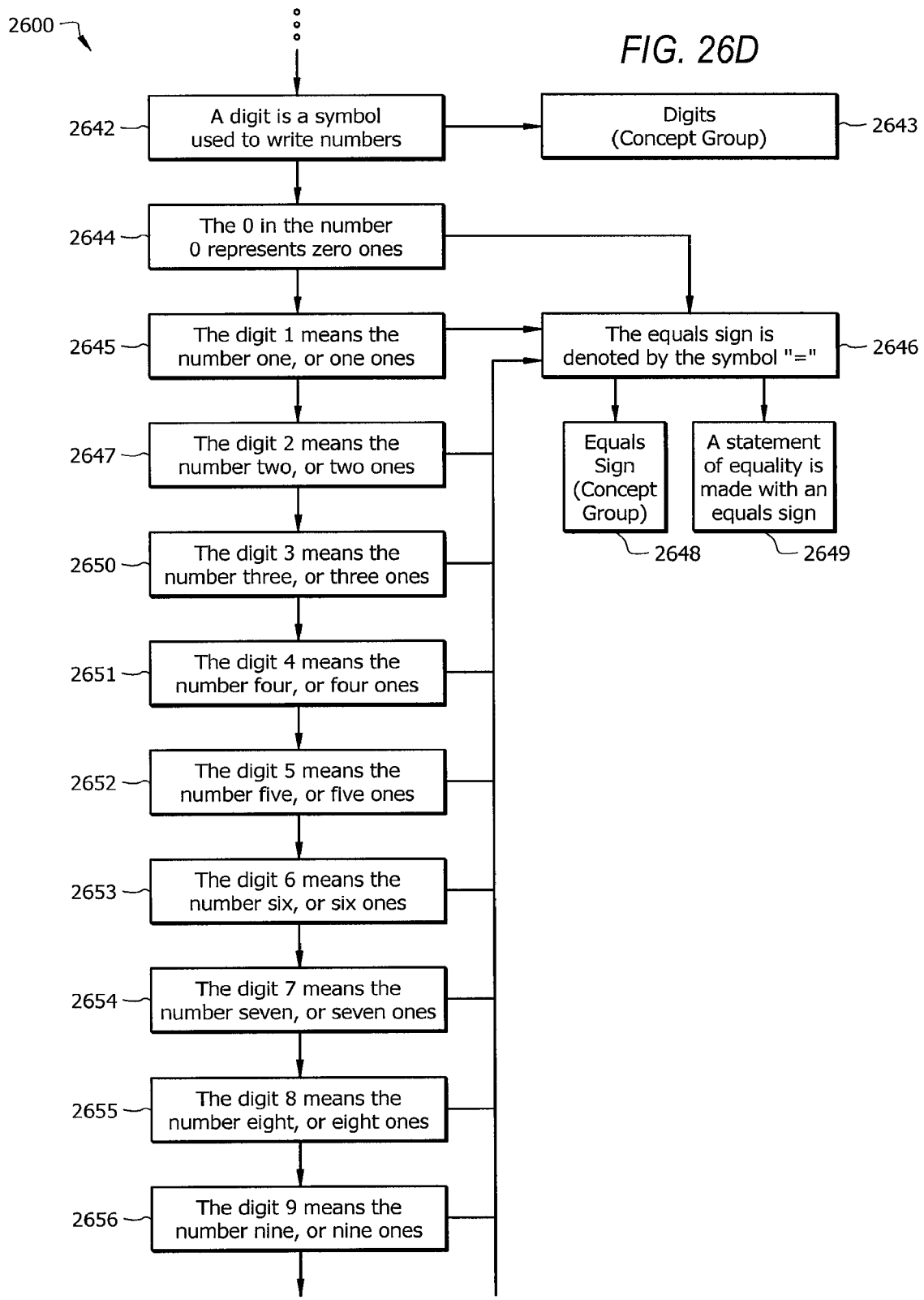

FIG. 27

Phase 1: Bibliographic Information and Basic Analysis

| Type of Exercise Problem | | Bibliographic Information | |
|---|---|---|---|
| (1) Expository | | Grade Level or Math Subject: | K |
| (2) Mixed Concept | 2 | Textbook Title | Early bird kindergarten Mathematics 2B |
| (3) Proof | | Example ID or Exercise Problem #: | n/a |
| (4) Application | | Chapter Number: | 14 |
| Degree of Complexity for This Age Group | | Page Number Where the Exercise is Found: | 63 |
| (5) Simple | | Is a calculator required? | No |
| (6) Moderately Simple | 6 | Is a special module required? | No |
| (7) Moderately Complex | | Country of Textbook (e.g., U.S., Singapore, Russia) | Singapore |
| (8) Complex | | Is this a Special-Purpose Exercise (S.P.E.)? | No |
| (9) Advanced | | Total Hours for Extraction | (-) |
| Type of Example, Proof, or Exercise Problem | | | |
| (10) Algorithmic Problem | | | |
| (11) Word Problem | 12 | | |
| (12) Graphic Generation/Graphic interpt'n Problem | | | |
| (13) Geometric Problem | | | |
| Concept Content | | | |
| (15) Discussed and explained in the textbook | | | |
| (16) Not discussed and explained in the textbook | 16 | | |
| (17) Advanced concepts or applications of concepts | | | |

Labels: 2701, 2702, 2703, 2704, 2705, 2706, 2707, 2708, 2709, 2710

Buttons: OK, Cancel

FIG. 28
Circle sets of 10.
Then count and write.
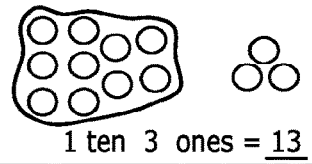
1 ten  3 ones = 13
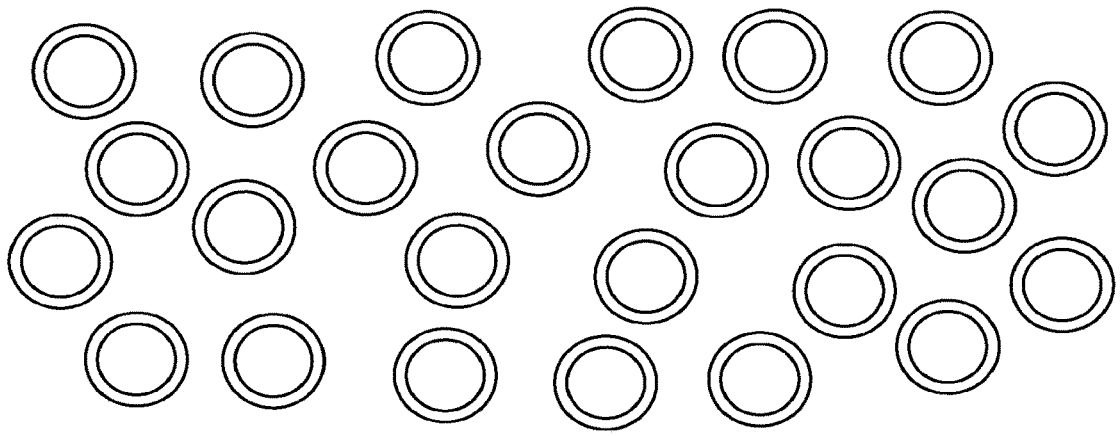
_____ tens _____ ones = _____
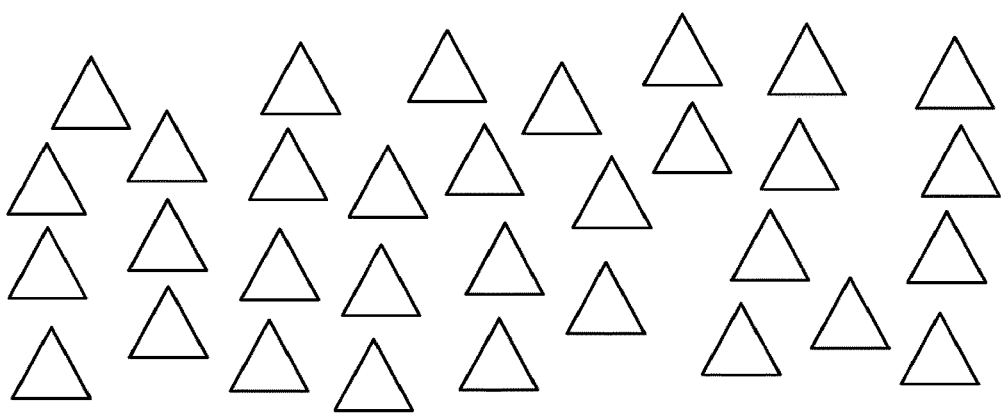
_____ tens _____ ones = _____

FIG. 31

|    |                       | 1 | 2 | 3 | 4 | 5 | How many times this item is covered by all of the problems [2] |
|----|-----------------------|---|---|---|---|---|---|
| 1  | Circles               | 0 | 0 | 1 | 1 | 0 | 2 |
| 2  | Line                  | 1 | 0 | 0 | 0 | 0 | 1 |
| 3  | Circumscription       | 0 | 1 | 0 | 0 | 0 | 1 |
| 4  | Adding integers       | 1 | 1 | 1 | 1 | 0 | 4 |
| 5  | Subtracting integers  | 1 | 0 | 0 | 0 | 0 | 1 |
| 6  | Semicircle            | 0 | 1 | 1 | 1 | 0 | 3 |
| 7  | Circumference         | 1 | 1 | 0 | 0 | 0 | 2 |
| 8  | Radius                | 1 | 0 | 1 | 1 | 0 | 3 |
| 9  | Greek letter pi       | 0 | 0 | 0 | 0 | 1 | 1 |
| 10 | Line segment          | 0 | 0 | 0 | 0 | 1 | 1 |
|    | How many items are in this problem [3] |   |   |   |   |   |   |

SYSTEM AND METHOD FOR MATHEMATICS ONTOLOGY EXTRACTION AND RESEARCH

RELATED APPLICATION

This application comprises a continuation of U.S. patent application Ser. No. 14/283,188 filed May 20, 2014, which is a continuation of U.S. patent application Ser. No. 13/624,705, filed Sep. 21, 2012, which claims the benefit of priority to U.S. Provisional Application Ser. No. 61/537,501, filed Sep. 21, 2011, the contents of each of which are incorporated by reference herein in their entirety.

FIELD OF THE INVENTION

This disclosure describes plans and specifications for an extensive computer based online math research system (the "Research System"). Development of the foundation of the Research System, an Ontology (term defined below) of mathematics, calls for unique and intensive computer support, coordination, data structuring, data storage, computer processing, retrieval capabilities, and data-mining capabilities, and so we have developed the plans and specifications for an Ontology editing system that runs on computer software with computer processors and data storage capabilities (the "Ontology Editor System") as the first step in construction of the Research System. The Research System also includes a methodology to enable online reference and data manipulation of the Ontology, and an Internet based search engine of the concepts of mathematics and applications of mathematics to the sciences on the basis of the Ontology, the Web addresses and locations of which can be automatically appended to the database of the Ontology on servers.

SUMMARY

The Ontology Editor System, run on computer software and incorporating a computer processor and extensive database storage and manipulation capabilities described in this application, enables teams of math analysts to perform extractions of mathematical concepts from math exercise problems in a process that can be detailed, intensely rigorous, and that involves much work and coordination among math analysts. Hence, the necessity of a computerized system. Our experimentations with the extraction process to build a detailed Ontology of mathematics have demonstrated that to manually perform such work, even with spreadsheet and database software programs, can be extremely time- and cost-prohibitive. Human coordination of the development process across multiple analysts such that significant inherent redundancies can be controlled may be difficult, even with electronic communications capabilities, and adds to the cost.

For example, the extraction presented in this patent application is of a math exercise problem from a Kindergarten math textbook. That extraction involved over 3,800 lines for three solution strategies. From that collection of lines, came 549 usable concept line items (term defined below; a concept line item can also be referred to as a CLI). In this example, fourteen percent of what was created may be included in the Ontology. The rest of the lines can be redundancies that help to identify the unique gems of mathematics, meaning the unique insights, nuances, and procedures that can be so often absent from discussions of mathematics at any grade level or math subject. Multiply those figures by the number of extractors at work, and teams of extractors (teams support and coordination can be different from individual support and coordination), and the problem of coordination and the importance of controlling redundancies grows exponentially.

Our research into market opportunities for an online research facility dedicated to math education, and development of the specifications for such a system, reflects the input of math teachers, mathematicians, scientists, and education researchers. The collection of education research tools currently available in the market does not support fluid, broad-based, and creative exploration of the concepts of math. For example, teachers want to understand those concepts of mathematics that prove to be significant obstacles to student and class progress. Further, typical classroom materials such as textbooks and supplementary publications abbreviate discussions of concepts, and leave discovery of insights and nuance to the students as they work on exercise problems. One result of these circumstances can be that students who believe themselves not to be cut out for math may in fact possess a natural talent for math (providing they are attentive to their course studies) simply because their intuition may be saying that they cannot get from concept A to concept G because so many intermediate concepts are absent from discussions and explanations.

From extraction of a single problem written for Kindergarten, an analyst distilled 549 unique concept line items. In experimentations with problems of trigonometry, the typical extraction produced some 3,000 concept line items. To manually array the CLI data from the Kindergarten problem into a directed graph (a directed graph comprised of a subset of the 549 CLIs appears in FIGS. 26A to 26E of this application), and to create a node-arc incidence matrix to store those data relationships, squares the number of cells to be filled with data. Storage of concept line items extracted from the Kindergarten problem calls for a node-arc incidence matrix with $549.\text{sup}.2=301,401$ cells. By the time a student reaches Algebra 1, we estimate that support of his math skill set can require 20,000 or more concept line items; $20,000^2=400,000,000$. That is 400 million cells in a node-arc incidence matrix populated with data that store some numeric description of an attribute of the relationship between pairs of concept line items. Clearly, a computer system comprising a processor and extensive database storage and analysis capabilities is essential to accomplishing the goals of the present disclosure.

Types of relationships among concept line items addressed by this patent application include prerequisites and dependencies (arrayed as nodes in a directed graph), levels in an architecture of the Ontology (arrayed as an undirected graph), distance relationships among nodes (stored in a distance matrix), and weights assigned to relationships among those nodes (stored in an edge weight matrix). Without a system designed to store such a large volume of data and dedicated to its support, management, and the operations (queries, database manipulations, etc.) performed on it, it would be a laborious and extremely time-consuming task to manually search a database such as the Ontology for Pre-Kindergarten through Post-Calculus 1 Statistics to find and perform various manipulations of the data.

The online Research System, run on computer software and incorporating a computer processor and extensive database storage and manipulation capabilities, described in this patent application can be designed to support user queries and database manipulations. It can also be designed to include a Web crawler that can search the Internet to locate the content of web pages and documents and tag them with identifiers of concept line items (an identifier of a concept line item can be defined in this application as a Math & Science Concept Identification Code, or MSCIC). With the online Research System, users can search for finely granular concepts of mathematics and determine where, on the Internet, content about such concepts appears. Servers that host the Research System's database can store substantially more data than just the Ontology in its various forms. Tine MSCICs associated with web content about mathematics and applications of mathematics to the sciences can regularly expand and contract the data stored on servers. Multiple matrices to configure and store such volumes of data about a variety of attributes and variables of concepts of mathematics and their interrelationships, to enable queries and other operations on that data, and to repeatedly maintain such a data set, including continuous extensions of the matrices to include new data and truncations of data from the data set (e.g., to remove data duplications or links to web pages no longer on the Internet), presents an insurmountable problem if left to manual performance by humans without the aid of computer software and processors, and any efforts to perform such tasks would be cost-prohibitive.

As described and discussed in this patent application, the Ontology Editor System run on computer software and with computer processors, data storage and data transformation capabilities, and the Research System run on computer software and with computer processors, data storage and data transformation capabilities, make construction, storage, management, and operations on a large and finely granular Ontology of mathematics both technologically feasible and economically feasible.

A technological response to these problems would make available to teachers, students, parents, and researchers a significant corpus of course data, in particular a compendium of finely granular concepts of mathematics for grade levels and math subjects from Pre-Kindergarten through Twelfth Grade. Such a system would also open opportunities for further research, exploration, and development.

To develop such a system to support research in mathematics curricula calls for creation of an extensive Ontology of the concepts of mathematics (the "Ontology"). Currently, a collection of such finely granular math concepts (math concepts can be considered to be ideas of mathematics; in the Ontology Editor System and the Research System, math concepts can be expressed as concept line items) that extends from Pre-Kindergarten through Twelfth Grade (for example PostCalculus 1 Statistics) does not exist. Of course, the Ontology could comprise a collection of any subject, including school related subjects (e.g. grammar, English classes, Spanish classes, history) or non-school related subjects (e.g., Ontologies for hobbies, exercises, business information, etc.). However, for the purposes of simplicity, this application uses the example of an Ontology of the concepts of mathematics to aid in the understanding of the concepts disclosed herein.

In research to determine how to develop a comprehensive collection of math concepts expressed at a fine degree of granularity, we have discovered that there currently exists no well integrated and canonical series of math textbooks that spans the full curriculum of mathematics from Pre-Kindergarten through Twelfth Grade ("PK-12"). Further, we have discovered that manual searches of textbooks, and even text-mining algorithms applied to textbook materials, is not as effective as desired because discussions, explanations, and examples can be typically abbreviated in their scope, depth, and application. As mentioned above, most textbooks leave students to discover, by way of worked examples and exercises, the insights and nuances that motivate and facilitate concepts of mathematics. The consequence of these circumstances in math education is that most textbooks and other materials that service the mathematics curricula in the United States and other countries exhibit five kinds of information gaps that we have come to refer to as y-intersections, speed bumps, potholes, gaps, and chasms (collectively referred to as "Gaps").

Gaps can be interruptions to the contiguous flow of math concepts presented in a textbook or course, often characterized by one or more skipped steps concepts, or insights that may not be specifically stated or clearly explained. In order of least to most severe, y-intersections can be characterized by descriptions or explanations that may be interpreted in more than one way, any one of which may or may not be correct. Speed bumps can be characterized by descriptions or explanations that may be poorly written. Potholes can be moderate interruptions to the flow of math concepts characterized by a lack of information or by unclear or misleading descriptions. Gaps—the more specific explanation—can be characterized by one or more skipped steps, concepts, or insights that may not be specifically stated or clearly explained. Chasms can represent the most severe breaks in the otherwise contiguous flow of math concepts presented in a textbook or course as they can be characterized by the absence of the complement of concepts that comprise one or more topics.

Given that the bulk of mathematics knowledge in most countries can be encapsulated in examples and exercise problems, we have determined that original extraction of math concepts from examples and exercise problems—e.g., algorithmic, linguistic (word problems), geometric, and graphic (problems that motivate interpretation or generation of graphs)—can be an effective method to build the Ontology. We therefore developed a unique, stepwise, and proprietary procedure to systematically derive from math problems finely granular concepts of mathematics. We call that procedure extraction—a detailed and intensely rigorous process that involves much work and coordination among math analysts—and the concepts of mathematics derived from extraction can be the data that populate the Ontology. The degree of rigor and the level of coordination involved in the extraction process motivate our design and development of its Ontology Editor System.

This patent application details the Ontology Editor System, a back office system that has been specially designed to build the Ontology for the Research System, and, on the basis of the Ontology, build the data structures that can be the foundation of the Research System's performance and capabilities. This extensive library—the Ontology—can be static or dynamic. In a dynamic library, the data structures may be dynamically changed over time to add data, take away data, and reorganize the data. Further, the library could be a hybrid library wherein at least one portion of the library may be static while at least another portion of the library is dynamic. Using this extensive library of mathematical concepts, the Ontology Editor System can apply unique search, data-mining and text-mining algorithms and a graphic user interface to provide the public with a Research System of substantial and unique capability. Mathematics analysts can work with the Ontology Editor System to develop upgrades to the Ontology and upload successive releases to the Research System.

This patent application also details the Research System, a user-facing online system that renders the Ontology searchable by several query methods, extensible by automated online searches integrated with the Ontology Editor and its processes, and interoperable with many forms of multi-media content.

BRIEF DESCRIPTION OF THE FIGURES

The above and related features and advantages of the present disclosure can be more fully understood by reference to the following figures and the detailed description of the preferred embodiment below.

FIG. 2 is an exemplary segment of a node-arc incidence matrix depicting prerequisites and dependencies among exemplary concept line items.

Figure 6:
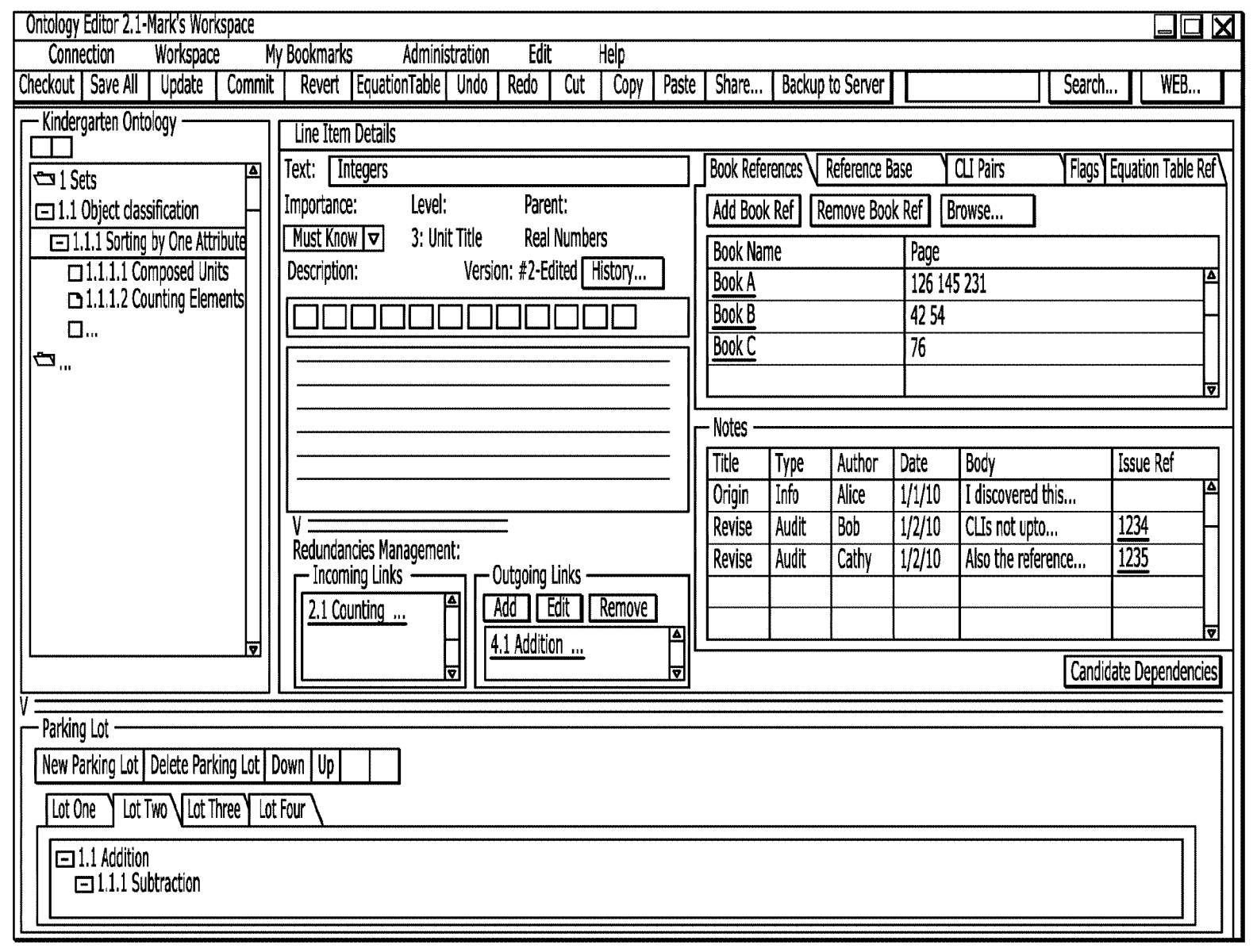

FIG. 6 is an exemplary screen shot of an extraction workspace of the Ontology Editor System.

FIG. 9 is an exemplary screen shot of the Ontology Editor System interface to present the historical development of concept line items.

FIG. 10 is a second exemplary screen shot of the Ontology Editor System interface to present the historical development of concept line items.

FIG. 14 is an exemplary screen shot of a candidate dependencies component of the Ontology Editor System's graphic user interface.

FIG. 15 is an exemplary screen shot of a parking lot component of the Ontology Editor System's graphic user interface.

FIG. 16 is an exemplary screen shot of an equation table window of the Ontology Editor System's graphic user interface.

FIG. 18 is an exemplary segment (larger) of a node-arc incidence matrix depicting prerequisites and dependencies among exemplary concept line items.

FIG. 25 is a schematic depiction of a model of the Ontology architecture.

FIGS. 26A through 26E depict an exemplary directed graph displaying inter-concept line item relationships of prerequisites and dependencies from a sample Kindergarten math problem.

FIG. 27 is an exemplary screen shot of the initial data entry for an exercise problem under extraction from the Ontology Editor System.

FIG. 28 is an exemplary Kindergarten math problem extracted in examples in this application.

FIG. 31 is an exemplary optimization table that depicts data optimized against numbered exercise problems.

DETAILED DESCRIPTION OF THE DISCLOSURE

Figure 1:
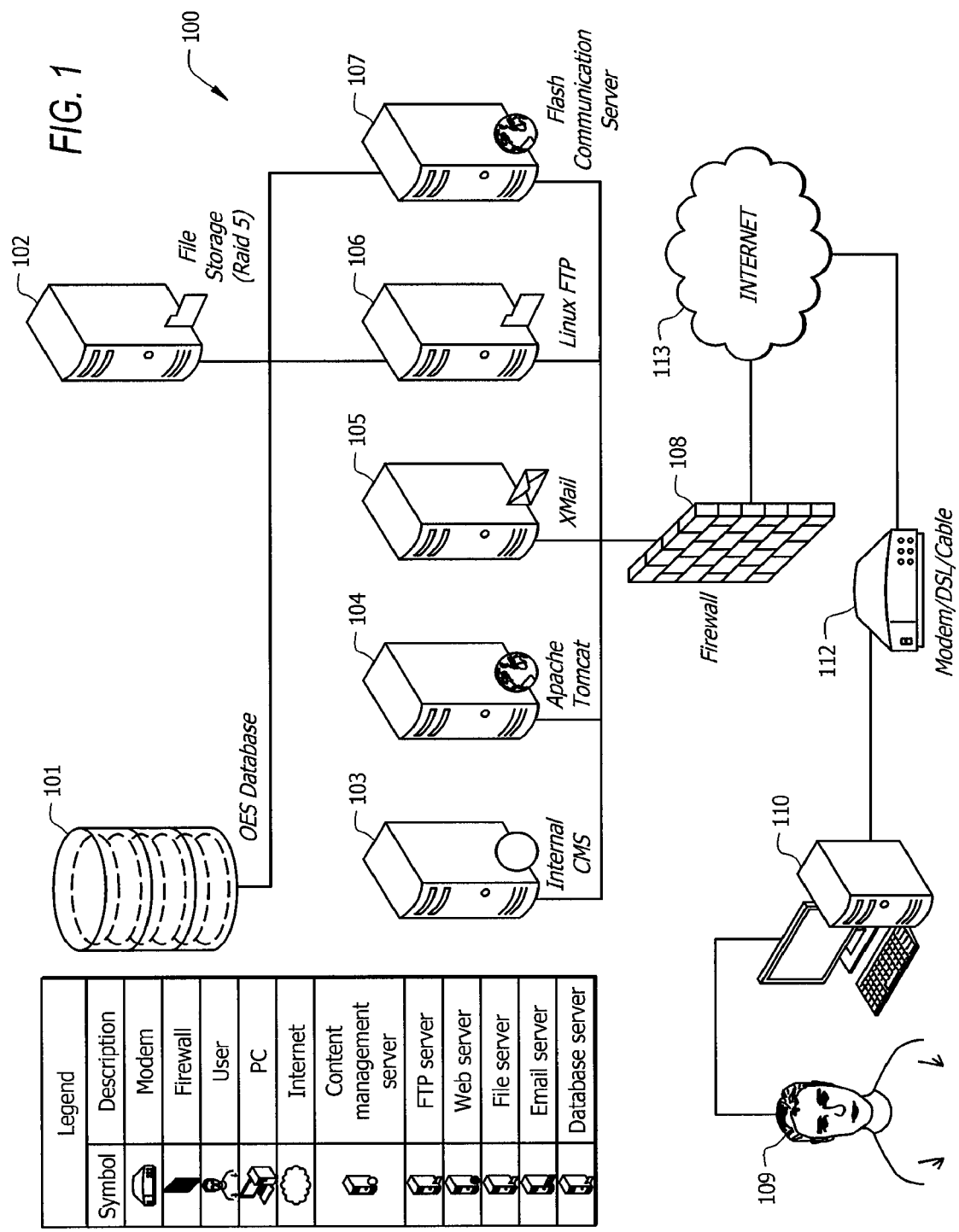
FIG. 1 is a depiction of a tiered architecture for the Ontology Editor System and Research System as connected to the Internet.

The Ontology Editor System: Technology, Methodologies, Data Structure, and Features In our search for off-the-shelf ontology editing software, we did not find a software package sufficient to house, manage, and mine a data set commensurate with the anticipated size of the Ontology. Development of the Ontology Editor System, therefore, became one of the steps in construction of the Research System. The Ontology Editor System can be a throughput, end-to-end, online Ontology development and networking system that manages one or more databases and network development processes. Since the Ontology can be upgradable, the Ontology Editor System can help maintain and manage expansions of the Research System.

The Ontology of mathematical concepts, the network of interrelationships between those concepts (expressed in the form of concept line items, phrase explained below), and the data structure that stores that network, formulate the foundation of the Research System. The Ontology can comprise one or more large databases 101, which can be centrally located or dispersed throughout the world, and its data structure can ensure a rapidly responsive and stable architecture for research, extraction, edits, and analysis of the evolving product. Further, to support this effort and to target certain inefficiencies inherent in some extraction processes, we have adapted the principles of Agile/Serum software development to the extraction procedures. (Agile can be an empirical approach to software development, as distinguished from a predictive approach referred to as "Waterfall." Serum can be widely-held by many industries as the principle management method and process that enables Agile for software development and, more recently, for project management as well). A concept line item (or "CLI") can be a single idea of mathematics expressed as a simple sentence. CLIs may address the integration of several concepts. As one example, a CLI (item 2630 of FIG. 26C) that reads, "A counting number can be both the order of an object in an enumeration of a set (ordinality numbers), and the size of the set (cardinality)," integrates (at the highest level and without extraction of any more granular concepts) counting numbers, the order of counting (ordinal numbers), sets, and the size of sets (cardinality) to crystallize the idea that a number can describe both the order of an object in a set and the set cardinality. Concept line items can be written to stand on their own out of the context of the exercise problem under extraction, out of the context of adjacent line items, and out of the context of even the math subject.

Coordination of a team of analysts (for example mathematics analysts) to efficiently develop an Ontology of math concepts for multiple years of international curriculum of mathematics—where national grade levels can be adjusted to match the curricula taught, and where concepts, insights, and nuances can be expressed at the finest level of concept granularity—suggests that significant information technology ("IT") support can be an important component of project success. Hence, specifications for the Ontology Editor System and the Research System's database—the Ontology, its network, and the data structures that encapsulate that network—can be unique and call for a customized back office system and process of data set construction.

The Ontology Editor System can (among other things):
Organize, administer, and control an Agile/Serum extraction workflow, from compilation of an exercise collection, to upload of Ontology components to the Research System, with interfaces and support for roles on an Agile/Serum team and coordination across multiple teams;
Support extraction of math concepts from exercise problems;
Automate optimization of redundancies;
Support organization of concepts by prerequisites and dependencies;
Automate conversion of directed and undirected graphs into matrices such as, by way of non-limited example, a node-arc incidence matrix (please see FIG. 2 for an example of node-arc incidence matrix), and related matrices, to store the network of interrelationships between concept line items (as represented in the graphic representations);
Upload accepted CLIs and networks thereof to the Research System; and
Support continuous upgrades and releases of the Ontology year-over-year.

Attributes of the Ontology, V.1.0

By way of non-limiting example, below is a sample embodiment of some of the attributes for a release of the Ontology of concepts of mathematics. Items listed below can be done dynamically, statically, and/or any combination thereof 1. The Ontology can cover multiple grade levels and math subjects in a plurality of countries (for example, the United States, Singapore, Japan, Russia, and India) from the beginning of Pre-Kindergarten through the end of Twelfth Grade (as adjusted for age and grade differences).

2. The concept line items and n-grams (noun and/or verb phrases of n number of words) that comprise the Ontology can populate multiple levels (for example twelve levels) of the Ontology architecture from the broadest definitions of mathematics to a fine degree of concept granularity and be linked by level in an undirected graph. The Ontology architecture can be an organizational construct for concept line items. We have developed a plurality of models of the Ontology architecture, for example a version with ten levels and a version with twelve levels. Both versions begin at the highest level of mathematical classification—subject matter such as arithmetic, algebra, geometry, statistics, etc.—and parse mathematical knowledge into progressively more succinct expressions until the tenth or twelfth level, where concepts can be expressed in 1-, 2-, or 3-word noun and verb phrases. The middle of both models of the architecture can be where multiple- and single-concept line items appear (see item 2507 of FIG. 25). The lower region of the Ontology architecture can be where concepts parse into their component multiple and single word phrases (see items 2508 of FIG. 25).

3. Concept line items of the Ontology can be ordered by prerequisites and dependencies (a separate organization from the Ontology architecture) and networked in a directed graph 2600 such that the uplines (e.g. branches) and downlines (e.g. roots) of any math concept may be identified, called out, and depicted in graphs and tables by the Ontology Editor System and Research System. See FIGS. 26A through 26E.

4. Concept line items can be assigned unique Math & Science Concept Identification Codes (or "MSCICs", unique system identification codes assigned to concept line items and objects of math or science content stored in the Ontology).

5. The educational content of MSCICs can be written in the form of Learning Outcome Statements (or "LOSs"). An LOS can be a standard of learning and performance with concepts that have been written to compliment a concept line item.

6. Matched pairs of MSCICs and LOSs can be mapped to core math education standards, for covered grade levels and subjects, for the selected country and/or countries.

7. MSCICs can be assigned a weight for the dependencies that it supports.

8. MSCICs can be assigned an importance score, (for example an importance score for use in hierarchical organization). An importance score can be a metric automatically calculated for a CLI by the Ontology Editor System. It can be equal to the sum of the number of nodes in the network of concepts (e.g., the node-arc incidence matrix as expressed in a directed graph) that point to a math concept, and the number of nodes in the network that can be pointed to by the same node (e.g., the number of connections that point to and that point away from a node in the network of the Ontology).

9. MSCICs can be classified into one or more classes (e.g. a nice-to-know class, an important-to-know class, etc.). Furthermore, the MSCICs can be further classified into subclasses. By way of non-limiting example, an important-to-know concept can be an expository statement about any aspect of mathematical knowledge that can be of significant import to a fully developed and fully functional math skill set. The litmus test for a concept as an important-to-know candidate can be to ask whether a student's math skill set would be complete if he did not fully comprehend that concept. Some examples of important-to-know math concepts (under their respective math disciplines) can be the Multiplicative Identity Property of One, .pi., the five basic axioms of geometry, how to factor a polynomial, integrals, and logarithms. A nice-to-know concept encapsulates math knowledge that may not be critical to development of a fully functional math skill set. An example of a nice-to-know concept of mathematics, as pertains to the Multiplicative Identity Property of One, is the Latin root word for "identity"—"idem"—meaning "the same as." Nice-to-know math concepts sometimes establish a context for information that can be otherwise classified as important-to-know.

Special Considerations: Role of the Ontology Editor System in Management of Production Inefficiencies The extraction process exposes individual math analysts, and more so extraction teams, to development of redundant concept line items. Experience of mathematicians who have extracted CLIs from math problems shows that duplicate CLIs, overlap of production where two or more analysts extract the same or very similar CLIs from different math problems, and other sources of inefficiency easily creep into the extraction process. This of course slows the process and raises issues of management and coordination particularly among multiple analysts and multiple teams of analysts. Further complications also arise:

duplicate CLIs can be expressed in slightly different terms, such redundancies arise at different times and different stages in the extraction process, the extraction process does not proceed at an equal pace for different math problems and different math analysts, and concepts of mathematics that can be deemed especially important to express as concept line items can often not be discovered until well into the extraction process of one problem, but can be found to be applicable and enabling of extractions of other problems.

The Ontology Editor System, run on computer software with a computer processor, databases, and database manipulations, manages sources of human inefficiency to minimize their impact on production and thereby accelerate the math concept extraction process.

To improve efficiency, accelerate production, and deliver an Ontology of mathematics without gaps in any contiguous line of CLIs, we have adapted Agile/Serum management principles of software development to the math concept extraction process, and designed the Ontology Editor System to support the various roles, functions, and artifacts of a Serum team and coordinate their interactions. The systems and methods also have developed specific extraction techniques—such as dovetailing concept line items, mathematical meaning (or "MM"), reverse-engineering concepts, assessing anticipating errors, anticipating questions, composing leading questions, developing alternate solutions strategies and alternate approaches to those strategies, anticipating common and inventive applications of concepts, and holding written conversations (even imaginary conversations) about concepts with other mathematicians and extractors—to uncover embedded concepts, tease out insight and nuance, and close Gaps. From these techniques come the detailed, insightful, and carefully thought out content to write entire series of independent concept line items.

One example of an extraction technique can be dovetailing concept line items. Dovetailing can be a technique to eliminate y-intersections, potholes, speed bumps, gaps, and chasms from the Ontology. The technique can be characterized by a succession of concept line items that lead from one concept group to another (a concept group can be a noun phrase or verb phrase that succinctly articulates a concept of mathematics), and that can be written such that the end of one CLI can be the beginning of the next CLI. Dovetailed concept line items can be assembled to describe a series of math concepts that build on one another in logical progression. A succession of such CLIs can involve a plurality of branches in logical progression that proceed in different directions. An example of a model for dovetailed concept line items is: Antecedent . . . [transformation leads to] . . . consequence. For example, "An angle (antecedent) . . . is the configuration of (transformation leads to) . . . two lines that meet at a point." (The Penguin Dictionary of Mathematics, Second Edition, page 11.) One possible example of a succession of logically dovetailed CLIs that explores the definition of angles and that leads to an application of angles as representations of rotation of one or both rays about a common endpoint, and the common terminology associated with that idea, appears below.

a. An angle is the configuration of two lines that meet at a point.

b. Two lines that meet at a point form an angle.

c. An angle also represents rotation of one or both sides about a common endpoint.

d. The common endpoint of two lines is called the vertex.

e. A vertex may represent the center of rotation of the two lines.

f. Rotation of two lines may be represented by an angle.

g. Angles are always contained within a single plane.

h. A single plane will contain the rotation represented by a single angle.

i. (Rotation represented by) a single angle indicates movement of a ray from its original position.

j. The original position of a ray before any rotation about its endpoint is called the initial side of an angle.

k. The initial side of an angle is paired with a terminal side.

l. The terminal side of an angle indicates the position of a ray or half-line when it ends its rotation.

The combined capabilities of the node-arc incidence matrix and the Ontology enable the Ontology Editor System to identify and assist analysts in the construction of dovetailed CLIs. The quality of dovetailed CLIs can be assessed by their granularity, e.g., how well detailed concepts of mathematics have been crafted in an extraction. By way of non-limiting example, two attributes of granularity can apply: continuity and contour. Continuity can describe the presence or absence of important information in some order. The term references whether any y-intersections, potholes, speed bumps, gaps, or chasms appear in the conceptual succession an analyst writes. For example, it can be helpful for an analyst to define successor functions (as per G. Peano), before he introduces a concept like addition (or subtraction). Continuity can be the content included in a succession of concept line items. Contour refers to the way that the concept line items describe and explain the content, and how smoothly one concept line item progresses to the next. Smooth and unbroken contour across a succession of concept line items can be the product of the dovetailing technique.

The Ontology Editor System assists analysts in the construction of dovetailed. CLIs with automatically computed metrics that assess the attributes of granularity of a series of CLIs. The Ontology Editor System's text-mining algorithms apply keyword, noun phrase, verb phrase, and proximity assessment methods, and computed fit parameters, to prompt analyst thought and reflection as to whether any series of concept line items he develops may include Gaps or may not be dovetailed (if he wishes the CLIs to be dovetailed, as the extraction technique can be optional in the extraction process). It can also help the analyst to visually represent his series of concept line items in a graphic display and thereby more easily assess the continuity and contour of his logical succession.

To construct the graphic representation of a series or CLIs, with or without branched paths in the logical progression of math concepts, the Ontology Editor System determines whether the end of one concept line item matches the beginning of the next concept line item or another concept line item located within a certain proximity in the succession of CLIs. To identify dovetailed pairs of CLIs, the Ontology Editor System automatically creates, for example, an inverted index of the noun and verb phrases within a measured proximity of the beginning and the end of concept line items (a full inverted index can be applied to this same technique). One example of how an inverted index can be constructed by the Ontology Editor System can be a matrix that lists along one side the number of the concept line item in succession. The example in the table below enumerates the concept line items (in a zero-based numbering scheme) that appear in a. through l. above. The analyst-user enters search parameters, for example the number of words in the phrases to be searched, and the proximity of those phrases from the beginning of the concept line item or the end of the concept line item.

| Example Beginning Phrase | Example Ending Phrase |
| --- | --- |
| $P_0$ — | "two lines that meet at a point" |
| $P_1$ "two lines that meet at a point" | "meet at a point form an angle" |
| $P_2$ "an angle also represents rotation of one" | "or both sides about a common endpoint" |
| $P_3$ "the common endpoint of two lines is" | "of two lines is called the vertex" |
| $P_4$ "a vertex may represent the center of" | "center of rotation of the two lines" |
| $P_5$ "rotation of two lines may be represented" | "lines may be represented by an angle" |
| $P_6$ "angles are always contained within a single" | "are always contained within a single plane" |
| $P_7$ "a single plane will contain the rotation" | "the rotation represented by a single angle" |
| $P_8$ "a single angle indicates movement of a" | "of a ray form its original position" |
| P9 "the original position of a ray before" | "called the initial side of an angle" |
| $P_{10}$ "the initial side of an angle is" | "angle is paired with a terminal side" |
| $P_{11}$ "the terminal side of an angle indicates" | — | search parameters: n = 3, proximity = 7

In the example below, an analyst-user can, with a computer processor, manipulate concept line items in the database of the Ontology Editor System to search for 3-grams (three-word phrases) that might appear within the first or last seven-word phrases of the example succession of concept line items. A resulting table can look like the one below.

In this example, the Ontology Editor System searches for a concept line item that dovetails with the ending phrase of concept line item $P_2$. If the Ontology Editor System searches for a dovetail match with an ending phrase, it can search beginning phrases. If the Ontology Editor System searches for a dovetail match with a beginning phrase, it can search ending phrases. In this example, the Ontology Editor System parses the beginning phrase of the succession of CLIs into individual words (the system can also eliminate words such as "the," "or," "a," "and," etc. and select singular versions of words where plural forms exist), and records the number of the CLI (and phrase number in the case of a full inverted index) where a word appears in a beginning phrase. The parsed list can be ordered alphabetically and the Ontology Editor System can remove duplicate words. An example of the output of this operation, a subset of the total output from the operation to parse the words of the CLI phrases listed above, appears below. The numbers in set brackets coincide with the subscript numbers for the CLIs, e.g., $P_0$, $P_1$, $P_2$ . . . can be 0, 1, 2 . . . . Recall that the parsed words originate from beginning CLI phrases.

"both": {0} (null set)
"center": {3, 4}
"common": {2, 3}
"contain": {7}
"contained": {6}
"endpoint": {2, 3}
"indicates": {8, 11}
"initial": {10}
"is": {3, 10}
"lines": {3, 5}
"may": {4, 5}
"movement": {8}
"of": {3, 4, 5, 8, 9, 10, 11}
"or": {2}
"original": {9}
"plane": {7}
"position": {9}
"ray": {9}
"represent": {4}
"represented": {5}
"rotation": {5, 7}
"side": {10, 11}
"sides": {2}

In this example, a search for words that match words in the last phrase of $P_2$, reflects that the word "both" appears in none of the first phrases of $P_3$ to $P_{11}$. The singular and plural forms of the word "side" appear in the first phrase of concept line items $P_{10}$, and $P_{11}$, and the word "side" appears in the second phrase of concept line item $P_2$. Like "both," "about" (not shown) appears in none of the first phrases of $P_3$ to P.sub.11 and it too is an empty set. The words "common" and "endpoint" appear in the second phrase of P.sub.2 and the first phrase of P.sub.3. A search for terms "both," "side," "common," and "endpoint" returns the following set as derived from the beginning phrase of concept line items P.sub.3 through P.sub.11 (the algorithms begin at P.sub.3 because P.sub.0 and P.sub.1 precede P.sub.2 in the succession listed above):

$$\{2, 10, 11\} \cap \{2, 3\} \cap \{2, 3\} = \{2, 3\}$$

The intersection of the sets suggests there can be one-word commonalities between the last seven-word phrase of $P_2$ and the first seven-word phrase of $P_3$, yet the analyst-user has entered a search parameter for three-word phrases. This first step has narrowed the search. The next step can similarly search two-word phrases of $P_2$ and $P_3$, as follows:
"or both": {2}
"both sides": {2}
"sides about": {2}
"about a": {2}
"a common": {2}
"common endpoint": {2, 3}
"the common": {3}
"endpoint of": {3}
"of two": {3}
"two lines": {3}
"lines is": {3}

A search for two-word phrases "or both," "both side(s)," "sides about," "about a," "a common," and "common endpoint" across two-word phrases from P.sub.2 and P.sub.3 return the following set:

$$\{2\} \cap \{2\} \cap \{2\} \cap \{2\} \cap \{2\} \cap \{2,3\} \cap \{3\} \cap \{3\} \cap \{3\} \cap \{3\} \cap \{3\} = \{2,3\}$$

This indicates that at the two-word level there can be a match. A similar analysis of three-word phrases returns zero matches. So, the Ontology Editor System can return to the analyst-user a report that indicates a single two-word out of three-word match (2/3=0.6667 or 67% match at a 3-gram level search). This indicates a possible match between the second seven-word phrase of P.sub.2 and the first seven-word phrase of P.sub.3. If the analyst-user refines his search parameters to n=2 and proximity=7, the Ontology Editor System can report a single 1.0 or 100% match indicating a possible dovetail relationship between P.sub.2 and P.sub.3. This prompts the analyst to assess the two CLIs to determine whether he believes the two concept line items may be dovetailed, and either confirm the quality of the succession or make edits to improve continuity and contour. If the Ontology Editor System detects no matches and returns a negative result (e.g., zero identified matches at any n or proximity setting), it refers the tables above to the analyst-user for his review. The analyst can thereby be prompted by the Ontology Editor System to check the continuity and contour of the CLI succession for Gaps.

The Ontology Editor System can also perform similar operations with full inverted indices.

The Ontology Editor System applies other methods to relevance metrics computed and reported by online search engines compute measures of closeness of CLIs and percentage matches of phrases (the closer two CLIs can be together, and the higher percentage match between the phrase at the end of one CLI and the phrase at the beginning of another CLI located within some measure of proximity in the succession of concept line items, the more possible it can be that two CLIs may be dovetailed). On the basis of a succession of concept line items constructed by the analyst, and the attributes of granularity described above, the system generates a graph to depict the series of CLIs, possible branches in logical paths (a break in an otherwise dovetailed succession of CLIs may indicate a branch in the logical progression of ideas), Gaps that may appear (depicted as ghost nodes in the graph without labels), and associated metrics. The analyst can assess the graph for accuracy and edit and adjust the CLIs to resolve any quality issues.

Another example of an extraction technique can be reverse-engineered concepts, that is, concept line items developed by disaggregating at least one of some other concept of mathematics for its more granular prerequisite concepts, the historical context of the concept, or motivation. Reverse engineering involves research, often into ancient treatises to assess the motivation that led to the mathematical idea. Where information may not be available, analysts can ask what might have been true, or might have been important, for this concept to arise at the time that it did.

Discussions of other examples of extraction techniques—assessing mathematical meaning, anticipating errors, anticipating questions, composing leading questions, developing alternate solution strategies and alternate approaches to those strategies, anticipating common and inventive applications of concepts, and holding written conversations (even imaginary conversations) about concepts with other mathematicians and extractors—appear along with a workflow chart that illustrates the extraction process, and an example of an extraction, later in this application.

Adaptation of Agile/Serum management principles results in an iterative, incremental, and cyclic Ontology development process: in essence, for single extractors, a math analyst performs an extraction of a math problem (this process is detailed later in another section of this application). He analyzes concept line items derived from that extraction and, on the basis of that extraction selects another exercise problem to extract, gauging his selection to minimize extraction of the same or similar concepts of math. Data he mines can be entered into the database for processing and transformation.

As individual math analysts go, so teams of math analysts go, but the risk of inefficiencies increases. Teams of math analysts perform extractions in parallel, and so the Ontology Editor System organizes and coordinates the teams and their analysts. To manage the increased risk of redundancies in a team extraction process, to achieve a smoothed, end-to-end production work flow, members of the Serum team work with the Ontology Editor System to prepare an optimized extraction backlog (an ordered list of math problems to be extracted by math analysts) for selection and distribution of math exercises to multiple extraction teams of mathematics analysts. The steps described and discussed in II. 2.a. through II. 2.g. below (all performed in concert with the Ontology Editor System, see "II. Details of Ontology Development and Deployment: Textbook Collection to Ontology Release" and FIG. 4) detail this process.

To summarize steps II. 2.a. through II. 2.g. (detailed in the discussion of FIG. 4), analysts compile a list of concepts addressed by textbooks and non-textbook publications (included in the textbook collection) for the grade level or math subject under research, and express them in word phrases (for example 1-, 2-, or 3-word noun phrases or verb phrases (n-grams)). They graphically map concept groups, generally in order from simplest to most complex, to model the course curricula and subdivide the graph, by divisions of topics, into a number of topical regions or segments of the course curriculum. Analysts pair concept groups with exercise problems or examples that most clearly demonstrate the listed concept groups, and articulate in writing the mathematical meaning that can be extracted from that math problem. At any time, analysts may delete, edit, or entirely replace exercise problems to avoid redundant work and to focus extraction on derivation of new CLIs from new content. This work product can be entered into the database for processing and transformation.

The optimization module of the Ontology Editor System optimizes exercise, concept group, and mathematical meaning (or "MM") data to minimize redundant work to extract CLIs of similar or identical content. Analysts adjust exercise problems to reduce redundancies detected by the optimization module, and that data can be fed back to the model of course curricula to update the mapped concept groups, paired exercise problems, and MM. The Ontology Editor System automatically constructs a burndown chart to depict the number of exercise problems to be extracted during the production cycle. A burndown chart can be a graph automatically generated and updated by the Ontology Editor System that reflects the number of exercise problems in the extraction backlog that remain to be extracted. Time can be on the horizontal axis of the chart, and the number of extractions to be performed can be on the vertical axis. The Ontology Editor System automatically tracks progress on extractions and, with the computer processor, can update the burndown chart when analysts check their production in to the system database. The number of extractions that remain to be performed can be reflected in the updated burndown chart.

With the parsed list of concept groups divided into a number of curricular regions, teams select from the extraction backlog one or a series of contiguous (topical) regions of the modeled course curriculum. Teams assign exercise problems to team members for extractions. Team analysts and managers repeatedly re-optimize output with the exercise problems that remain, and base their selection of the next set of exercise problems for extraction by team members on output from the Ontology Editor System's optimization module. The output of this process can be successive chains of CLIs that dovetail (e.g., one extracted region of a course's curricular content ends where another extracted region begins).

These steps render a more efficient process. In spite of steps to avoid redundant work among math analysts, however, CLIs written for one exercise problem remain likely to be the same CLIs written for another exercise problem from the same or another topical region. To resolve this problem, the Ontology Editor System can, during on-going extraction work, re-optimize written CLIs, and in realtime advise math analysts as to the existence and availability of content in the Ontology Editor System database that may be similar to content analysts have under extraction. Since in the extraction process concept groups can be developed before concept line items can be distilled from them, alerts as to redundancies can be available with little or no delay.

As an alternative to this process, analysts may enter keywords that they intend to include in their written CLIs, and cause the Ontology Editor System to tell them what CLIs exist that might be copied and edited. If an analyst edits an extant CLI, or writes a new CLI, the new line item can be entered into the database of the Ontology Editor System for other analysts to copy and paste as they may deem appropriate.

Teams may determine, and direct the Ontology Editor System to adopt, best versions of concept line items and concept groups. The Ontology Editor System can maintain the same MSCICs (the system simply replaces one with the other, retaining the original for records and an audit trail, and records multiple instances of the same concept group or CLI in the Ontology). This feature can reduce significant redundancy in work and extracted concept line items, a source of significant inefficiency and an opportunity for accelerated development of the Ontology.

Except for the inefficiencies described above, it could be deemed to make sense that construction of the exercise collection would precede extraction of math concepts. Experience demonstrates that to pursue such a course of development introduces significant repetition and overlap of efforts between even two math analysts. The problem rapidly compounds with more analysts. Thus the Ontology Editor System can be designed to manage, coordinate, and track multiple analysts, and multiple teams of analysts, who work in parallel to extract concepts of mathematics from the same curriculum. One of the components of the Ontology Editor System that reduces inefficiencies, such as by way of non-limiting example redundancies, can be the optimization module.

Role of the Optimization Module in the Extraction Process

In the course of extraction, the sets of concept line items extracted (an extraction can also be called a distillation) from two different math problems can reflect overlap, the overlap represented by similarly written and identical concept line items. Mathematics analysts performing extractions want to select the fewest number of problems for extraction, and distill concepts (whether identical or similar) the fewest number of times (but at least one time). There can be several stages in the course of extraction when this type of information, refreshed for recent input, provides valuable guidance in selection of the next math problem to extract. It also provides valuable input to the extraction process in real time as analysts can copy-paste-and-edit already-extracted and recently-extracted concept line items from the work of other analysts into their own extractions. The Ontology Editor System can thereby accelerate the work of analysts and reduce system redundancies, and accelerate construction of the Ontology, by recording multiple instances of the same concept line item and, in assembly of the Ontology, automatically representing the set of multiple instances with a single CLI.

By way of non-limiting example, one way to formulate this problem can be as a binary integer linear programming problem, an optimization model from the field of mathematical programming, with an inverted index similar to the one previously described in this application (e.g., for dovetailed concept line items). CLIs about the same concept and written by the same person, or different persons, can be different. Concepts, expressed in single words and noun phrases and verb phrases, tend to be the source of similarity among CLIs that can nonetheless be about the same concept. In a table constructed for optimization of concepts with exercise problems, it may not be helpful to compare full-sentences full-sentence CLIs. It may be more effective to compare the components of those CLIs (e.g., single words, noun phrases, and verb phrases) and, at certain stages of the extraction process (the stages of extraction are described in a later section of this application) their precursors (e.g., mathematical meaning and concept groups).

The methodology involving inverted indices described in the previous section of this application (see "Special Considerations: Role of the Ontology Editor System in Management of Production Inefficiencies"), can be applied to identify single words and word phrases that encapsulate mathematical meaning. For example, words in concepts groups and expressions of mathematical meaning paired to selected exercise problems can be parsed individually and in their phrases, and compared to a list of nouns, verbs, and other words (treated in this case as documents in a search engine) maintained in the Ontology Editor System (or "OES") database and automatically expanded by the Ontology Editor System, to identify words and phrases that can be descriptive of, by way of non-limiting example, the function, purpose, application, and component concepts of exercise problems. By way of non-limiting example, this can be performed by the OES with inverted indices and full inverted indices. Intersections of data, e.g., sets of parsed words and phrases intersected sets of words and phrases in the OES corpus of such words and phrases, mine from exercise problems descriptors of the conceptual content they contain. The OES can also perform this same function, and in cases with more or less information included in the output, with a variety of matrices described throughout this application.

Those descriptors can be entered into an optimization table of the kind that appears in FIG. 31. By way of non-limiting example, given five exercise problems from an extraction backlog that can be under consideration for extraction, the exercise problems can be numbered 1 through 5 and those numbers can be ordered across the top of the optimization table as in FIG. 31. Assume, again by way of non-limiting example, that the set of concepts for the first exercise problem can be {line, adding integers, subtracting integers, circumference, radius}, the set of concepts for the second exercise problem can be {circumscription, adding integers, semicircle, circumference}, and the sets of concepts for the third, fourth, and fifth exercise problems can be similar. This collection of concepts from the five example problems, expressed, for example, as sets of words and word phrases, can be refined to remove redundancies and can be listed along the left side of the optimization table. To further the example, in the cells of the table, the OES can enter a binary indicator telling whether a concept does or does not configure in a problem listed at the top of the table. For example, the OES table entry for a {concept, Universal Problem Number (or "UPN")} set can be 1 if that concept appears in the concept listing for that exercise problem. If that concept does not appear in the concept listing for that exercise problem, the OES can enter a 0. By way of non-limiting example, a table similar to the one in FIG. 31 can result.

In a review of FIG. 31, the concept "circles" appears twice, covered by two exercise problems. If an extraction team performs extractions of the five exercise problems, distillation of "circles" can represent wasted effort. The concept "line" can be covered one time, as indicated in the first column under exercise problem 1. If extractors do not distill concepts from the first exercise problem, concepts about "line" may not be included in the extraction output. Therefore, in this example, extractors may select the first exercise problem as their extraction backlog, because that can be the one problem to cover the concept of "line." Since, in this example, the third and fourth exercise problems reflect the same concept lists, one of those problems may be chosen for the extraction backlog.

To continue the example, the OES can sum 1s and 0s in the rows and columns of the optimization table. The solution to the optimization table can be a binary array with one entry for an exercise problem. In this example, the five exercise problems suggest five entries in the solution array; the first entry can correspond to the first exercise problem, the second entry to the second exercise problem, and so on. If extractors elect to include an exercise problem in the extraction backlog, the entry for that exercise problem can be a 1. If not, the entry for that exercise problem can be a 0.

Extractors can decide to minimize the sum of the binary array because that can minimize the total number of exercise problems in the extraction backlog. In this example application of the optimization module, two constraints can apply: concepts may be covered at least one time, so row sums can be 1 or higher to reflect the desired concept coverage.

If, for example, the solution array is the set {1, 1, 1, 1, 1}, the implication can be that extractors plan to extract the five exercise problems. In this example application of the optimization module, extractors want to minimize the function value: {1, 1, 1, 1, 1} translates into 1+1+1+1+1=5. This solution array can be feasible and it can suggest that the concepts listed can be covered. The solution array may not be optimal, because the table indicates duplication of effort.

If extractors choose {1, 1, 1, 0, 1}, translated 1+1+1+0+1=4, it implies that they plan to extract the first, second, third, and fifth exercise problems and not the fourth exercise problem. This can be determined to be an optimal solution as the solution can cover the list of concepts with the least number of exercise problem extractions.

In the course of extractions, mathematical meaning and concept groups can change. Thus, periodic and even continual re-optimization can help extractors to minimize wasted effort and even work together to accelerate production of the Ontology. The content to be optimized against the exercise problem numbers can depend on the stage of extraction. At a stage before an analyst selects an exercise problem, the optimization module can help him to optimize his backlog or make an optimal choice of the next problem to extract. At a stage before or when the analyst distills written concept line items, data from the optimization module can help to identify similar content that he can copy-paste-and-edit into his own analysis work. In the course of extractions, extractors and their teams can encounter situations similar to the following non-limiting example in which re-optimization can become a methodology to sustain efficiency:

1. From an initial extraction backlog of one hundred exercise problems, an extraction team runs the optimization module to select a subset for solution. In this non-limiting example, the extraction team can select exercise problems one through forty to cover a list of concepts.

2. The extraction team begins work.

3. At one or more stages in the extraction process, the team can identify additional concept items in several exercise problems and wants to be sure they can be covered in extractions. An analyst working on the twenty-fourth exercise problem can encounter a long and unanticipated delay. The extraction team identifies additional exercise problem numbers 101 through 110 that the team believes can be included in the extraction backlog, and exercise problems one through ten have generated output.

In such cases, the team's question can be whether the initial binary solution still holds and, if not, how to determine an optimal solution to continue production. This can be a reformulation and re-optimization of the original array. The concept and MM-exercise problem matrix can be updated to indicate prepared extractions and new output (CLIs parsed for their words and word phrases). The Ontology Editor System can submit the new data array to the optimization solver for an updated optimal solution.

Workflows of The Ontology Editor System

The role of the Ontology Editor System can be several fold. For example, it comprises the antecedent software code that develops a functional Ontology of mathematics and thereby lays the foundation for construction of the Research System. It can be a component of a back office system that monitors performance of the Research System with the Ontology, analyzes the Ontology for candidate improvements, performs updates, and houses a log of upgrades for future releases. Further, the OES can support continuous development of successive releases of the Ontology and/or upgrades to the Ontology.

I. Synopsis of the Ontology Development Process

Figure 3:
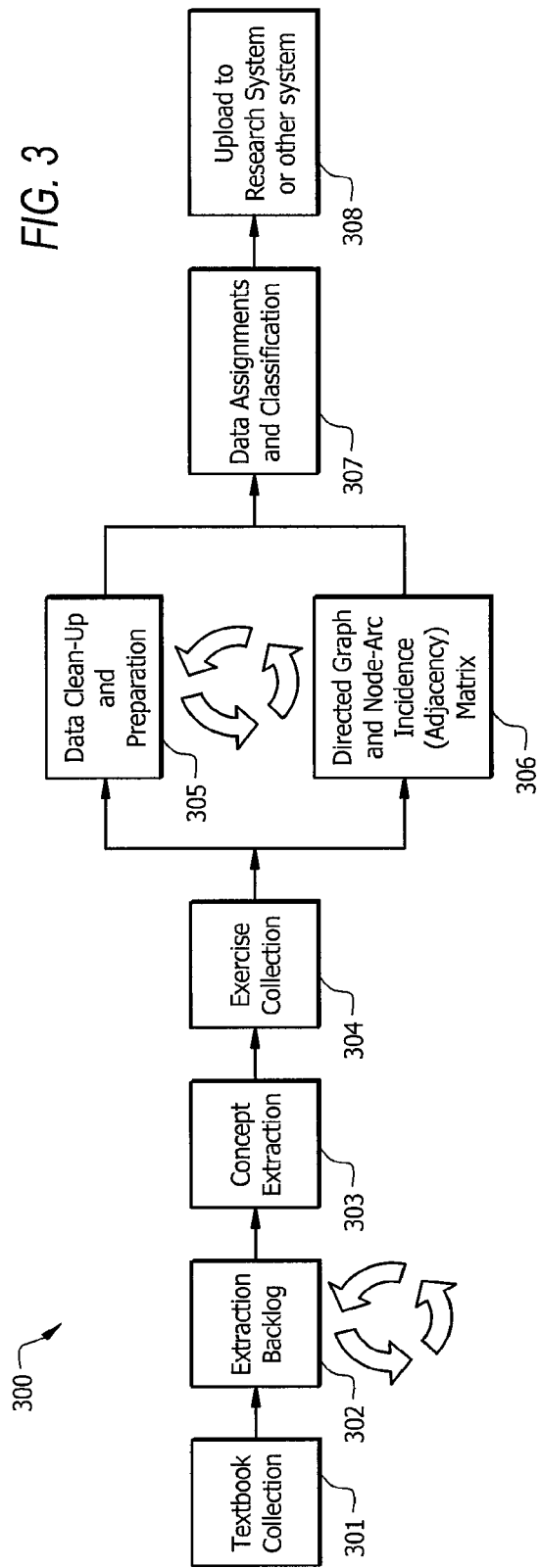
FIG. 3 is a graphic synopsis of an embodiment of the math concept extraction and Ontology assembly process.

The flow chart 300 that accompanies this section (please see FIG. 3) presents an overview of an embodiment of the math concept extraction and Ontology assembly process as semi-automated and coordinated by the Ontology Editor System. The process begins with development of a representative collection of textbooks, and culminates in an upload of the Ontology to the Research System or other system intended to use the Ontology (please see FIG. 3).

1. Textbook Collection 301. A collection of textbooks and other resources that encompasses the concepts of mathematics taught in a specified curriculum.

2. Extraction Backlog 302. Preparation of an ordered and optimized list of math problems to be extracted by one or more teams of math analysts.

3. Concept Extraction 303. Identification of detailed and finely granular concepts of mathematics in the form of concept line items. Please see FIGS. 5A and 5B.

4. Exercise Collection 304. A collection of exercise problems that becomes a set of content for quality checks against the Research System.

5. Data Preparation 305/Network Construction 306. A two-station cyclical process where CLI data can be checked and edited, concept line items can be ordered into a directed graph to represent prerequisite and dependency relationships among them, and the Ontology Editor System automatically constructs a node-arc incidence matrix and other matrices from the directed graph.

6. Data Assignments and Classifications 307. Concept line items can be assigned unique MSCICs and paired with LOSs. Matched pairs of MSCICs and LOSs can be mapped to core math education standards. MSCICs can be assigned a weight for the dependencies that it supports, an importance score, and classified into classifications (for example, a nice-to-know classification, an important-to-know classification, etc.) and classified into sub-classifications).

7. Upload 308. The version of the Ontology to be uploaded can be a test system to assess how the Research System performs with the new content.

Figure 4:
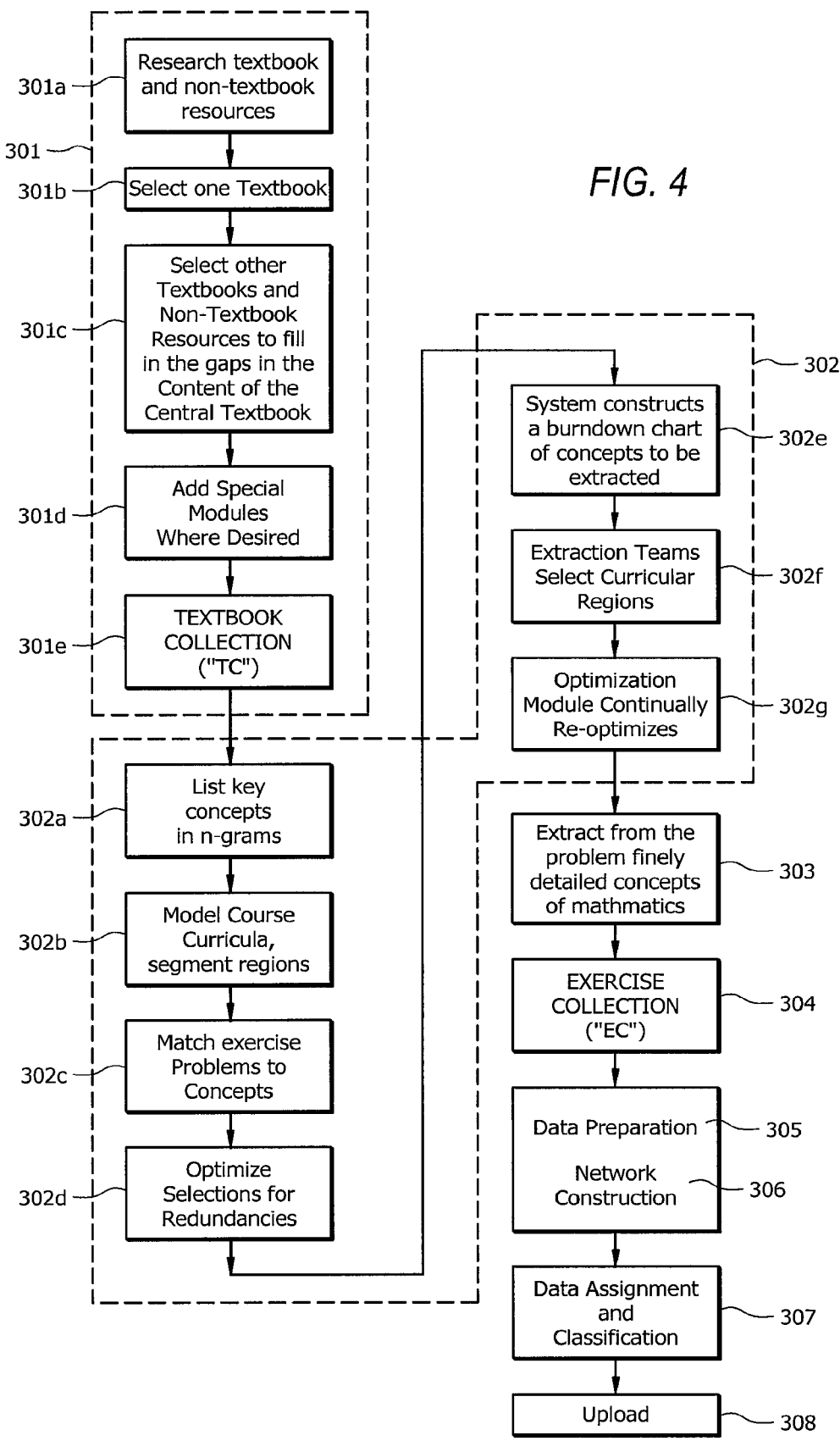
FIG. 4 is an exemplary workflow chart of steps for development of a textbook collection leading to assembly of an exercise collection.
Figure 5A:
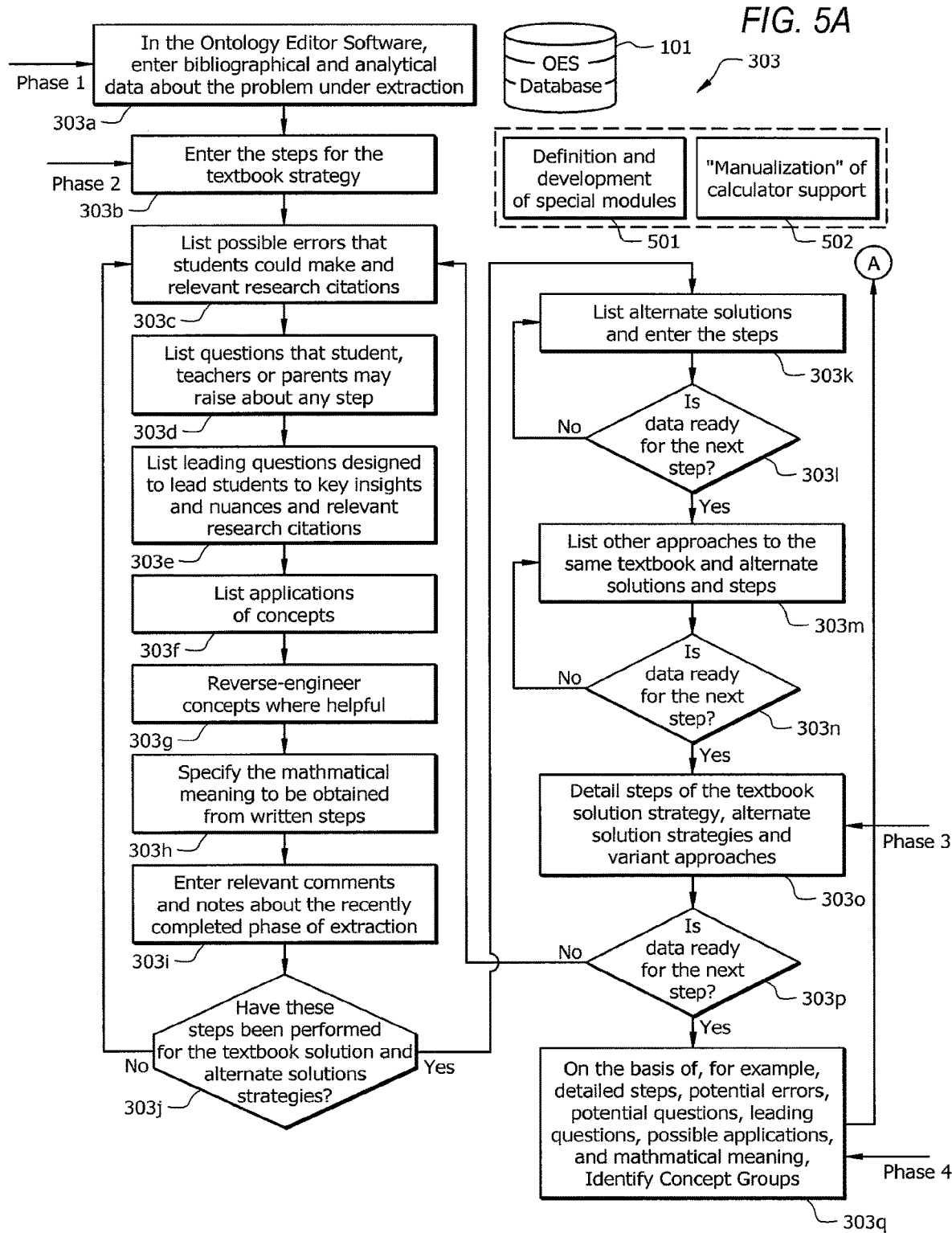
FIGS. 5A and 5B depict an exemplary workflow chart of detailed steps that comprise the math concept extraction process.
Figure 5B:
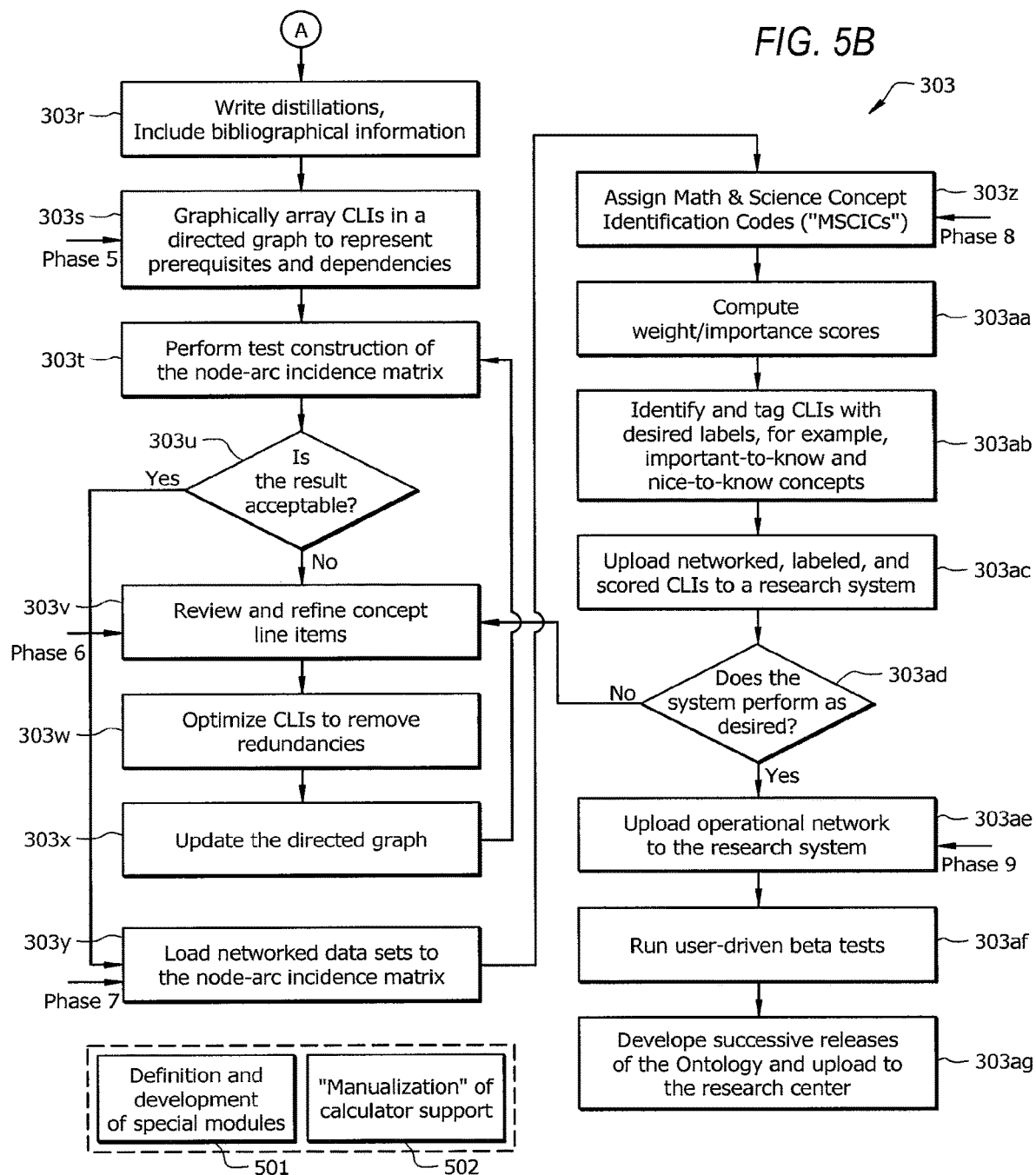

II. Details of Ontology Development and Deployment: Textbook Collection to Ontology Release The previous workflow 300 chart summarized an embodiment of the Ontology development process supported by the Ontology Editor System (see FIG. 3). FIGS. 4, 5A, and 5B detail embodiments of the process summarized in FIG. 3. FIG. 4 details an embodiment of textbook collection 301 and an extraction backlog method 302. FIGS. 5A and 5B detail an embodiment of concept extraction 303. The following detail explains the steps that appear in the embodiment shown in FIG. 4.

1. Textbook Collection 301. The Ontology development process begins with a textbook collection for Pre-Kindergarten through Post-Calculus 1 Statistics. In addition to textbooks from the United States, the Textbook Collection includes math textbooks from a plurality of countries (for example, Singapore, Russia, Japan, and India) so that the Ontology captures the broadest range of math concepts for any age, grade level, skill level, and math subject. The textbook collection features units such as a selected base of reference materials for math analysts (called the research base), and collections about basic logic, proof technique, and early childhood cognition and numeracy.

The following steps, as shown in FIG. 4, may apply. Please note some of the steps may be omitted and additional steps may be added.

a. Research textbook and non-textbook resources 301a. With the scope of the textbook collection determined (the scope can be changed as the Ontology and Research System grows), the systems and methods gather copies of the resources. The textbook collection includes old textbooks (e.g., 1954), ancient treatises (e.g., from China, the Middle East, and Sweden), textbooks still in use by schools, new releases of textbooks based on the U.S. national core standards, and textbooks from Singapore, Japan, Russia, and India. The textbooks can be in print format, electronic format, magnetic format, and/or any other format.

b. Select one Textbook 301b. This textbook or non-textbook publication becomes the central textbook for its grade level or math subject. It can provide the central reference point for the textbook collection.

c. Select other textbooks and non-textbook resources to fill Gaps in the content of the Central Textbook 301c. Textbooks commonly feature one or several types of Gaps. To establish a foundation for an Ontology, other books in the textbook collection either contribute concepts, ideas, insights, and nuances to fill the Gaps in the central textbook, or contribute information and perspectives that cannot be presented in the central textbook.

d. Add special modules where desired 301d. We have elected to add early childhood numeracy, cognition, basic logic, fundamental proof technique, and a research base to its PK-12 textbook collection. Note that this does not reflect the curriculum for any student or class. It makes the information available to parents, students, teachers, and tutors (or "PSTTs") at any time. Item 501 shows the definition and development of special modules.

e. Textbook Collection ("TC") 301e. The textbook collection can be functional, but as the Ontology grows and extraction efforts continue over time, books and resources will be partially or in their entirety added and/or.

The Textbook Collection can be extensive. In practice, Ontology development supported by the Ontology Editor System can begin with a single math textbook or even an exercise collection already constructed on the basis of some pre-determined proposition to include first principles, for example.

However, we want to develop an Ontology of PK-12 mathematics at a fine level of concept granularity, and so our extraction teams find that development of an extraction backlog can be a helpful and important intermediate step. The Ontology Editor System supports organizational processes to check known operational redundancies across multiple extraction teams. Consequently, production, pace, team morale, and product quality improve.

2. Extraction backlog 302. The extraction backlog can be an ordered (by priority and other criteria) list of math problems to be extracted by one or more teams of math analysts. The backlog can be an artifact of Agile/Scrum management and can be a source of specifications for the Ontology and any part thereof.

The Ontology Editor System supports team-wide development and optimization of the extraction backlog, and makes the list visible to members of the Ontology development team. For example, the OES can make the list continually visible, visible at certain stages of the extraction process, and/or visible on demand by permitted users. The extraction backlog can be maintained, updated, expanded, and ordered by the Ontology Owner, one of the roles of the extraction team.

The steps below represent an example of this process. Some of the steps may be omitted, additional steps may be included, and steps may be changed as well.

a. List concepts in the form of n-grams 302a. The Ontology Editor System can compile a list of concepts addressed by books in the textbook collection for the grade level or math subject under research. Members of the extraction team can review the textbook collection and select problems that cover concepts discussed in the textbook and that contribute to coverage of concepts in the range of curriculum that the team has selected (e.g., the range of concepts taught at a grade level or about a certain topic or subject in the U.S., Singapore, Russia, Japan, and India). To assist the process, the OES can enable the team to categorize (by assigning tags to selected math problems) selected problems by a 4.times.4 matrix of problem types (e.g. word, algorithmic, geometric, and graphic) against four other categories of problems (e.g. exposition, mixed concept, proof, and application). This can help the extraction team to determine whether the selection of math problems includes a broad base of many types of problems. Special modules 501 and examples or exercise problems to be manualized (as explained below) from dependence on calculators may be assigned to a team of specialists.

An expository math problem can be a class of exercise problem selected for inclusion in an extraction backlog or exercise collection. Expository math problems can demonstrate a concept of mathematics and its root system of support concepts. A mixed concept problem can be a class of exercise problem that integrates multiple ideas of mathematics into the same expression or problem.

Manualization 502 can be extraction of math problems that may be practical for students because the students have access to calculators (e.g., with trigonometric functions). Manualization can be the same extraction process described herein but directed to parse the function(s) performed by the calculator into component math concepts, and thereby enable manual solution of the problem without calculator support as well as student comprehension of the mathematics involved in the problem.

With exercise selections made, analysts enter in the form of word phrases the meaning (e.g., mathematical meaning) that can be drawn from the exercise problem, and any concept groups that can be drawn from the exercise problem as well. Another example method can be for the Ontology Editor System to text-mine textbooks and other electronic materials for word phrases, or for the Research System to mine content posted on the Internet for problems, meaning, concept groups, and concepts.

With the OES, an extraction team can match math concepts with exercise problems that most clearly demonstrate, illuminate, and exercise those concepts.

b. Model the course curricula, segment the map by regions 302b. The OES can graphically map the concepts (e.g. noun phrases, verb phrases, or n-grams) in, by way of non-limiting example, directed graphs, undirected graphs, and matrices of various types, to model the course curriculum described by the textbook collection. As part of this process, concepts can be arranged, again by way of non-limiting example, from the simplest to the most complex, by prerequisites and dependencies, and by the hierarchy of the Ontology architecture, and thereby establish in the Ontology Editor System a part of the foundation for the extraction backlog. The OES can divide the list of concepts into a number of curricular regions by topical divisions.

c. Match exercise problems to concepts 302c. The OES can match concepts with exercise problems or examples that most clearly demonstrate the listed concept group (e.g., an expository math problem), and articulate the mathematical meaning that can be extracted from that math problem. The OES can also edit or amend assigned math problems to encompass other concepts, or to more clearly focus on one or two specific concepts. Additionally, or alternatively, a replacement or supplementary problem may be constructed without any previous material to serve as a model. These edits can happen at any time during the production process.

With defined curricular regions (per b. above), math problems paired with the concepts that comprise those regions can be included with the regional assignments d. Optimize selections for redundancies 302d. The Ontology Editor System optimizes exercise problem and concept group-MM data to minimize redundancies in work where CLIs of similar or identical content might be extracted. The Ontology Editor System's optimization module flags near matches of mathematical meaning and concept groups, and selects an optimal collection of math problems for the extraction backlog. As part of the process, the OES can also, by way of non-limiting example, edit math problems to include more concepts for extraction of the same exercise problem, and reduce the number of concepts involved in a math problem to focus on a particular concept or set of concepts. This editing process can have the effect of adjusting the extraction backlog for redundancies. Edited data (e.g., exercise problems, concepts, and meaning) can be fed back to the model of course curricula to update the mapped concept groups, paired exercise problems, and MM.

e. Construct a burndown chart 302e. From the segmentation of topical regions, the Ontology Editor System can automatically generate a burndown chart (described above) as a diagrammatic depiction of the concepts (as, by way of non-limiting example, ordered from simplest to most complex, prerequisites and dependencies, and the hierarchy of the Ontology architecture) to be extracted in the production cycle. Burndown charts can be drillable for individuals and for one or more extraction teams so analysts can quickly see, for example, what concept and meaning content can be comprised by a certain problem, and what problem, concept, and meaning content might be comprised by a segmented region.

f. Select curricular regions 302f Extraction teams select one or a series of contiguous regions to extract, and distribute assignments to individuals on their teams. Burndown charts can be updated and segmented for teams and individuals.

g. Optimization module continually re-optimizes 302g. The OES can continually re-optimize output from analysts with exercise problems and related content (e.g., concepts and meaning) that remain, and enable teams to base their selection, and edits, of next sets of exercise problems for extraction on a re-optimized extraction backlog. During on-going extraction work, the Ontology Editor System can in real-time re-optimize CLIs, and advise math analysts as to the existence and availability of content in the Ontology Editor System database that can be similar to content that analysts have under extraction.

3. Concept Extraction 303. Extraction of detailed and finely granular concepts of mathematics in the form of concept line items can be a meticulous and intensely rigorous process. An example of extraction of math concepts is represented in step 303 of FIG. 3 and in step 303 of FIG. 4. Examples of detailed steps that comprise the math concept extraction process 303 appear in the third workflow chart (in two parts) of this series (FIGS. 5A and 5B). A discussion follows. The extraction process can be iterative, incremental, and cyclical, meaning that as extraction work on assigned math problems is checked in to the Ontology Editor System, information from recent extraction efforts can be recycled back into the extraction backlog database to improve and refine decisions about the next exercise problems to extract.

Throughout the selection and production processes, the computer processor of the Ontology Editor System automatically re-optimizes extracted concept line items and MM against exercise problems that remain to be mined for CLIs. It also updates burndown charts to track changes to and reflect the current status of the extraction backlog. In addition, the software and the extraction processes have been designed to improve procedural inefficiencies. See the discussion under the section titled III. Details of the Process to Extract Concepts of Mathematics from Exercise Problems and Examples for a detailed discussion of the process management features of the Ontology Editor System (FIGS. 5A, 5B).

4. Exercise Collection 304. As analysts check their CLI extractions in to the Ontology Editor System, the iterative and incremental cycle supported and automated by the Ontology Editor System progressively analyzes data and compiles an evolving exercise collection (developed post-extraction). The Exercise Collection represents, in mathematical expressions and their roots, concepts of, a particular curriculum from covered countries.

5. Data Preparation 305 Network Construction 306. Another phase of the Ontology development process can be a two-station cyclical process. In the Ontology Editor System, math analysts array extracted CLIs in a visual directed graph 2600. (See FIGS. 26A through 26E showing items 2601-2666). As they work with recently extracted CLI data, important or recommended improvements to the data frequently come to light. For example, some CLIs not detected by the Ontology Editor System may in fact be duplicates or near duplicates of other CLIs. As analysts array refined CLI data in a directed graph to depict relationships of prerequisites and dependencies among the CLIs, the Ontology Editor System automatically assigns 1s and 0s in the appropriate cells in a node-arc incidence matrix. This cyclical process of review, refinement, and revision of CLI data continues until the node-arc incidence matrix can be prepared to support the Research System's operations.

6. Data Assignments and Classification 307. Concept line items can be assigned unique MSCICs and paired with LOSs. Matched pairs of MSCICs and LOSs can be mapped to core math education standards. MSCICs can be assigned a weight for the dependencies that it supports, an importance score, and classified into classifications (e.g. nice-to-knows and important-to-knows).

7. Upload 308. Programmers upload the coded matrix to a test system, and run automated queries to determine how the system performs with the new CLIs. Test results and data can be forwarded to the original math analysts for review and edits of CLIs and the Matrix if important. The revised network and CLIs can be returned to programmers via the Ontology Editor System with highlighted changes for revised coding. This process repeats—and may include user-driven beta tests—until the Ontology and Research System pass the tests. The Ontology Editor System packages the network and performs an upload to the Research System.

Since the Research System can be designed to accept uploads—Ontology updates, upgrades, new segments for an entire grade level or math subject, and other releases, etc.—and even entire change-outs of the Ontology similar to the way a memory card of a camera can be changed for a new one, uploads of new and revised Ontology components to the Research System can be made whether the Research System may be in development or may be in operation. From the PSTT-user's perspective, the uploads can be seamless and unnoticeable.

As users, system administrators, and math analysts gain more experience with the Research System, multiple data treatments can motivate successive versions and/or upgrades of the Ontology.

III. Details of the Process to Extract Concepts of Mathematics Thematics from Exercise Problems and Examples (FIGS. 5A and 5B)

This section of the application details an example of a stepwise process to extract by computer processor, computer database, and computer manipulations of data stored on computers, finely granular concepts of mathematics from exercise problems. FIGS. 5A and 5B detail an example of step 303 in FIGS. 3 and 4. To summarize, mathematics analysts progress from one problem to the next within their assigned region or segment of the current grade level or math subject under extraction. Math analysts extract concepts that can be within the concept range of the grade level or math subject at hand (as defined by textbooks and non-textbook resources from countries under the team's focus). A data oversight team works with the Ontology Editor System to order the extracted concept line items (CLIs) by prerequisites and dependencies, and construct the roots of the concepts. Concepts that support or lead up to that grade level or math subject comprise the "roots." Single concepts have roots. Some roots start at Pre-Kindergarten and extend up to the grade level or math subject at hand.

The Concept Extraction Process 303. FIGS. 5A and 5B detail an example of the concept extraction process 303 (please see FIG. 3 and FIG. 4) from initial data entry of the math problem under extraction 303a to upload of networked and coded data sets to the Research System 303ac. For reference purposes, steps can be divided into any number of phases, and in this example we show nine phases. Throughout the process, the Ontology Editor System logs ideal hours worked by extractors to establish a baseline for production effort and efficiency.

Phase 1 303a

1. In the Ontology Editor System, enter bibliographic and analytic data about the problem under extraction 303a. This includes title of the textbook where the exercise problem can be found (unless it was written by a math analyst), copyright date, ISBN-13, ISBN-10, unit title, chapter title, section title, and sub-section title, page number, problem number, type of exercise problem (expository, mixed concept, proof, or application), degree of complexity, type of problem (word, algorithmic, geometric, graphic generation and graphic interpretation), grade level, whether the problem can be a special-purpose exercise, whether the problem was selected to isolate a concept, and expression of the concept in LaTex (where feasible).

Phase 2 303b-303n

2. In the Ontology Editor System, enter steps for the textbook solution strategy 303b. Where feasible, write these steps in LaTex. Include citations.

This may not be feasible for most problems from Pre-Kindergarten, Kindergarten, or 1st grade problems. In such cases, provide written descriptions of what to do to solve the problem. Consult the Ontology Editor System's database of previous solutions to determine whether the textbook solution strategy, or one like it, has already been extracted. If so, the analyst returns the problem to the extraction backlog and consults with the Ontology Owner.

3. THIS STEP BEGINS A REPEATABLE LOOP. List errors that students could make 303c. Include any relevant research citations (if the information can be derived from the Ontology Editor System's databases (e.g., the research base), the citations can be automatic). Written linguistically, these potential errors usually reflect misunderstanding, simple error, miscalculation, or inflexible thinking.

4. List questions that students, teachers, or parents might raise about any step. Include any relevant research citations 303d.

5. List leading questions designed to lead students to insights and nuances. Include any relevant research citations 303e.

6. List applications of concepts 303f. This step also uncovers insight and nuance in the meaning and deployment of extracted concepts, and specifically helps to resolve any rational dissociation. Include any relevant research citations.

Rational dissociation can describe the effect where a concept of mathematics becomes disassociated from the rationale or motivation that lead to its development. For example, in the course of discovery, it can be common for a mathematician or scientist (or many mathematicians and scientists over many years) to follow a certain path of logic to arrive at an axiom, a theorem, or a principle. The concept can be codified in simple and perhaps elegant terms, but may have lost its connection to the inquiry, motivation, and context that resulted in its current state. Dr. Hans Freudenthal (Hans Freudenthal, Didactical Phenomenology of Mathematical Structures, D. Reidel Publishing Company, 1983) drew attention to the same phenomena with his terms "inversion" and "conversion" of math concepts.

7. Reverse-engineer any concepts where it would be helpful to construct their root systems. Include any relevant research citations 303g.

8. Specify the mathematical meaning to be obtained from written steps. Include any relevant research citations. Mathematical meaning can be the "so-what" of the math that comes from the solution step 303h.

9. THIS STEP ENDS THE REPEATABLE LOOP. Enter relevant comments and notes about the recently worked phase of extraction 303i. Upload content to the Ontology Editor System for re-optimization operations. In step 303j the system determines whether steps 303c-303i have been performed for the textbook solution and alternate solutions strategies.

10. Identify alternate solution strategies and enter the steps to them 303k. Where feasible, Write these steps in LaTex. Include citations.

This may not be feasible for most problems from Pre-Kindergarten, Kindergarten, or 1st grade problems. In such cases, provide written descriptions of what the student does in those steps. Consult the Ontology Editor System's database of previous solutions to determine whether the alternate solution strategy, or one like it, has already been extracted. In step 303l, the system determines whether the data is ready for the next step.

11. List alternative approaches to the same textbook solution strategies and alternate solution strategies 303m. Consult the system database of previous approaches to review ideas for approaches. Include citations. Alternate approaches can be distinct from alternate solutions, in that they can be minor changes to a solution strategy (e.g., count objects in a set from 1 to 10 vs. counting them from 10 to 1). By contrast, alternate solution strategies can be fundamentally different from the textbook solution strategy and other alternate solution strategies (e.g., a geometric solution to an algebraic problem, or an algebraic solution to a problem of geometry). In step 303n, the system determines whether the data is ready for the next step. In step 303o, detail steps of the textbook solution strategy, alternate solution strategies, and variant approaches. Step 303p determines whether data is ready for the next step.

12. THIS STEP BEGINS A REPEATABLE LOOP. List errors that students could make in the alternate solution strategies (not shown). Include any relevant research citations (if the information can be derived from the Ontology Editor System's databases (e.g., the research base), the citations can be automatic). Written linguistically, these potential errors usually reflect misunderstanding, simple error, miscalculation, and/or inflexible thinking.

13. List questions that students, teachers, or parents might raise about any step in the alternate solution strategies (not shown). Include any relevant research citations.

14. List leading questions designed to lead students to insights and nuances in the alternate solution strategies (not shown). Include any relevant research citations.

15. List applications of concepts in the alternate solution strategies (not shown). This step also uncovers insight and nuance in the meaning and deployment of extracted concepts, and specifically helps to resolve any rational dissociation. Include any relevant research citations.

16. Reverse-engineer any concepts in the alternate solution strategies where it would be helpful to construct their root systems (not shown). Include any relevant research citations.

17. Specify the mathematical meaning to be obtained from written steps in the alternate solution strategies (not shown). Include any relevant research citations. Mathematical meaning can be the "so-what" of the math that comes from the solution step.

18. THIS STEP ENDS THE REPEATABLE LOOP. Enter relevant comments and notes about the recently worked phase of extraction per the alternate solution strategies (not shown). Upload content to the Ontology Editor System for re-optimization operations (not shown).

Phase 3 303o-303p

19. Detail steps of the textbook solution strategy, alternate solution strategy, and variant approaches (not shown). [CHECK ERRORS, QUESTIONS, APPLICATIONS, ETC., BY BRANCHING TO THE SEVEN-STEP REPEATABLE LOOP.]

This can be where minute actions taken in the steps of the textbook and alternate solution strategies and alternate approaches can be detailed.

Phase 4 303q-303r

20. On the basis of the detailed steps, potential errors, potential questions, leading questions, interesting applications, and mathematical meaning, identify concept groups 303q. These steps may not be expressed in LaTex. Include bibliographical information to ensure the CLI records include an audit trail, including notes, and development files. Upload content to the Ontology Editor System for re-optimization operations.

21. Parse concept groups into finely granular concept line items 303r Include any relevant bibliographical information. Identify CLIs as either original concepts, derivatives of an original concept, or applications of original concepts. These can be the extracted CLIs. Upload content to the Ontology Editor System for re-optimization operations.

Phase 5 303s-303u

22. With the Ontology Editor System, graphically array CLIs in a directed graph to represent prerequisites and dependencies 303s. This may also be accomplished by one-to-one comparisons between pairs of CLIs, and in a node-arc incidence matrix itself The graphic approach, read by the Ontology Editor System to automatically build a node-arc incidence matrix, can be much faster and far more accurate.

23. THIS STEP BEGINS A REPEATABLE LOOP. Perform an automatic test construction of the node-arc incidence matrix. Step 303*u* determines whether the result is acceptable.

Phase 6 303*v*-303*x*

24. Review and refine concept line items with the Ontology Editor System 303*v*.

25. With the Ontology Editor System's text-mining algorithms (e.g., by an inverted index or full inverted index) and its optimization engine, search for redundancies, and optimize CLIs to identify opportunities for further refinement of extractions of exercise problems 303*w*.

Phase 7 303*y*

26. With the Ontology Editor System, step 303*x* updates the directed graph (e.g. the graphic array of prerequisites and dependencies that was developed in step 303*s* and refined and optimized in step 303*x*) In step 303*y*, the system loads network data sets to the node-arc incidence matrix. This may also be accomplished by one-to-one comparisons between pairs of CLIs, and by direct data entry in a node-arc incidence matrix. The graphic approach, read by the system to automatically build a node-arc incidence matrix, can be much faster and far more accurate. THIS STEP ENDS A REPEATABLE LOOP BEGUN WITH STEP 303*u*.

Phase 8 303*z*-303*ad*

27. In step 303*z*, the Ontology Editor System can automatically assign MSCICs to a data set of concept line items arrayed in a directed graph, undirected graph, or a matrix storing data from any graph (e.g., a node-arc incidence matrix, adjacency matrix, etc.).

28. The Ontology Editor System can automatically compute weight and importance scores for CLIs 303*aa*.

29. With the Ontology Editor System, analyst-users can search for, identify, and tag CLIs with desired labels, for example, by whether the CLIs can be actionable or descriptive concepts, applications of concepts, important-to-know concepts, or nice-to-know concepts 303*ab*.

30. Upload networked CLIs to a test system (a facsimile of the Research System maintained for testing purposes) 303*ac*.

31. Step 303*ad* runs tests and return to the repeatable loop that begins with 303*v* to revise data until tests are successful. [BRANCH TO THE BEGINNING OF THE REPEATABLE LOOP AND CONTINUE THE CYCLE UNTIL DATA IS ACCEPTABLE FOR UPLOAD.]

Phase 9 303*ae*-303*ag*

32. Given acceptable data, as determined in step 303*ad*, upload operational.

33. Run user beta tests 303*af*.

34. Develop successive releases 303*ag*.

Example of Concept Extraction

The extraction of concept line items from an exercise problem that appears in a math textbook for Kindergarten students (Tan, Winnie, Earlybird Kindergarten Mathematics 2B, U.S. Edition, Marshall Cavendish Education, Singapore, 2006 (ISBN-13 978-9-8101-8601-2), Lesson 14: Counting in sets of 10, page 63.) provides examples of steps in the process described above. FIG. 28 presents the graphic portion of that page that represents the exercise problems presented for students. Many other outcomes of the extraction process with the Ontology Editor System run on computer software on this exercise problem and on other exercise problems can be realized.

Overview. Selection of an exercise problem from a Kindergarten textbook highlights certain aspects of the extraction process. For example, though a problem designed for Kindergarten students can be simple, the extraction process applied to this problem rendered 549 concept line items. Further, steps to work the problem do not lend themselves to expression in LaTex, so they can be linguistically expressed. Extractions of some math problems take into account circumstances of the students. In this case, students in Kindergarten to do not read, and so the extracted concepts can be written for people who can read and who may work with very young students to help the students understand the concepts of mathematics involved in the problem (e.g., teachers, tutors, and parents). Even though some concepts may be considered too advanced for students in Kindergarten, the extracted concept line items can be relevant to the exercise problem and, in the context of the scope of math curricula covered by the Ontology, can be ordered by prerequisites and dependencies and appended to the Ontology.

The extraction of this Kindergarten exercise problem includes one textbook solution and two alternate solutions. The analyses in it comprise over 3,800 lines. Therefore, the examples of steps discussed in this application can be summarized. However, the output of the extraction—the 549 concept line items mentioned above—appears below.

As per the workflow discussion above, we divide this example extraction process into nine phases. Since Phases 6, 7, and 8 can be steps in a repeatable cycle to check and adjust data for quality, and Phase 9 can be the upload of the data set to the Research System, these examples can cover Phases 1 through 5 (inclusive).

Phase 1. The Ontology Editor System begins with data entry and basic analyses of the problem under extraction. Please see FIG. 27 for an example image of the computer screen for entry of basic data. Entered data can be stored in the database of the Ontology Editor System. 2701 indicates where math analysts enter basic bibliographic information about the source of the exercise problem under extraction. This data includes the grade level or math subject, the title of the book (if any), the problem number, chapter number, and page number. At 2702, the analyst indicates whether the exercise problem has been set up by the authors to call for calculator support. At 2703, the analyst indicates whether extraction of the exercise problem suggests that a special module may be extracted by a team of mathematician specialists. At 2704, the analyst enters the country where the textbook was published. At 2705, the analyst responds to whether the exercise problem has been created as a special-purpose exercise problem (a class of exercise problem, whether expository, proof, mixed concept, or application, that can be written for an exercise collection to include certain concept line items; examples of special-purpose exercise problems (or "SPEs") can be inclusion of one or a set of concepts that analysts want to include in the Ontology, development of a unique and repeatable module, or a manual work-around (manualization) for a feature that can be commonly performed by calculators). At 2706, the Ontology Editor System maintains a running total of the number of hours the analyst has worked on the extraction.

At 2707, the analyst assesses the type of exercise problem under extraction, and enters a numeric code to match one of the four categories. Similarly, at 2708, the analyst enters the degree of complexity involved in the exercise problem (assessed from the perspective of the student). At 2709, the analyst assesses the exercise problem in a different set of categories from 2707. At 2710, the analyst indicates whether the concepts involved in the exercise problem appear to be discussed and explained in the textbook in a way to enable the student to perform the exercise problem, or whether the concepts involved may be advanced beyond the scope of the discussion in that section of the book or represent applications of the concepts discussed and explained in the book.

The analyst clicks the "OK" button to enter the data in the database of the Ontology Editor System. Changes to the data may be made subsequent to initial entry.

Phase 2. The math analyst working an exercise problem through the extraction process may generally outline the "textbook" solution strategy. This strategy can be what the math analyst deems to be the most common solution, whether or not it may be the solution strategy discussed by the textbook. The determination of what constitutes the "textbook" solution strategy can be the math analyst's to make.

An outline of any solution strategy for an exercise problem summarizes the steps to take. The analyst performs the same quick assessment for the textbook solutions strategy and any alternate solution strategy he sees. In the case of this Kindergarten problem, the math analyst identified a textbook solution strategy that was slightly different than the strategy discussed by the textbook. Below can be an itemization of the textbook solution strategy and two identified alternate approaches. (Recall that an approach can be a slightly different method to accomplish the same solution strategy.)

An Example Textbook Solution Strategy
1. Select a disc from the picture, mark it, and count out loud the number one.
2. From the marked disc, mark an adjacent disc and count out loud the number two.
3. Repeat this process by successively marking unmarked adjacent discs and stating the successor to the previously stated number.
4. Count and mark ten discs and circle the discs to collect them as one group of ten.
5. Check: Once you have circled a group of discs, count the discs inside the circle in a different order. Ensure that the count is the same.
6. Repeat this process to produce another group of ten discs, so that no disc in the second group is part of the first group. Be sure to start your count once more with the number one.
7. Repeat the same counting process once more until the discs have been marked and counted.
8. Write the number corresponding to the total number of discs outside of the two groupings of ten in the blank space to the left of the word "ones."
9. Check: Count the remaining discs in a different order and ensure that the total is the same.
10. Point to the circled groups and count them in turn; write the number two in the tens place.
11. Write the two digits previously written on the right hand side of the equals sign, and in the same order from left to right.

Alternate Approaches:
e.1 One could use the same argument as above, but be more specific about the counting order imposed on the discs. Counting by row or column can be a natural way to try and order an array of objects, and though the discs in the image do not line up perfectly, a row or column argument could possibly be used.
e.2 One could mark the objects with colored pens, and use different colors for different groupings (one color for the first group of ten, another for the second, and a third for the remaining discs). This makes sorting by attribute perhaps a bit easier, since distinguishing colors is something any child can be familiar with. The overall structure of such a solution would not differ markedly from the textbook solution.

Example Alternate Solution Strategy #1
1. Subitize groupings of 2 or 3 until five objects can be identified from the larger collection. Use fingers to help keep track of the running count.
2. Once five objects can be identified, circle them as one group of five. Count out loud the number "five."
3. Check: Once this grouping has been circled, count the discs inside one by one. Ensure the count is the same.
4. Repeat this process. Count out loud by five to keep track of the increasing count.
5. Count the discs and write the number corresponding to the total on the right hand side of the equation on the bottom right.
6. Determine the number of groups of five it takes to make one group of ten, and find as many groups of ten as possible.
7. Write the number corresponding to the total number of groups of ten discs in the blank space to the left of the word "tens."
8. Write the number corresponding to the total number of discs outside of the two groupings of ten in the blank space to the left of the word "ones."

Below is a description of a second alternate solution strategy.

Example Alternate Solution Strategy #2
1. Select any disc you please in the picture and write the number one on it.
2. Select a different disc and write the number two on it.
3. Repeat this process by successively selecting discs you have not written on and writing the successor to the number you wrote on the previous disc. Reaching the number ten, stop and circle the discs with numbers written on them.
4. Count and mark ten discs and circle the discs to collect them as one group of ten.
5. Check: To be sure ten discs have been counted, find the discs corresponding to the numbers from one to ten in your ordering of the picture.
6. Repeat this process once more. Successively select discs outside of the circled group and write numbers on them, starting with eleven and increasing by one.
7. Reaching the number twenty, stop and circle the discs with two-digit numbers on them starting from 11.
8. Check: To be sure ten discs have been counted, find the discs corresponding to the numbers from eleven to twenty in your ordering of the picture.
9. Repeat this process once more. Successively select discs outside of both circled groups and write numbers on them, starting with twenty-one and increasing by one.
10. Check: Count the remaining discs in a different order and ensure that the count is the same.
11. On the left hand side of the equation at the bottom, fill in the blanks with the appropriate digits.

These three solution strategies, and two alternate approaches for the textbook solution, lay the foundation for the rest of the extraction of the is exercise problem.

During Phase 2, the extraction process also supports further analysis by anticipating errors, questions, thinking through what questions might lead the student to discoveries, etc. Below is a sample of the errors, questions, and resolutions identified by this analyst.

| Example Potential Errors | Example Resolutions to Errors | Example Question List | Example Responses to Questions |
|---|---|---|---|
| Marks multiple discs | Ask the student to try with the pencil. again, clearly and carefully marking one of the discs pictured. | | |
| Forgets to count out loud. | Remember to count out loud. | | |
| Begins counting with a number other than one. | Always count from one to determine the size of a set; otherwise your total can be too large. | | |
| Marks multiple discs with the pencil. | Ask the student to try again, clearly and carefully marking one of the discs pictured. | | |
| Marks a previously marked disc. | Double counting can make your total too high, so mark discs only once. | | |
| Marks a far away disc. | It can be easier to group the discs later if you count discs closest together. | | |
| The drawn circle includes unmarked discs. | The circle cannot enclose any unmarked discs since they may not be counted. | Student: We circle the group of 10 we counted. | Circling the group makes it clear we have already counted the discs inside, so we may set them aside and move on to the discs not yet counted. |
| Begins counting with a number other than one. | Count from one to determine the size of a set; otherwise your total can be too large. | Student: We count from the number one again | It may be easier to start the count at one several times rather than count on from ten, at least initially. |
| Counts the wrong number (because of skipping or because of a violation of the ordered numbers principle). | The order of the first ten counting numbers is: 1, 2, 3, 4, 5, 6, 7, 8, 9, 10. This order must be preserved as you count the size of a collection. | | |
| Has difficulty understanding the connection between the count and the written number. | Digits from 0 to 9 can be used to express quantity. If student has trouble because of place value, a simpler problem can be asked where the set has a small size. | Student: I write the number in this place. I write the number five. | Since a disc represents one "one," circled groups represent one "ten" and the remaining group represents the number of ones in the answer. |
| Writes the digits out of order. | This may be an honest mistake or a place value issue. Does the student understand the difference between 12 and 21, for instance? | Teacher: If you write the digits in the opposite order, think about the number you would be representing. | Switching place value gives us the number 52, a much larger number. |
| Writes the number incorrectly. | Provide extra practice with the mechanics of writing the digits. | | |

Phase 3. In the third phase of extraction, math analysts detail the solution strategies they have identified. It can be common for an analyst to identify several steps per summarized strategy line written in Phase 2. Below is a list of the detailed solution juxtaposed with the original strategy outlined in Phase 2. The alternate strategies received similar treatment.

| Example Textbook Solution Strategy | Example Detailed Solution |
|---|---|
| Select a disc from the picture, mark it, and count out loud the number one. | Mark any disc in the picture with your pencil. |
| | Count out loud the number "one." |
| From the marked disc, mark an adjacent disc and count out loud the number two. | Mark a disc near the one you have just marked. |
| | Count out loud the number "two." |
| Repeat this process by successively marking unmarked adjacent discs and stating the successor to the previously stated number. | Repeat this process by successively marking unmarked adjacent discs and stating the successor to the previously stated number. Continue this process through the number five. |
| Count and mark ten discs, and circle the discs to collect them as one group often. | Continue this process through the number ten. |
| | Circle the discs to collect them as one group of ten. |
| Check: Once you've circled a group of discs, count the discs inside the circle in a different order. Ensure the count is the same. | Check: Once you've circled a group of discs, count the discs inside the circle in a different order. Ensure the count is the same. |
| Repeat this process to produce another group of ten discs, so that no disc in the second group is part of the first group. Be sure to start your count once more with the number one. | Mark any disc in the picture outside of the circled group with your pencil. |
| | Count out loud the number "one." |
| | Mark a disc near the one you have just marked and still outside the previously circled group. |
| | Count out loud the number "two." |
| | Repeat this process by successively marking unmarked adjacent discs outside of the previously circled group and stating the successor to the previously stated number. Continue this process through the number five. |
| | Continue this process through the number ten. |
| | Count out loud the number "two." |
| | Circle the discs to collect them as a second group of ten. |
| Repeat the same counting process once more until the discs have been marked and counted. | Mark any disc in the picture outside of the two circled groups with your pencil. |
| | Count out loud the number "one." |
| | Mark a disc near the one you have just marked and still outside the previously circled groups. |
| | Count out loud the number "two." |
| | Repeat this process by successively marking unmarked adjacent discs outside of the previously circled groups and stating the successor to the previously stated number. Continue this process through the number five. |
| | Count out loud the number "two." |
| Write the number corresponding to the total number of discs outside of the two groupings of ten in the blank space to the left of the word "ones." | In the blank space to the left of the word "ones" at the bottom of the page, write the digit corresponding to the number five. |
| Check: If you count the remaining discs in a different order, do you obtain the same total? | Check: If you count the remaining discs in a different order, ensure the count is the same. |
| Point to the circled groups and count them in turn; write the number two in the tens place. | Point to the circled groups and count them in turn. |
| | In the blank space to the left of the word "tens" at the bottom of the page, write the digit corresponding to the number two. |

| Example Textbook Solution Strategy | Example Detailed Solution |
|---|---|
| Write the two digits previously written on the right hand side of the equals sign, and in the same order from left to right. | Write the number 25 on the right hand side of the equality. |

Phase 4. In Phase 4, analysts perform two operations to draw concept line items from foregoing analyses. Analysts summarize the lines under detailed solutions into short phrases called concept groups. Below is a list of the concept groups developed by the analyst working on this Kindergarten exercise with relevant citations.

| Example Concept Groups In Alphabetical Order | Example Citations |
|---|---|
| Analogical representation of quantitative meaning | Number Sense, p. 74 |
| Arithmetic Cognitive Capacities | Where Mathematics Comes From, p. 51 |
| Composed Units | http://ed.ted.com/lessons/one-is-one-or-is-it |
| Counting | Dr. Wright's Kitchen Table Math, Book 1, p. 1 |
| Counting from five to six (2624 of FIG. 26B) | Original Analysis |
| Counting on vs. Counting from One (2627 of FIG. 26B) | Dr. Wright's Kitchen Table Math, Book 1, p. 7 |
| Counting up to five | Dr. Wright's Kitchen Table Math, Book 1, p. 8 |
| Counting up to ten | Dr. Wright's Kitchen Table Math, Book 1, p. 9 |
| Double-counting | http://en.wikipedia.org/wiki/Double_counting_(fallacy) |
| Emergent Counting | Early Numeracy, Wright, p. 20, 22 |
| Equals sign (2648 of FIG. 26D) | Penguin Dictionary, Nelson, p. 147 |
| Equation | Penguin Dictionary, Nelson, p. 147 |
| Exhaustion-Detection Capacity | Where Mathematics Comes From, p. 51 |
| Expression | Penguin Dictionary, Nelson, p. 161 |
| Facile concept of ten | Early Numeracy, Wright, p. 20, 22 |
| Grouping - Initial | Early Numeracy, Wright, p. 20, 28 |
| Grouping by ten (2633 of FIG. 26C) | Original Analysis |
| Initial Concept of Ten | Early Numeracy, Wright, p. 20, 22 |
| Intermediate concept of ten | Early Numeracy, Wright, p. 20, 22 |
| Language-mediated representation of number | Number sense, p. 34, 35 |
| Last Number Principle | Dr. Wright's Kitchen Table Math, Book 1, p. 5 |
| Number Writing | Dr. Wright's Kitchen Table Math, Book 1, p. 12 |
| Numeral Identification | Early Numeracy, Wright, p. 17, 24 |
| Object Classification (2603 of FIG. 26A) | Elementary Math Teacher's Book of Lists, p. 51 |
| One-to-One Principle | Dr. Wright's Kitchen Table Math, Book 1, p. 5 |
| Ones Place | Original Analysis |
| Ordered Numbers Principle | Dr. Wright's Kitchen Table Math, Book 1, p. 5 |
| Ordering a collection by column | Original Analysis |
| Ordering a collection by row | Original Analysis |
| Ordering capacity | Where Mathematics Comes From, p. 51 |
| Pairing capacity | Where Mathematics Comes From, p. 51 |
| Place-Value Principle (2658 of FIG. 26E) | Number Sense, p. 98 |
| Quantitative Meaning | Number Sense, p. 74, 78 |
| Recounting | Original Analysis |
| Sorting by One Attribute (2609 of FIG. 26A) | Elementary Math Teacher's Book of Lists, p. 51 |
| Sorting by Two Attributes | Elementary Math Teacher's Book of Lists, p. 51 |
| Spatial Distance Relationships | Elementary Math Teacher's Book of Lists, p. 57 |
| Successor to a Number | http://mathworld.wolfram.com/PeanosAxioms.html |
| Tens Place | Original Analysis |
| Universal Principle | Dr. Wright's Kitchen Table Math Book 1, p. 5 |
| Unordered Objects Principle | Dr. Wright's Kitchen Table Math, Book 1, p. 5 |
| Word Form of a Number | Original Analysis |

In another operation, the analyst writes finely granular concept line items. From the Kindergarten exercise problem, this analyst drew 549 concept line items from the textbook solution strategy, the two alternate solutions to the textbook problem, and the two alternate solution strategies. Below is an example list of the 549 concept line items with relevant citations.

1. "One more than" a number is the same as the successor to the number. (Analyst's Original Work)

2. "One more than" is used in counting on to find the next number. (Dr. Wright's Kitchen Table Math, Book 1, p. 7)

3. "One, two, three, . . . " is the beginning of the order used to count. (Dr. Wright's Kitchen Table Math, Book 1, p. 5)

4. A base twelve system is also called a duodecimal system. (Penguin Dictionary, Nelson, p. 136)

5. A cardinal number refers to the size of the entire collection of objects. (Young Children Continue to Reinvent Arithmetic—2nd Grade: Implications of Piaget's Theory, Kamii and Joseph, p. 7) (2628 of FIG. 26B)

Figure 13:
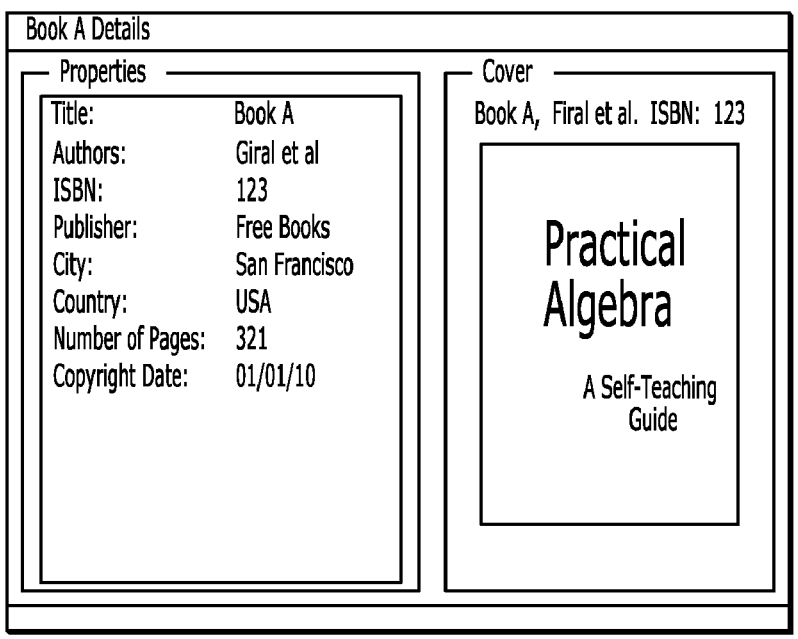
FIG. 13 is an exemplary screen shot of a book details component of the Ontology Editor System's graphic user interface.

6. A collection of objects of differing color can be sorted by color. (Elementary Math Teacher's Book of Lists, p. 51) (2608 of FIG. 26A)
7. A collection sorted by color will consist of smaller sub-collections composed of objects of a single color. (Elementary Math Teacher's Book of Lists, p. 51)
8. A column of objects is a line of objects arrayed from top to bottom. (Analyst's Original Work)
9. A counting number can refer to the size of a set and the order of an object in an enumeration of the set. (Young Children Continue to Reinvent Arithmetic—2nd Grade: Implications of Piaget's Theory, Kamii and Joseph, p. 7)
10. A counting number is one of the positive integers 1, 2, 3, 4, . . . (Nelson, Penguin Dictionary, p. 95)
11. A counting order is an organization of a collection wherein each object can be easily counted one after the other. (Analyst's Original Work)
12. A digit is a symbol used to write numbers. (Nelson, Penguin Dictionary, p. 124) item 2642 of FIG. 26D
13. A finite sequence is a sequence in one-to-one correspondence with a finite set. (Nelson, Penguin Dictionary, p. 398)
14. A finite set is a set whose cardinality is some counting number. (http://en.wikipedia.org/wiki/Finite_set)
15. A group of units can itself be considered as a unit. (http://ed.ted.com/lessons/one-is-one-or-is-it)
16. A left to right array is also called a horizontal array. (http://en.wikipedia.org/wiki/Horizontal_plane)
17. A mathematical expression is a finite combination of symbols with some collectively understood meaning. (http://en.wikipedia.org/wiki/Expression_(mathematics))
18. A number between twenty and one hundred is named with two words. (Elementary Math Teacher's Book of Lists, p. 116)
19. A number system is a way to write numbers. (Nelson, Penguin Dictionary, p. 314)
20. A number system where the relative positions of digits indicate groupings is said to possess positional notation. (Nelson, Penguin Dictionary, p. 314)
21. A numeral system is a way to express numbers in writing. (http://en.wikipedia.org/wiki/Numeral_system)
22. A one-to-one correspondence is a pairing between two sets with each element in one set associated to exactly one element in the other set. (Nelson. Penguin Dictionary, p. 319)
23. A physical quantity is a quantifiable and reproducible characteristic of matter or energy. (Penguin Dictionary, Nelson, p. 340)
24. A place value with a digit of zero corresponds to the absence of quantity for the given place. (http://en.wikipedia.org/wiki/O_(number))
25. A row of objects is a line of objects arrayed from left to right. (Analyst's Original Work)
26. A running total is a sum to which the value of any additional number is successively added. (http://en.wikipedia.org/wiki/Running_total.)
27. A sequence is a succession of terms in one-to-one correspondence with the counting numbers. (Nelson, Penguin Dictionary, p. 398)
28. A set can be subitized more easily if its spatial arrangement is relatively simple. (http://gse.buffalo.edu/fas/clements/files/Subitizing.pdf)
29. A set is a collection of objects. (Nelson, Penguin Dictionary, p. 399)
30. A statement of equality is made with an equals sign. (Penguin Dictionary, Nelson, p. 147) item 2649 of FIG. 26D
31. A sub-collection of a collection is a smaller collection containing some, but not necessarily all, of the objects in the original collection. (Analyst's Original Work)
32. A sub-collection of a collection is also called a subset of a set. (Analyst's Original Work)
33. A top to bottom array is also called a vertical array. (http://en.wikipedia.org/wikiNertical_direction)
34. A two-digit number with words explicitly and linguistically indicates the place value corresponding to each digit. (Analyst's Original Work)
35. A two-digit number displays quantity in terms of the number of tens and number of ones. (Early Numeracy, Wright, p. 17, 24)
36. A unit is a standard used to measure a physical quantity. (Penguin Dictionary, Nelson, p. 453)
37. A unit made up of other units is called a composed unit. (http://ed.ted.com/lessons/one-is-one-or-is-it) (2612 of FIG. 26A)
38. A unit of measurement is a standard used to measure some physical quantity. (http://en.wikipedia.org/wiki/Units_measurement)
39. A useful fixed size for a counted and grouped sub-collection is ten. (Analyst's Original Work)
40. A way to express numbers in writing is also called a system of numeration. (http://en.wikipedia.org/wiki/Numeral_system)
41. Adding objects to a collection will increase its size. (Analyst's Original Work)
42. Addition is a mathematical operation on pairs of numbers. (Penguin Dictionary, Nelson, p. 5)
43. Addition is one example of a binary operation. (Penguin Dictionary, Nelson, p. 5)
44. Addition of whole number addends represents collecting objects into a larger collection. (http://en.wikipedia.org/wiki/Addition)
45. After the Initial Concept of Ten is the Intermediate Concept of Ten. (Early Numeracy, Wright, p. 20, 22)
46. After the Intermediate Concept of Ten is the Facile Concept of Ten. (Early Numeracy, Wright, p. 20, 22
47. After the number one, additional fingers are raised to represent a larger count. (http://en.wikipedia.org/wiki/Finger_counting)
48. After the word "tens," in a two-digit number with words the ones digit is written, followed by the number "ones." (Analyst's Original Work)
49. An equation has a left hand side and a right hand side of equal value. (Analyst's Original Work)
50. An equation is a statement of equality between two mathematical expressions. (Penguin Dictionary, Nelson, p. 147)
51. An order used to count objects is a selection of one object as first, one object as second, and so on. (Analyst's Original Work)
52. An ordinal number refers to the order of a specific object in a collection. (Young Children Continue to Reinvent Arithmetic—2nd Grade: Implications of Piaget's Theory, Kamii and Joseph, p. 7) item 2625 of FIG. 26B
53. Another term for the addition of two equal numbers is twin addition. (Dr. Wright's Kitchen Table Math Book 1, p. 52)
54. Any number between ten and ninety-nine is represented by a two-digit numeral. (Elementary Math Teacher's Book of Lists, p. 116)

55. Assigning multiple groupings to one finger may violate the one-to-one principle and result in an erroneous total. (Analyst's Original Work)
56. Associating more than one counting number to a toe is a violation of the one to one principle. (Analyst's Original Work)
57. Associating more than one toe to a counting number is a violation of the one to one principle. (Analyst's Original Work)
58. At the level of Facile Concept of Ten, the student can perform addition and subtraction with both ones and composed units of tens. (Early Numeracy, Wright, p. 20, 22)
59. At the level of initial Concept of Ten, students are incapable of viewing ten as a compound unit. (Early Numeracy, Wright, p. 20, 22)
60. At the level of Intermediate Concept of Ten, the student can view ten as a compound unit but frequently needs to decompose it for purposes of calculation. (Early Numeracy, Wright, p. 20, 22)
61. Base Ten Arithmetical Strategies are grouped into three levels of development. (Early Numeracy, Wright, p. 20, 22)
62. Because "-teen" and "-ty" are similar sounds, it is easy to confuse words ending with "-teen" with words ending in "-ty." (Dr. Wright's Kitchen Table Math, Book 1, p. 20)
63. Between thirteen and nineteen, the number words follow a somewhat predictable pattern. (Elementary Math Teacher's Book of Lists, p. 116)
64. Between twenty and one hundred, the words for numbers follow a predictable pattern. (Elementary Math Teacher's Book of Lists, p. 116)
65. Beyond four objects, subitization becomes more difficult to perform. (Number Sense, p. 68/Where Mathematics Comes From, p. 15)
66. Both hands combine to provide ten fingers in total. (Dr. Wright's Kitchen Table Math, Book 1, p. 9)
67. By the last number principle, the last item determines the cardinality of a set. (Dr. Wright's Kitchen Table Math, Book 1, p. 5)
68. By the last number principle, the size of a collection is the number of the last item counted in the collection. (Dr. Wright's Kitchen Table Math, Book 1, p. 5)
69. By the place value principle, the leftmost digit in a number corresponds to the greatest place value. (Number Sense, p. 98)
70. By the place value principle, the rightmost digit in a number corresponds to the smallest place value. (Number Sense, p. 98)
71. Canonical methods of dactylonomy vary by culture. (http://en.wikipedia.org/wiki/Finger_counting)
72. Cardinal-number assignment is the ability to apply the last number principle. (Where Mathematics Comes From, p. 51)
73. Checking one's work helps to identify mistakes. (Analyst's Original Work)
74. Circling five counted ones identifies them as one counted five. (Analyst's Original Work)
75. Circling ten counted ones identifies them as one counted ten. (Analyst's Original. Work)
76. Collections of objects with different attributes will have the same count if the number of objects in each collection is the same. (Dr. Wright's Kitchen Table Math Book 1, p. 5)
77. Color is one attribute used to distinguish objects in a collection. (Elementary Math Teacher's Book of Lists, p. 51)
78. Components of a set are viewed as parts of a larger whole with conceptual subitization. (http://www2.research.uky.edu/pimser/p12 mso/pub/2008-09Archives/Math Leadership Support Network 2008-09/September 08/summary_of_subitizing.doc)
79. Composed units can themselves to be grouped together to form new composed units. (http://ed.ted.com/lessons/one-is-one-or-is-it)
80. Conceptual subitization aids in the development of number sense and arithmetic ability. (http://gse.buffalo.edu/fas/clements/files/Subitizing.pdf)
81. Conceptual subitization can be used to more quickly determine the size of a set. (http://gse.buffalo.edu/fas/clements/files/Subitizing.pdf)
82. Conceptual subitization is the ability to recognize a collection both as a composition of units and as a complete whole. (http://gse.buffalo.edu/fas/clements/files/Subitizing.pdf)
83. Conceptual subitization requires accurate enumeration skills. (http://gse.buffalo.edu/fasklements/files/Subitizing.pdf)
84. Continued counting after the last item may signal an inability to detect when a collection has been exhausted. (Where Mathematics Comes From, p. 51)
85. Count a horizontal array of objects by moving from one end to the other while counting on. (Analyst's Original Work)
86. Count a vertical array of objects by moving from one end to the other while counting on. (Analyst's Original Work)
87. Counted and grouped sub-collections of size ten are useful because each one increases the digit of the tens place in the cardinality of the set by one. (Analyst's Original Work)
88. Counted and grouped sub-collections of size ten do not affect the digit in the ones place of the cardinality of the set. (Analysts Original Work)
89. Counted groups of ten are particularly useful because we can then count groups of tens and ones separately. (Analyst's Original Work)
90. Counting a collection again is called recounting. (Analyst's Original Work)
91. Counting a collection of objects does not depend on the specific types of objects in the collection. (Dr. Wright's Kitchen Table Math Book 1, p. 5)
92. Counting by 5 is frequently used when making tally marks. (http://en.wikipedia.org/wiki/Tally_marks)
93. Counting by column is convenient if the objects are arranged in columns. (Analyst's Original Work)
94. Counting by row is convenient if the objects are arranged in rows. (Analyst's Original Work)
95. Counting each of two collections of size at most five with opposite hands is a model of counting from one each time. (Analyst's Original Work)
96. Counting from one means the count resets to one at the beginning of each counted and grouped sub-collection. (Analyst's Original Work) (2623 of FIG. 26B)
97. Counting from one will give the cardinality of a set. (Analyst's Original Work)
98. Counting in groups is a useful strategy when a large collection of objects is being counted. (Dr. Wright's Kitchen Table Math Book 1, p. 7)
99. Counting in groups is also called skip counting. (Dr. Wright's Kitchen Table Math Book 1, p. 68)

100. Counting is the process of enumeration. (Oxford Dictionary, Clapham and Nicholson, p. 101)
101. Counting is the same as group counting when the group has size one. (Analyst's Original Work)
102. Counting larger sets with tally marks is not always feasible because of the number of tallies required. (http://en.wikipedia.org/wiki/Tally_marks)
103. Counting next from the counted and grouped or counted but not yet grouped sub-collections will result in double-counting. (Analyst's Original Work)
104. Counting objects one after the other is a good way to adhere to the one-to-one principle. (Dr. Wright's Kitchen Table Math, Book 1, p. 5) item 2621 of FIG. 26B
105. Counting on can be used to count multiple columns by starting from the beginning of a new column when the end of the current column is reached. (Analyst's Original Work)
106. Counting on can be used to count multiple rows by starting from the beginning of a new row when the end of the current row is reached. (Analyst's Original Work)
107. Counting on from each sub-collection requires knowledge of many counting numbers if the collection is large. (Analyst's Original Work)
108. Counting on is the process of counting when the starting number is larger than one. (Dr. Wright's Kitchen Table Math Book 1, p. 7)
109. Counting on means each counting number is the successor to the previous number. (Dr. Wright's Kitchen Table Math, Book 1, p. 7)
110. Counting stops when there are no objects left in the uncounted sub-collection. (Analyst's Original Work)
111. Counting to five proceeds in the order one, two, three, four, five. (Dr. Wright's Kitchen Table Math, Book 1, p. 8)
112. Counting to ten proceeds in the order one, two, three, four, five, six, seven, eight, nine, ten. (Dr. Wright's Kitchen Table Math, Book 1, p. 9)
113. Counting two collections of total size at most five with the same hand is a model of counting on. (Analyst's Original Work)
114. Counting verbally is a good way to gain mastery of the words used to describe quantities. (Dr. Wright's Kitchen Table Math, Book 1, p. 8)
115. Dactylonomy in parts of Asia allow for counting up to twelve on a single hand. (http://en.wikipedia.org/wiki/Finger_counting)
116. Digits define a number system. (Nelson, Penguin Dictionary, p. 314)
117. Digits with reversed orientation may be written upside down or mirrored. (Dr. Wright's Kitchen Table Math, Book 1, p. 14)
118. Directional space relationships describe the relative directions between two objects. (Elementary Math Teacher's Book of Lists, p. 57)
119. Distance space relationships describe the distance between two objects. (Elementary Math Teacher's Book of Lists, p. 57)
120. Distinguishing characteristics of an object are differences between the object and other objects in a collection. (Elementary Math Teacher's Book of Lists, p. 51) (2602 of FIG. 26A)
121. Double counting can be avoided by having a strong memory capacity. (Where Mathematics Comes From, p. 51)
122. Double counting can be avoided by marking objects clearly. (http://en.wikipedia.org/wiki/Double_counting_(fallacy))
123. Double counting will likely result in an erroneous total for the size of a collection. (http://en.wikipedia.org/wiki/Double_counting_(fallacy))
124. Double-check a count by counting in a different order. (Analyst's Original Work)
125. Double-counting will occur if any of the counted and grouped sub-collections have objects in common. (Analyst's Original Work)
126. Each finger must correspond to no more than one object when counting with fingers. (Analyst's Original Work)
127. Each group of ten between one and ten has its own name. (Elementary Math Teacher's Book of Lists, p. 116)
128. Each number word between thirteen and nineteen ends in -teen. (Elementary Math Teacher's Book of Lists, p. 116)
129. Each object left over after counting and grouping by ten as many times as possible increases the digit in the ones place in the cardinality of the set by one. (Analyst's Original Work)
130. Each tally represents one object in a count. (http://en.wikipedia.org/wiki/Tally_marks)
131. Each teen number word consists of one ten and a number of ones. (Elementary Math Teacher's Book of Lists, p. 116)
132. Eastern European dactylonomy differs from English-speaking dactylonomy. (http://en.wikipedia.org/wiki/Finger_counting)
133. Eastern European dactylonomy differs slightly from Western European dactylonomy. (http://en.wikipedia.org/wiki/Finger_counting)
134. Eight groups of ten are called eighty. (Elementary Math Teacher's Book of Lists, p. 116)
135. Eight is the number obtained by doubling four. (Dr. Wright's Kitchen Table Math. Book 1, p. 52)
136. Eighteen is the number obtained by doubling nine. (Dr. Wright's Kitchen Table Math Book 1, p. 52)
137. Eighty is the same as eight tens and zero ones. (Analyst's Original Work)
138. Eighty is the same as seven tens and ten ones. (Analyst's Original Work)
139. Emergent Counting is a stage wherein a student cannot count visible items. (Early Numeracy, Wright, p. 20, 22)
140. Enumeration of a set is a complete and ordered listing of the objects in the set. (http://en.wikipedia.org/wiki/Enumeration)
141. Equal numbers represent the same value and have the same number word. (Analyst's Original Work)
142. Equal values can be joined together by an equation. (Analyst's Original Work) (2641 of FIG. 26C)
143. Euclidian space relationships allow us to describe the relative locations of objects. (Elementary Math Teacher's Book of Lists, p. 57)
144. Examples of directional space relationships include left, right, down, and up. (Elementary Math Teacher's Book of Lists, p. 57)
145. Examples of distance space relationships include near, midway, and far. (Elementary Math Teacher's Book of Lists, p. 57)
146. Examples of distinguishing characteristics include color, shape, and size. (Elementary Math Teacher's Book of Lists, p. 51) (2601 of FIG. 26A)

147. Examples of positional space relationships include above, behind, inside, and outside. (Elementary Math Teacher's Book of Lists, p. 57)
148. Examples of temporal and kinesthetic patterns are finger patterns, rhythm patterns, and audio patterns. (http://gse.buffalo.edu/fas/clements/files/Subitizing.pdf)
149. Facility in conversion between digits and the quantities they represent is called analogical representation of quantitative meaning. (Number Sense, p. 74)
150. Failure to combine the totals from each counted and grouped collection when tabulating the total will result in an insufficiently small total. (Analyst's Original Work)
151. Fif- and five-are similar but distinct sounds. (Elementary Math Teacher's Book of Lists, p. 116)
152. Fifty is the same as five tens and zero ones. (Analyst's Original Work)
153. Fifty is the same as four tens and ten ones. (Analyst's Original Work)
154. Figurative Counting is a stage wherein a student can count concealed items, but may add unnecessary steps. (Early Numeracy, Wright, p. 20, 22)
155. Five can be represented by extending all of the fingers on one hand. (Dr. Wright's Kitchen Table Math, Book 1, p. 8)
156. Five groups of ten are called fifty. (Elementary Math Teacher's Book of Lists, p. 116)
157. Five ones marked as counted can be collected into one group of five. (Analyst's Original Work)
158. Flash numbers is a game used to practice addition with sums up to ten. (Dr. Wright's Kitchen Table Math Book 1, p. 21)
159. Flash numbers is played by raising some fingers on each hand and asking a student to recognize the total number of fingers as quickly as possible. (Dr. Wright's Kitchen Table Math Book 1, p. 21)
160. For a number word ending in "-ty," the beginning of the word determines the number of tens. (Dr. Wright's Kitchen Table Math, Book 1, p. 20)
161. For a number word ending in "-ty," the number of ones is always zero. (Dr. Wright's Kitchen Table Math, Book 1, p. 20)
162. For any pair of numbers, the operation of addition returns a third number. (Penguin Dictionary, Nelson, p. 5)
163. For larger counts, previously raised fingers remain raised. (http://en.wikipedia.org/wild/Finger_counting)
164. For sub-collections of equal size, counting in groups begins by stating the number of objects in one sub-collection. (Analyst's Original Work)
165. For two digit numbers, n tens m ones is only the same as m tens n ones if n and m are the same digit. (Analyst's Original Work)
166. Forty is the same as four tens and zero ones. (Analyst's Original Work)
167. Forty is the same as three ten and ten ones. (Analyst's Original Work)
168. Four groups often are called forty. (Elementary Math Teacher's Book of Lists, p. 116)
169. Four is the number obtained by doubling two. (Dr. Wright's Kitchen. Table Math. Book 1, p. 52)
170. Fourteen is the number obtained by doubling seven. (Dr. Wright's Kitchen Table Math Book 1, p. 52)
171. From one to five, each finger on one hand can be put in one-to-one correspondence with objects in a collection. (Dr. Wright's Kitchen Table Math, Book 1, p. 8)
172. Given multiple collections, counting each by counting on from the previous total will give the total for all collections. (Analyst's Original Work)
173. Given two collections, counting the second by counting on from the size of the first will give the total count of the two collections. (Analyst's Original Work)
174. Grouping by fives is natural because we have five fingers on each hand. (Analyst's Original Work)
175. Grouping by location is more difficult for objects far from each other. (Analyst's Original Work)
176. Groups of five can be easily collected into groups of ten. (Analyst's Original Work)
177. Groups of ten units are particularly useful for counting because groups of ten correspond to digits in the tens place. (Early Numeracy, Wright, p. 20, 28)
178. Hash marks are a form of numeral used for counting smaller sets. (http://en.wikipedia.org/wiki/Tally_marks)
179. Hierarchical inclusion is the ability to mentally include smaller numbers inside of larger numbers. (Young Children Continue to Reinvent Arithmetic—2.sup.nd Grade: implications of Piaget's Theory, Kamii and Joseph, p. 7)
180. Identical objects can be distinguished by marking one of the objects with a pen or pencil. (Analyst's Original Work)
181. Identified mistakes should be corrected before work is submitted. (Analyst's Original Work)
182. Identifying the correct digits corresponding to a count is called numeral recognition. (Early Numeracy, Wright, p. 24)
183. If a circled sub-collection is larger than desired, group again but collect fewer objects. (Analysts Original Work)
184. If a circled sub-collection is smaller than desired, group again but collect more objects. (Analyst's Original Work)
185. If a collection of objects has been labeled from one to n following the ordered numbers principle, then the number of objects is n. (Analyst's Original Work)
186. If a count does not follow the ordered numbers principle, the total obtained will likely be incorrect. (Analyst's Original Work)
187. If a large collection of objects is divided into smaller sub-collections of equal sizes, the number of objects is determined by the number of sub-collections. (Analyst's Original Work)
188. If any of the counted and grouped sub-collections have objects in common, regroup the collections so they do not share objects. (Analyst's Original Work)
189. If collections are counted from one, the total from all collections is found by combining the counts of each of the collections. (Analyst's Original Work)
190. If counting from one is used after each counted and grouped sub-collection, the last number spoken is smaller than the ordinal number of the last item. (Dr. Wright's Kitchen Table Math, Book 1, p. 5)
191. If counting on from one is used to count, the last number spoken is the ordinal number of the last item. (Dr. Wright's Kitchen Table Math, Book 1, p. 5) (2629 of FIG. 26B)
192. If different orders produce different counts, at least one of the counts must be incorrect. (Analyst's Original Work)
193. If different orders produce the same counts, it is more likely the count is correct. (Analyst's Original Work)

194. If fingers on opposite hands are raised, bring the hands together and count to find the total. (Dr. Wright's Kitchen Table Math Book 1, p. 28)
195. If marked poorly when counted, objects in a collection may be counted more than once or not at all. (Analyst's Original Work)
196. If remembering subitized collections with the memory capacity is difficult, mark the objects to clearly identify them as counted. (Analyst's Original Work)
197. If subitization is difficult, objects in a collection can be counted one by one to find the total size. (Analyst's Original Work)
198. If the "-teen" sound in a teen number word is changed to a "-ty," the number corresponding to the word changes. (Dr. Wright's Kitchen Table Math, Book 1, p. 20)
199. If the counting order for a particular group is difficult to remember, try counting by one instead. (Analyst's Original Work)
200. If the first object in a collection is associated to a number other than one, the total number of objects counted will be incorrect. (Analyst's Original Work)
201. If the group has size n, the next number when counting in groups is n more than the previous number. (Analyst's Original Work)
202. If the ordered numbers principle is violated, the largest number associate to a collection need not represent the size of the collection. (Analyst's Original Work)
203. If the ordering of the digits in the word form of a number is changed, the number represented will usually change as well. (Analyst's Original Work)
204. If toes are used to count, each toe should be associated to only one counting number. (Analyst's Original Work)
205. If two collections of a total size at most five are counted with the same hand, the total size is equal to the number of fingers raised. (Dr. Wright's Kitchen Table Math Book 1, p. 8)
206. If two digits in a number are the same, switching them does not change the quantity represented by the number. (http://en.wikipedia.org/wiki/Positional_notation)
207. If you count from one after a collection has been grouped, be sure to combine the totals from each counted and grouped collection when tabulating the final total. (Analyst's Original Work)
208. In a two digit number with words, the tens digit is written first, followed by the word "tens." (Analyst's Original Work)
209. In a two-digit whole number, the left digit represents the number of tens. (http://en.wikipedia.org/wiki/Positional_notation)
210. In a two-digit whole number, the right digit represents the number of ones. (http://en.wikipedia.org/wiki/Positional_notation)
211. In a unary numeral system, each counted object is represented by its own marking. (http://en.wikipedia.org/wiki/Unary_numeral_system)
212. In Eastern European dactylonomy, fingers are lowered to indicate an increasing count. (http://en.wikipedia.org/wiki/Finger_counting)
213. In emergent numeral identification, the student cannot correctly attach words to digits. (Early Numeracy, Wright, p. 17, 24)
214. In English-speaking cultures, the index finger is typically raised to represent the number one. (http://en.wikipedia.org/wiki/Finger_counting)
215. In English-speaking cultures, the little finger is typically raised to represent the number four. (http://en.wikipedia.org/wiki/Finger_counting)
216. In English-speaking cultures, the middle finger is typically raised to represent the number two. (http://en.wikipedia.org/wiki/Finger_counting)
217. In English-speaking cultures, the ring finger is typically raised to represent the number three. (http://en.wikipedia.org/wiki/Finger_counting)
218. In English-speaking cultures, the thumb is typically raised to represent the number five. (http://en.wikipedia.org/wiki/Finger_counting)
219. In the absence of mathematical processes, infants and animals are still able to discriminate small numbers of objects with perceptual subitization. (http://gse.buffalo.edu/fas/clements/files/Subitizing.pdf)
220. In the fifth stage of numeral identification, the student can correctly attach words to numbers up to one thousand. (Early Numeracy, Wright, p. 17, 24)
221. In the four fingers of a single hand, there are twelve bones. (http://en.wikipedia.org/wiki/Finger_counting)
222. In the fourth stage of numeral identification, the student can correctly attach words to numbers up to one hundred. (Early Numeracy, Wright, p. 17, 24)
223. In the second level of numerical identification, the student can correctly attach words to numbers up to ten. (Early Numeracy, Wright, p. 17, 24)
224. In the third stage of numeral identification, the student can correctly attach words to numbers up to twenty. (Early Numeracy, Wright, p. 17, 24)
225. In Western Europe, the index finger is typically raised to represent the number two. (http://en.wikipedia.org/wiki/Finger_counting)
226. In Western Europe, the little finger is typically raised to represent the number five. (http://en.wikipedia.org/wiki/Finger_counting)
227. In Western Europe, the middle finger is typically raised to represent the number three. (http://en.wikipedia.org/wiki/Finger_counting)
228. In Western Europe, the ring finger is typically raised to represent the number four. (http://en.wikipedia.org/wiki/Finger_counting)
229. In Western Europe, the thumb is typically raised to represent the number one. (http://en.wikipedia.org/wiki/Finger_counting)
230. Inclusion of smaller numbers inside of larger numbers allows us to distinguish between cardinal numbers and ordinal numbers. (Young Children Continue to Reinvent Arithmetic—2nd Grade: Implications of Piaget's Theory, Kamii and Joseph, p. 7)
231. Instead of counting on, collections can each be counted from one each time. (Analyst's Original Work)
232. Interchanging the order of the digits in a number will result in a different number, unless the digits are the same. (http://en.wikipedia.org/wiki/Positional_notation)
233. It is common for beginning students to reverse the orientation of digits when they are writing. (Dr. Wright's Kitchen Table Math, Book 1, p. 14)
234. It is desirable to have a starting number larger than one when multiple collections need to be counted. (Analyst's Original Work)
235. It is not necessary to count by row or column if another approach is simpler. (Analyst's Original Work)

236. Japanese dactylonomy is a combination of English-speaking and Eastern European dactylonomy. (http://en.wikipedia.org/wiki/Finger_counting)
237. Keeping a running total typically requires less calculation than continually adding from the beginning of a list of numbers. (http://en.wikipedia.org/wiki/Running_total.)
238. Language-mediated representation of number is the linguistic representation of a quantity through the use of number words. (Number sense, p. 34, 35)
239. Marking an object as counted provides no information on the order used to count. (Analyst's Original Work)
240. Marking an object more than once will likely result in double counting. (http://en.wikipedia.org/wiki/Double_counting (fallacy))
241. Marking an object with a pen or pencil is a helpful way to identify previously counted objects. (Analyst's Original Work)
242. Marking multiple objects at once violates the one-to-one principle. (Dr. Wright's Kitchen Table Math, Book 1, p. 5)
243. Members of a set can be counted by means of the one-to-one principle. (Dr. Wright's Kitchen Table Math, Book 1, p. 5)
244. Nearly every number word in the teens begins with the word for the number of units in the teen. (Elementary Math Teacher's Book of Lists, p. 116)
245. Nine groups of ten are called ninety. (Elementary Math Teacher's Book of Lists, p. 116)
246. Ninety is the same as eight tens and ten ones. (Analyst's Original Work)
247. Ninety is the same as nine tens and zero ones. (Analyst's Original Work)
248. Number words are words used to describe quantities. (Analyst's Original Work)
249. Number words include "one," "two," and "three." (Analyst's Original Work)
250. Numbers in a number system are written with digits. (Nelson, Penguin Dictionary, p. 314)
251. Numeral identification is the ability to attach the correct number words to a sequence of digits. (Early Numeracy, Wright, p. 17, 24)
252. Numeral recognition is closely related to numeral identification. (Early Numeracy, Wright, p. 17, 24)
253. Object classification collects objects into separate groups based on distinguishing characteristics. (Elementary Math Teacher's Book of Lists, p. 51) (2607 of FIG. 26A)
254. Objects can be sorted into counted and uncounted. (Elementary Math Teacher's Book of Lists, p. 51) (2617 of FIG. 26B)
255. Objects in a collection are identical if they have no distinguishing characteristics. (Elementary Math Teacher's Book of Lists, p. 51) (item 2606 of FIG. 26A)
256. Objects in a collection between six and ten can be put in one-to-one correspondence with fingers from both hands. (Dr. Wright's Kitchen Table Math, Book 1, p. 9)
257. Objects in a collection can be subitized if the size of the collection is sufficiently small. (Number Sense, p. 68/Where Mathematics Comes From, p. 15)
258. Objects in a collection have a total number depending only on the collection itself (Dr. Wright's Kitchen Table Math Book 1, p. 5)
259. Objects in a set are also called elements or members. (Analyst's Original Work)
260. Objects near to each other can be easily grouped by location. (Analyst's Original Work)
261. Objects previously counted by subitization are remembered by means of the memory capacity. (Where Mathematics Comes From, p. 51)
262. Once a sub-collection has been grouped, you may count on to continue counting the collection, or count from one. (Analyst's Original Work) (2626 of FIG. 26B)
263. Once the counted of a counted but not yet grouped sub-collection reaches the fixed size, group it and begin to count from the uncounted collection. (Analyst's Original Work)
264. One counted five consists exclusively of previously counted ones. (Analyst's Original Work)
265. One counted ten consists exclusively of previously counted ones. (Analyst's Original Work)
266. One dozen is an example of a composed unit made up of twelve smaller units. (http://ed.ted.com/lessons/one-is-one-or-is-it)
267. One five is the same as five ones. (Number Sense, p. 98)
268. One group of five never contains fewer than five ones. (Analyst's Original Work)
269. One group of five never contains more than five ones. (Analyst's Original Work)
270. One group of ten is called ten. (Elementary Math Teacher's Book of Lists, p. 116)
271. One group of ten never contains fewer than ten ones. (Analyst's Original Work) item 2636 of FIG. 26C
272. One group of ten never contains more than ten ones. (Analyst's Original Work) item 2637 of FIG. 26C
273. One helpful way to order a collection is by column. (Analyst's Original Work)
274. One helpful way to order a collection is by row. (Analyst's Original Work)
275. One hundred is the same as nine tens and ten ones. (Analyst's Original Work)
276. One hundred is the same as ten tens and zero ones. (Analyst's Original Work)
277. One more than the previous number is always the next number when counting. (Dr. Wright's Kitchen Table Math, Book 1, p. 5)
278. One ten is the same as ten ones. (Number Sense, p. 98) item 2635 of FIG. 26C
279. One ten is the same as two fives. (Analyst's Original Work)
280. Only select objects from the uncounted sub-collection to count next. (Analyst's Original Work)
281. Operations that return a third number in a set given two initial numbers from the set are called binary operations. (Penguin Dictionary, Nelson, p. 5)
282. Ordering a collection into counted objects can be done by marking the objects as they are counted. (Elementary Math Teacher's Book of Lists, p. 51)
283. Ordinal numbers indicate position in a sequence. (Oxford Dictionary, Clapham and Nicholson, p. 330)
284. Other commonly used number system bases throughout history include binary, quintal, duodecimal, hexadecimal, vigesimal, and sexigesimal. (Nelson, Penguin Dictionary, p. 314)
285. Other types of pattern recognition are temporal and kinesthetic. (http://gse.buffalo.edu/fas/clements/files/Subitizing.pdf)
286. Pattern recognition aids in the development of conceptual subitization. (http://gse.buffalo.edu/fas/clements/files/Subitizing.pdf)

287. Perceptual Counting is a stage wherein a student can count visible items but not concealed items. (Early Numeracy, Wright, p. 20, 22)
288. Perceptual subitization also aids in the cognitive development of the concept of "unit." (http://gse.buffalo.edu/fas/clements/files/Subitizing.pdf)
289. Perceptual subitization is the ability to recognize a number in the absence of other mathematical processes. (http://gse.buffalo.edu/fas/clements/files/Subitizing.pdf)
290. Perceptual subitization provides a basis for counting. (Math & Science for Young Children, Charlesworth, Lind, p. 133)
291. Positional notation with the base ten is the number system most commonly used throughout the world. (Nelson, Penguin Dictionary, p. 314)
292. Positional space relationships describe the relative positions of two objects. (Elementary Math Teacher's Book of Lists, p. 57)
293. Practice writing the digits should minimize errors of reversed orientation. (Dr. Wright's Kitchen Table Math, Book 1, p. 14)
294. Practicing writing digits on surfaces with strong tactile feedback is helpful in learning how to write the digits. (Pr. Wright's Kitchen Table Math, Book 1, p. 12)
295. Previously counted objects are less likely to be counted again if they are clearly marked when counted. (Analyst's Original Work)
296. Quantities of different sizes will have correspondingly different number words. (Analyst's Original Work)
297. Quickly recognizing the total number of raised fingers on two hands is a good way to practice computing small sums mentally. (Dr. Wright's Kitchen Table Math Book 1, p. 21)
298. Recognizing a composition of units as a complete whole requires pattern recognition abilities. (http://gse.buffalo.edu/fasklements/files/Subitizing.pdf)
299. Recounting with different orders is an example of checking one's work. (Analyst's Original Work)
300. Removing objects from a collection will decrease its size. (Analyst's Original Work)
301. Representing each object in a count by its own tally implies tallies are an example of a unary numeral system. (http://en.wikipedia.org/wiki/Unary_numeral_system)
302. Resetting the count to one at the beginning of each counted and grouped subcollection results in smaller counting numbers than counting on from each subcollection. (Analyst's Original Work)
303. Seven groups of ten are called seventy. (Elementary Math Teacher's Book of Lists, p. 116)
304. Seventy is the same as seven tens and zero ones. (Analyst's Original Work)
305. Seventy is the same as six tens and ten ones. (Analyst's Original Work)
306. Shared objects in counted and grouped sub-collections violate the one-to-one principle. (Analyst's Original Work)
307. Six can be represented using all the fingers of one hand and one finger on the other hand. (Dr. Wright's Kitchen Table Math, Book 1, p. 9)
308. Six groups of ten are called sixty. (Elementary Math Teacher's Book of Lists, p. 116)
309. Six is the number obtained by doubling three. (Dr. Wright's Kitchen Table Math. Book 1, p. 52)
310. Sixteen is the number obtained by doubling eight. (Dr. Wright's Kitchen Table Math Book 1, p. 52)
311. Sixty is the same as five tens and ten ones. (Analyst's Original Work)
312. Sixty is the same as six tens and zero ones. (Analyst's Original Work)
313. Skip counting by 10 begins with the numbers 10, 20, 30, 40, and 50. (Analysts Original Work)
314. Skip counting by 2 begins with the numbers 2, 4, 6, 8, and 10. (Analyst's Original Work)
315. Skip counting by 5 begins with the numbers 5, 10, 15, 20, and 25. (Analyst's Original Work)
316. Skip counting is a faster way to count because not every counting number is explicitly used. (Dr. Wright's Kitchen Table Math Book 1, p. 67)
317. Skip counting is most easily performed in groups of 2, 5, or 10. (Dr. Wright's Kitchen Table Math Book 1, p. 7)
318. Skip counting is used to keep a running total of a collection as it is counted. (Analyst's Original Work)
319. Small collections can typically be subitized if they contain one to four objects. (Number Sense, p. 68/Where Mathematics Comes From, p. 15)
320. Small collections of fingers on each hand can be conceptually subitized to find the total. (http://gse.buffalo.edu/fas/clements/files/Subitizing.pdf)
321. Small sums can also be mentally computed with conceptual subitization. (http://gse.buffalo.edu/fas/clements/files/Subitizing.pdf)
322. Sorting counted and uncounted objects together may result in an erroneous total. (Analyst's Original Work)
323. Sorting counted objects makes it easier to focus on the uncounted objects. (Analyst's Original Work)
324. Sorting objects based on whether or not they have been previously counted is a useful way to order a collection. (Elementary Math Teacher's Book of Lists, p. 51)
325: Subitization has two components: perceptual and conceptual. (http://gse.buffalo.edu/fas/clements/files/Subitizing.pdf)
326. Subitization is the ability to instantly see how many objects are in a collection. (Number Sense, p. 68/Where Mathematics Comes From, p. 15)
327. Subitizing a set may involve perceptual subitization of components of the set. (http://www2.research.uky.edu/pimser/p12mso/pub/2008-09 Archives/Math Leadership Support Network 2008-09/September 08/summary_of_subitizing.doc)
328. Taking half of a collection means splitting it into two equally sized subcollections. (Dr. Wright's Kitchen Table Math, Book 1, p. 89)
329. Tally marks are also called hash marks. (http://en.wikipedia.org/wiki/Tally_marks)
330. Ten can be represented by extending all of the fingers on both hands. (Dr. Wright's Kitchen Table Math, Book 1, p. 8)
331. Ten groups of ten are called one hundred. (Elementary Math Teacher's Book of Lists, p. 116)
332. Ten is the number obtained by doubling five. (Dr. Wright's Kitchen Table Math Book 1, p. 52)
333. Ten ones marked as counted can be collected into one group of ten. (Analyst's Original Work)
334. Ten smaller units combine to give the composed unit of one ten. (http://ed.ted.com/lessons/one-is-one-or-is-it) item 2638 of FIG. 26C

335. The "t" in "eight" and the "t" in "teen" combine to give only one "t" in the word "eighteen." (Elementary Math Teacher's Book of Lists, p. 116)
336. The 0 in the number 0 represents zero ones. (Dr. Wright's Kitchen Table Math, Book 1, p. 18) item 2644 of FIG. 26D
337. The 1 in the number 10 represents one ten. (Dr. Wright's Kitchen Table Math, Book 1, p. 18) (2661 of FIG. 26E)
338. The ability to group into composed units is the first stage of Early Multiplication and Davison. (Early Numeracy, Wright, p. 20, 28)
339. The ability to view ten as a composed unit is essential in the development of Base Ten Arithmetical Strategies. (Early Numeracy, Wright, p. 20, 22)
340. The arithmetic of addition and subtraction can be introduced within the context of conceptual subitization. (http://gse.buffalo.edu/fas/clements/files/Subitizing.pdf)
341. The assignment of one number word to one object in a collection is the one-to-one principle. (Dr. Wright's Kitchen Table Math Book 1, p. 5)
342. The base of a number system is the fundamental compound unit used for grouping in the number system. (Nelson, Penguin Dictionary, p. 314)
343. The base of the binary number system is two. (Nelson, Penguin Dictionary, p. 34)
344. The base of the duodecimal number system is twelve. (Nelson, Penguin Dictionary, p. 136)
345. The base of the hexadecimal number system is sixteen. (Nelson, Penguin Dictionary, p. 211
346. The base of the quintal number system is five. (Nelson, Penguin Dictionary, p. 314)
347. The base of the vigesimal number system is twenty. (Nelson, Penguin Dictionary, p. 314)
348. The beginnings for the number words ending in "-teen" are the same as the beginnings for the number words ending in "-ty."-Dr. Wright's Kitchen Table Math, Book 1, p. 20)
349. The cardinal number of a set containing n objects equals n. (Nelson, Penguin Dictionary, p. 47) item 2631 of FIG. 26C
350. The cardinality of a set depends on the units used to count. (http://ed.ted.com/lessons/one-is-one-or-is-it)
351. The cardinality of a set is also called the cardinal number of the set. (Nelson, Penguin Dictionary, p. 47)
352. The cardinality of a set is determined by the number of groups of ten and the number of objects left over. (http://en.wikipedia.org/wiki/Positional notation) (2639 of FIG. 26C)
353. The cardinality of a set is the ordinal number of the last item. (Dr. Wright's Kitchen Table Math, Book 1, p. 5)
354. The cognitive ordering capacity allows us to put an order on a collection of objects for the purpose of counting. (Where Mathematics Comes From, p. 51)
355. The combinatorial-grouping capacity is used with subitization to determine the size of larger sets. (Where Mathematics Comes From, p. 51) (2640 of FIG. 26C)
356. The counted and grouped sub-collection consists of objects you have both counted and grouped into a collection of some fixed size. (Analyst's Original. Work)
357. The counted but not yet grouped sub-collection consists of objects you have counted, but have not yet grouped into a collection of fixed size. (Analyst's Original Work)
358. The counting numbers are also called the natural numbers. (Nelson, Penguin Dictionary, p. 233)
359. The creation of multiple counted and grouped sub-collections when counting is allowed. (Analyst's Original Work)
360. The decimal system has a base of ten. (Nelson, Penguin Dictionary, p. 314)
361. The decimal system is an example of a number system. (Nelson, Penguin Dictionary, p. 110)
362. The digit in the tens place counts the number of groups of tens. (Early Numeracy, Wright, p. 20, 28) (2660 of FIG. 26E)
363. The digits 1, 2, 3, 4, 5, 6, 7, 8, 9, and 0 make up the decimal system. (Nelson, Penguin Dictionary, p. 110)
364. The digits used when writing a count follow the order determined by the ordered numbers principle. (Dr. Wright's Kitchen Table Math, Book 1, p. 5)
365. The equals sign is denoted by the symbol "=." (Penguin Dictionary, Nelson, p. 147) item 2646 of FIG. 26D
366. The exhaustion-detection capacity is the ability to tell when all objects have been counted. (Where Mathematics Comes From, p. 51)
367. The final object in the uncounted sub-collection is called the last object. (Dr. Wright's Kitchen Table Math, Book 1, p. 5)
368. The fingers on one hand can be put in one-to-one correspondence with each of the numbers from one to five. (Dr. Wright's Kitchen Table Math, Book 1, p. 8)
369. The first addend is sometimes called the augend. (http://mathworld.wolfram.com/Augend.html)
370. The first digit in the numeral representing a two-digit number represents the number of tens in the number. (Elementary Math Teacher's Book of Lists, p. 116)
371. The first five counting numbers are one, two, three, four, and five. (Dr. Wright's Kitchen Table Math, Book 1, p. 3)
372. The first level of development for Base Ten Arithmetical Strategies is called Initial Concept of Ten. (Early Numeracy, Wright, p. 20, 22)
373. The first level of numeral identification is called emergent numeral identification. (Early Numeracy, Wright, p. 17, 24)
374. The first stage of SEAL is Emergent Counting-Early Numeracy, Wright, p. 20, 22)
375. The first word in a number between twenty and one hundred is the word for the number of groups often. (Elementary Math Teacher's Book of Lists, p. 116)
376. The fixed order used to count begins with the number one. (Dr. Wright's Kitchen Table Math, Book 1, p. 5)
377. The fixed order used when counting in groups depends on the size of the group. (Analyst's Original Work)
378. The fixed quantity added when counting in groups is the quantity given by one of the equally sized sub-collections. (Analyst's Original Work)
379. The fundamental compound unit used for grouping in a positional number system is always denoted by the numeral 10. (Nelson, Penguin Dictionary, p. 314)
380. The grouping capacity allows us to use sensory input to distinguish objects in a collection for counting. (Where Mathematics Comes From, p. 51)
381. The Hindu-Arabic system is more commonly known as the decimal system. (Nelson, Penguin Dictionary, p. 315)

382. The independent-order capacity is the ability to apply the unordered objects principle. (Where Mathematics Comes From, p. 51)
383. The last number principle states that the number associated with the final element of a set is the cardinality of the set. (Dr. Wright's Kitchen Table Math, Book 1, p. 5)
384. The last number spoken corresponds to the ones digit of the ordinal number of the last item if the counted and grouped sub-collections have size ten. (Analyst's Original Work)
385. The last object is also called the last item. (Dr. Wright's Kitchen Table Math, Book 1, p. 5)
386. The memory capacity keeps track of previously counted objects and previously used fingers to count objects. (Where Mathematics Comes From, p. 51)
387. The most commonly used number system is called the Hindu-Arabic system. (Nelson, Penguin Dictionary, p. 315)
388. The natural numbers are also called the whole numbers. (http://mathworld.wolfram.com/WholeNumber.html)
389. The next number when counting in groups is obtained from the previous number by adding some fixed quantity. (Analyst's Original Work)
390. The next number when counting is also called the successor to the previous number. (http://mathworld.wolfram.com/PeanosAxioms.html)
391. The not yet counted sub-collection consists of objects you have yet to mark and count. (Analyst's Original Work)
392. The number eight is written with the digit 8. (Dr. Wright's Kitchen Table Math, Book 1, p. 12)
393. The number eighteen is written with the sequence of digits 18. (Elementary Math Teacher's Book of Lists, p. 116)
394. The number eleven is written with the sequence of digits 11. (Elementary Math Teacher's Book of Lists, p. 116)
395. The number fifteen is written with the sequence of digits 15. (Elementary Math Teacher's Book of Lists, p. 116)
396. The number five is written with the digit 5. (Dr. Wright's Kitchen Table Math, Book 1, p. 12)
397. The number four is written with the digit 4. (Dr. Wright's Kitchen Table Math, Book 1, p. 12)
398. The number fourteen is written with the sequence of digits 14. (Elementary Math Teacher's Book of Lists, p. 116)
399. The number nine is written with the digit 9. (Dr. Wright's Kitchen Table Math, Book 1, p. 12)
400. The number nineteen is written with the sequence of digits 19. (Elementary Math Teacher's Book of Lists, p. 116)
401. The number of objects left over after counting and grouping by ten as many times as possible corresponds to the digit in the ones place of the cardinality of the set. (Analyst's Original Work)
404. The number of tens in a collection is equal to half the number of fives. (Analyst's Original Work)
405. The number one is written with the digit 1. (Dr. Wright's Kitchen Table Math, Book 1, p. 12)
406. The number returned by addition is called the sum. (Penguin Dictionary, Nelson, p. 5)
407. The number seven is written with the digit 7. (Dr. Wright's Kitchen Table Math, Book 1, p. 12)
408. The number seventeen is written with the sequence of digits 17. (Elementary Math Teacher's Book of Lists, p. 116)
409. The number six is written with the digit 6. (Dr. Wright's Kitchen Table Math, Book 1, p. 12)
410. The number sixteen is written with the sequence of digits 16. (Elementary Math Teacher's Book of Lists, p. 116)
411. The number ten is written with the sequence of digits 10. (Dr. Wright's Kitchen Table Math, Book 1, p. 18)
412. The number thirteen is written with the sequence of digits 13. (Elementary Math Teacher's Book of Lists, p. 116)
413. The number three is written with the digit 3. (Dr. Wright's Kitchen Table Math, Book 1, p. 12)
414. The number twelve is written with the sequence of digits 12. (Elementary Math Teacher's Book of Lists, p. 116)
415. The number twenty is written with the sequence of digits 20. (Elementary Math Teacher's Book of Lists, p. 116)
416. The number two is written with the digit 2. (Dr. Wright's Kitchen Table Math, Book 1, p. 12)
417. The number word "eleven" is difficult to remember because it does not fall into any number word pattern. (Dr. Wright's Kitchen Table Math, Book 1, p. 17)
418. The number word "twelve" is difficult to remember because it does not fall into any number word pattern. (Dr. Wright's Kitchen Table Math, Book 1, p. 17)
419. The number word associated to 13 is thirteen, not threeteen. (Elementary Math Teacher's Book of Lists, p. 116)
420. The number word associated to 15 is fifteen, not fiveteen. (Elementary Math. Teacher's Book of Lists, p. 116)
421. The number words for teens are very similar to the number words for groupings of ten between three and nine. (Dr. Wright's Kitchen Table Math, Book 1, p. 20)
422. The numbers between ten and ninety-nine are called two digit numbers. (Elementary Math Teacher's Book of Lists, p. 116)
423. The numbers ending in "-teen" are sometimes referred to as the teens. (Analyst's Original Work)
424. The one-to-one principle is an example of a one-to-one correspondence where each set is finite (Analyst's Original Work)
425. The one-to-one principle is violated if more than one counting number is written on the same object. (Analyst's Original Work)
426. The one-to-one principle is violated if the same counting number is written on the more than one object. (Analyst's Original Work)
427. The one-to-one principle states that when counting a set, each object of the set must correspond to exactly one counting number. (Dr. Wright's Kitchen Table Math, Book 1, p. 5)
428. The ones digit in a number will always be 0 or 5 when skip counting by 5. (Dr. Wright's Kitchen Table Math Book 1, p. 68)
429. The opposite of "one less than" is "one more than." (Analyst's Original Work)
430. The opposite of successively adding numbers is adding from the beginning each time a new number is included. (http://en.wikipedia.org/wiki/Running_total)
431. The order of digits in a number determines the quantity represented. (http://en.wikipedia.org/wiki/Positional notation)

432. The order used to count a collection is determined by the ordinal number of each object in the collection. (Analyst's Original Work)
433. The ordered numbers principle applies to counting in groups as well as counting by ones. (Analyst's Original Work)
434. The ordered numbers principle states that the order used to count is always fixed. (Dr. Wright's Kitchen Table Math, Book 1, p. 5)
435. The ordering of fingers is the same in Western and Eastern European dactylonomy. (http://en.wikipedia.org/wiki/Finger_counting)
436. The ordering of fingers on the second hand when counting is the same as the ordering of fingers on the first hand. (http://en.wikipedia.org/wiki/Finger_counting)
437. The other hand can be used to continue counting if all the fingers on one hand have been used. (Dr. Wright's Kitchen Table Math, Book 1, p. 9)
438. The pairing capacity allows us to sequentially pair objects we want to count with some useful counting mechanism, such as fingers. (Where Mathematics Comes From, p. 51)
439. The place of a digit in a given number is called the place value of the digit. (Number Sense, p. 98)
440. The place value of a digit determines the quantity represented by the digit. (Number Sense, p. 98)
441. The process of counting a collection of objects requires many distinct cognitive capacities. (Where Mathematics Comes From, p. 51)
442. The quantity associated to a sequence of digits is called quantitative meaning. (Number Sense, p. 74, 78)
443. The quantity represented by a digit is dependent upon the place of the digit in a given number. (Number Sense, p. 98) (2659 of FIG. 26E)
444. The quantity represented by a digit is governed by the place-value principle. (Number Sense, p. 98)
445. The relative locations of objects can be described in terms of position, direction, or distance. (Elementary Math Teacher's Book of Lists, p. 57)
446. The second digit in the numeral representing a two-digit number represents the number of ones in the number. (Elementary Math Teacher's Book of Lists, p. 116)
447. The second stage of Early Multiplication and Division is the ability to count by groups of multiple units. (Early Numeracy, Wright, p. 20, 28)
448. The second word in a number between twenty and one hundred is the word for the number of ones remaining after as many groups often as possible have been made. (Elementary Math Teacher's Book of Lists, p. 116)
449. The size of a collection is also called the cardinality of a set. (Nelson, Penguin Dictionary, p. 47)
450. The size of a collection of objects sorted by color is the combination of the sizes of each single colored sub-collection. (Elementary Math Teacher's Book of Lists, p. 51)
451. The size of a composed unit consisting of n objects equals n if the unit of measurement is the object rather than the composed unit. (http://ed.ted.com/lessons/one-is-one-or-is-it) (2634 of FIG. 26C)
452. The size of a composed unit consisting of n objects equals one if the unit of measurement is the composed unit. (http://ed.ted.com/lessons/one-is-one-or-is-it)
453. The stage after Emergent Counting is Perceptual Counting. (Early Numeracy, Wright, p. 20, 22)
454. The stage after Perceptual Counting is Figurative Counting. (Early Numeracy, Wright, p. 20, 22)
455. The standard order for counting is the order where each number is the successor of the previous number. (Analyst's Original Work)
456. The successor of four is five. (Analyst's Original Work)
457. The successor of three is four. (Analyst's Original Work)
458. The successor to eight is nine. (Analyst's Original Work)
459. The successor to eighteen is nineteen. (Analyst's Original Work)
460. The successor to eleven is twelve. (Analyst's Original Work)
461. The successor to fifteen is sixteen. (Analyst's Original Work)
462. The successor to five is six. (Analyst's Original Work) item 2622 of FIG. 26B
463. The successor to fourteen is fifteen. (Analyst's Original Work.)
464. The successor to nine is ten. (Analyst's Original Work)
465. The successor to nineteen is twenty. (Analyst's Original Work)
466. The successor to one is two. (Analyst's Original Work)
467. The successor to seven is eight. (Analyst's Original Work)
468. The successor to seventeen is eighteen. (Analyst's Original Work)
469. The successor to six is seven. (Analyst's Original Work)
470. The successor to sixteen is seventeen. (Analyst's Original Work)
471. The successor to ten is eleven. (Analyst's Original Work)
472. The successor to the previous number is also a number. (http://mathworld.wolfram.com/PeanosAxioms.html)
473. The successor to thirteen is fourteen. (Analyst's Original Work)
474. The successor to twelve is thirteen. (Analyst's Original Work)
475. The successor to two is three. (Analyst's Original Work)
476. The sum is obtained by combining two numbers called addends. (Penguin Dictionary, Nelson, p. 5)
477. The symbol "=" indicates the presence of an equation. (Penguin Dictionary, Nelson, p. 147)
478. The symbolizing capacity allows us to assign physical symbols to different numbers. (Where Mathematics Comes From, p. 51)
479. The thumb is used in parts of Asia to count finger hones on a hand from one to twelve. (http://en.wikipedia.org/wiki/Finger_counting)
480. The total number of objects in a collection of size less than one hundred is equal to the combined total number of tens and ones. (Analyst's Original Work)
481. The two exceptions to the number word rules for teens are thirteen and fifteen. (Elementary Math Teacher's Book of Lists, p. 116)
482. The universal principle states that any collection of objects can be counted. (Dr. Wright's Kitchen Table Math Book 1, p. 5)

483. The unordered objects principle can be used to double-check the accuracy of a count (Dr. Wright's Kitchen Table Math, Book 1, p. 5)
484. The unordered objects principle states that the cardinality of a set will be the same regardless of the order used to count the objects. (Dr. Wright's Kitchen. Table Math, Book 1, p. 5)
485. The use of body parts to count is called a body-based counting system. (Number Sense, p. 93)
486. The use of fingers for counting is called dactylonomy. (http://en.wikipedia.org/wiki/Finger_counting)
487. The word "eleven" corresponds to the number one more than ten. (Dr. Wright's Kitchen Table Math, Book 1, p. 17)
488. The word "twelve" corresponds to the number one more than eleven. (Dr. Wright's Kitchen Table Math, Book 1, p. 17)
489. The words "first," "second," and "third" are examples of ordinal numbers. (Oxford Dictionary, Clapham and Nicholson, p. 330)
490. The words for a number between twenty and one hundred are determined by the number of groups of ten and the number of remaining ones in the number. (Elementary Math Teacher's Book of Lists, p. 116)
491. There are five levels of numeral identification. (Early Numeracy, Wright, p. 17, 24)
492. There are several types of pattern recognition for conceptual subitization. (http://gse.buffalo.edu/fas/clements/files/Subitizing.pdf)
493. There are six Stages of Early Arithmetical Learning (SEAL). (Early Numeracy, Wright, p. 20, 22)
494. Thir- and three-are similar but distinct sounds. (Elementary Math Teacher's Book of Lists, p. 116)
495. Thirty is the same as three tens and zero ones. (Analyst's Original Work)
496. Thirty is the same as two ten and ten ones. (Analyst's Original Work)
497. Three groups of ten are called thirty. (Elementary Math Teacher's Book of Lists, p. 116)
498. Three sub-collections useful for counting are counted and grouped, counted but not yet grouped, and not yet counted. (Analyst's Original Work)
499. To associate symbols or words with numbers representing the size of a larger set requires the symbolizing capacity. (Where Mathematics Comes From, p. 51)
500. To count successfully requires counting order and hierarchical inclusion. (Elementary Math Teacher's Book of Lists, p. 56)
501. To put groups together and former larger groups requires the combinatorial-grouping capacity. (Where Mathematics Comes From, p. 51) (2613 of FIG. 26A)
502. Twelve is the number obtained by doubling six. (Dr. Wright's Kitchen Table Math Book 1, p. 52)
503. Twenty is the same as one ten and ten ones. (Analyst's Original Work)
504. Twenty is the same as two tens and zero ones. (Analyst's Original Work)
505. Twin addition of eight results in sixteen. (Dr. Wright's Kitchen Table Math Book. 1, p. 52)
506. Twin addition of five results in ten. (Dr. Wright's Kitchen Table Math Book 1, p. 52)
507. Twin addition of four results in eight. (Dr. Wright's Kitchen Table Math Book 1 p. 52)
508. Twin addition of nine results in eighteen. (Dr. Wright's Kitchen Table Math Book 1, p. 52)
509. Twin addition of one results in two. (Dr. Wright's Kitchen Table Math Book 1, p. 52)
510. Twin addition of seven results in fourteen. (Dr. Wright's Kitchen Table Math Book 1, p. 52)
511. Twin addition of six results in twelve. (Dr. Wright's Kitchen Table Math Book 1 p. 52)
512. Twin addition of three results in six. (Dr. Wright's Kitchen Table Math Book 1, p. 52)
513. Twin addition of two results in four. (Dr. Wright's Kitchen Table Math Book 1, p. 52)
514. Two groups of ten are called twenty. (Elementary Math Teacher's Book of Lists, p. 116)
515. Two is the number obtained by doubling one. (Dr. Wright's Kitchen Table Math Book 1, p. 52)
516. Two numbers with equal successors are equal. (http://mathworld.wolfram.com/PeanosAxioms.html)
517. Two sides of an equation cannot have different values. (Analyst's Original Work)
518. Two sub-collections are equally sized if they have the same cardinality. (Analyst's Original Work)
519. Uncounted objects outside of a circled group are easier to identify as not yet counted. (Analyst's Original Work)
520. Use the fingers on one hand to count from one to five. (Dr. Wright's Kitchen Table Math, Book 1, p. 8)
521. Violating the one-to-one principle usually results in an erroneous total. (Analyst's Original Work)
522. Visual conceptual subitization requires spatial pattern recognition. (http://gse.buffalo.edu/fas/clements/files/Subitizing.pdf)
523. We write numbers with the digits 1, 2, 3, 4, 5, 6, 7, 8, 9, and 0. (Nelson, Penguin Dictionary, p. 124)
524. Western European dactylonomy differs slightly from English-speaking dactylonomy. (http://en.wikipedia.org/wiki/Finger_counting)
525. When a collection is grouped into tens and ones, the number of ones is equal to the digit in the ones place of the cardinality of the set. (Analyst's Original Work) (2663 of FIG. 26E)
526. When a collection is grouped into tens and ones, the number of tens is equal to the digit in the tens place of the cardinality of the set. (Analyst's Original Work) (2665 of FIG. 26E)
527. When composing composed units, individual objects within the composed unit cannot be separated from the composed unit. (http://ed.ted.com/lessons/one-is-one-or-is-it)
528. When counting a collection of size between ten and twenty, toes can be used in addition to fingers for counting. (Analyst's Original Work)
529. When counting a collection, each object in the collection can be viewed as one unit. (Analyst's Original Work)
530. When counting in groups, the order when counting is fixed. (Analyst's Original Work)
531. When counting in groups, to the size of one sub-collection one combines the size of another sub-collection to form a new number. (Analyst's Original Work)
532. When counting to oneself, Japanese dactylonomy more closely resembles Eastern European dactylonomy. (http://en.wikipedia.org/wiki/Finger_counting)
533. When counting, one number word is assigned to one object in a collection. (Dr. Wright's Kitchen Table Math Book 1, p. 5)

534. When counting, the previous number is one less than the next number. (Analyst's Original Work)

535. When indicating a count to others, Japanese dactylonomy is the same as English-speaking dactylonomy. (http://en.wikipedia.org/wiki/Finger_counting)

536. When objects in a collection are counted more than once, it is called double counting. (http://en.wikipedia.org/wiki/Double_counting_(fallacy))

537. When the same number is combined with itself the number is said to have been doubled. (Dr. Wright's Kitchen Table Math Book 1, p. 52)

538. When there is no quantity in the given place, zero is used as a placeholder. (http://en.wikipedia.org/wiki/O_(number))

539. While counting objects, it helps to sort them into smaller sub-collections. (Analyst's Original Work)

540. Without analogical representation of quantitative meaning, students will have trouble writing digits corresponding to their counts. (Number Sense, p. 74)

541. Without meaning, a combination of symbols is also called a string of symbols. (http://en.wikipedia.org/wiki/Well-formed_formula)

542. Without the ability to create units, students cannot connect individual objects to number words. (http://gse.buffalo.edu/fas/clements/files/Subitizing.pdf)

543. Writing counting numbers on objects as they are counted provides more information than marking them as counted. (Analyst's Original Work)

544. Writing digits in the sand is one example of practicing on a highly tactile surface. (Dr. Wright's Kitchen Table Math, Book 1, p. 12)

545. Writing the ordinal number on an object as it is counted allows for easy identification of the order used to count a collection. (Analyst's Original Work)

546. Writing the ordinal number on all object as it is counted provides a very concrete way to abide by the one-to-one principle. (Analyst's Original Work)

547. Zero is a number. (http://mathworld.wolfram.com/PeanosAxioms.html)

548. Zero is not the successor of any counting number. (http://mathworld.wolfram.com/PeanosAxioms.html)

Figure 26A:
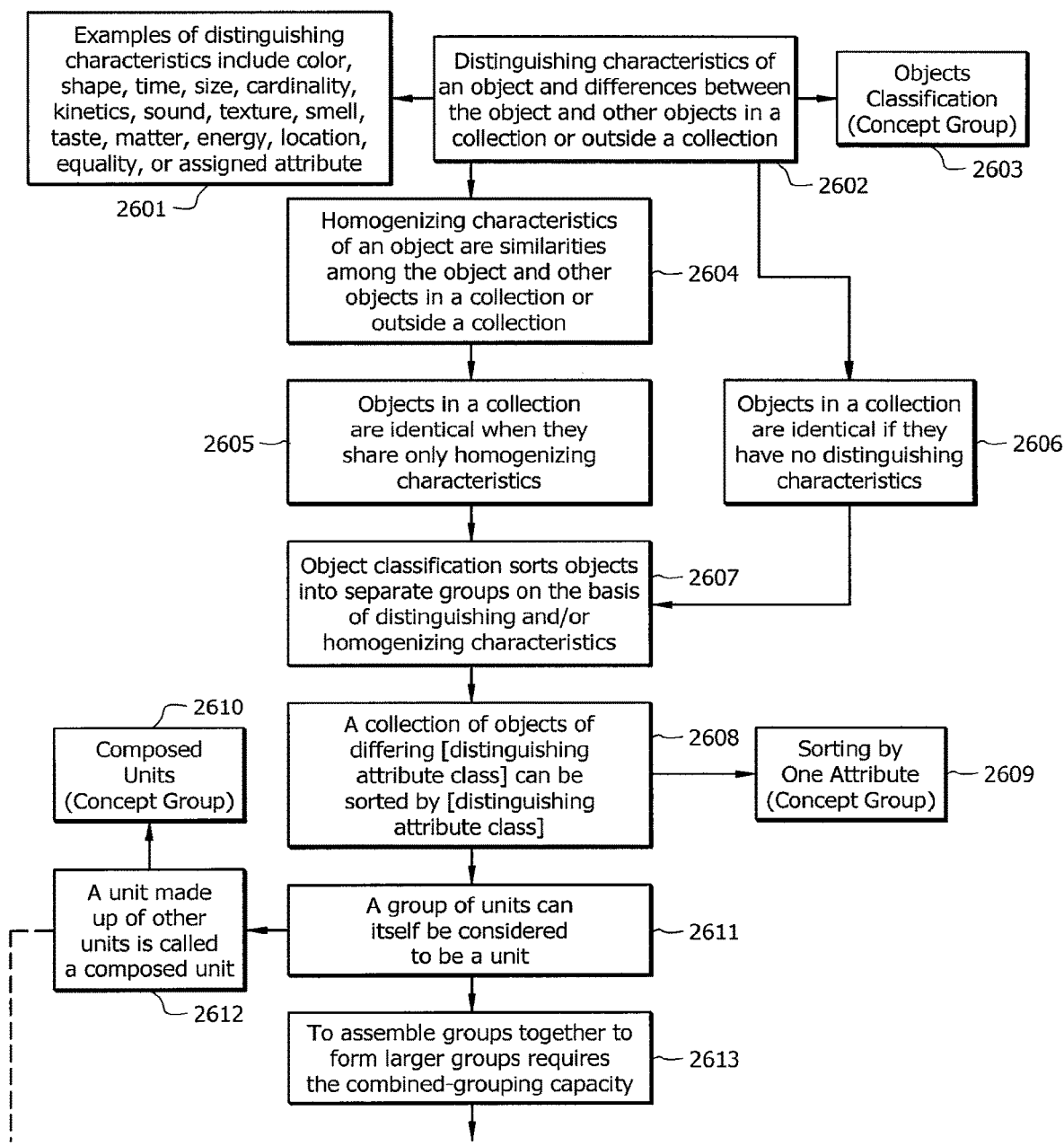
Figure 26B:
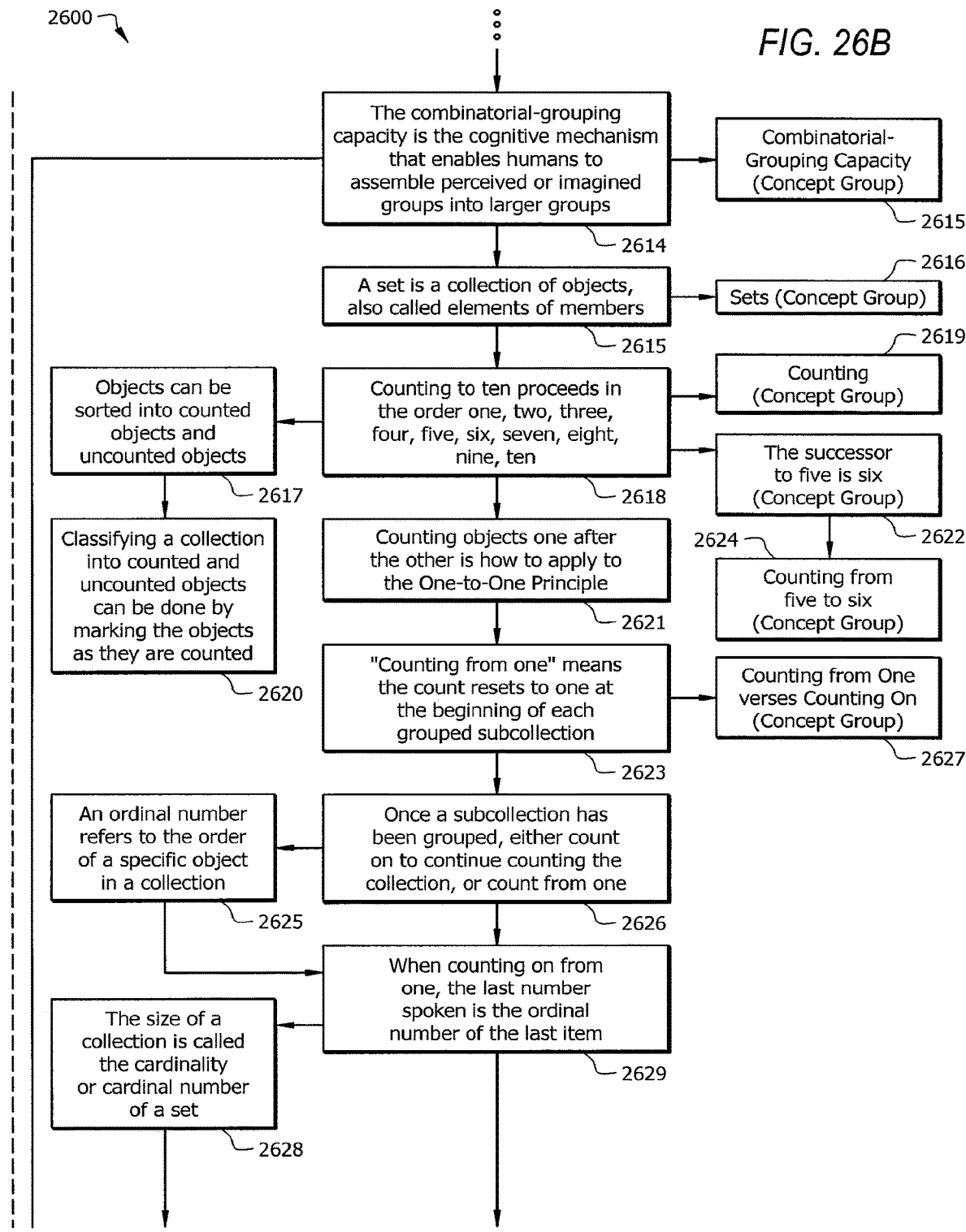
Figure 26C:
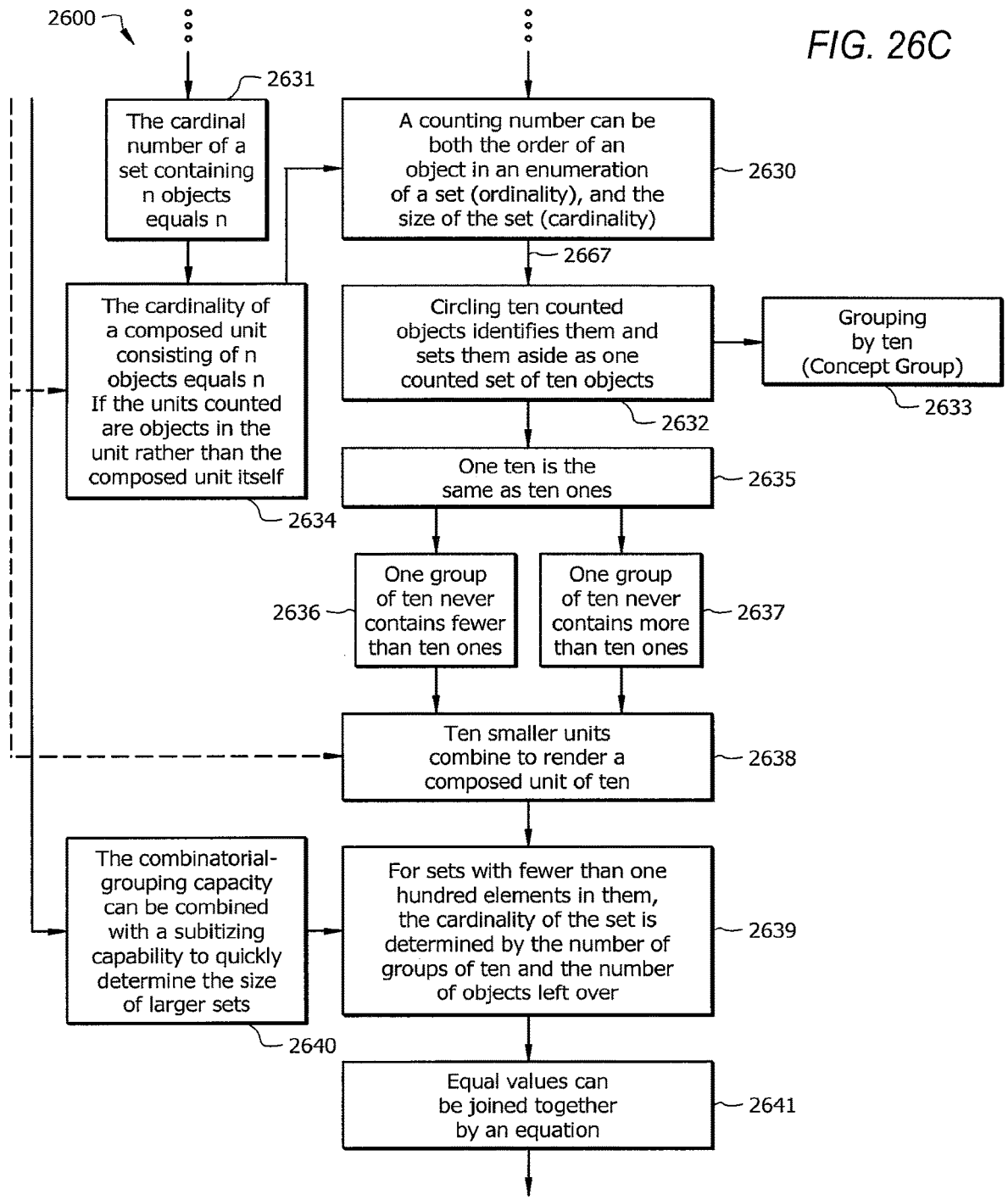
Figure 26E:
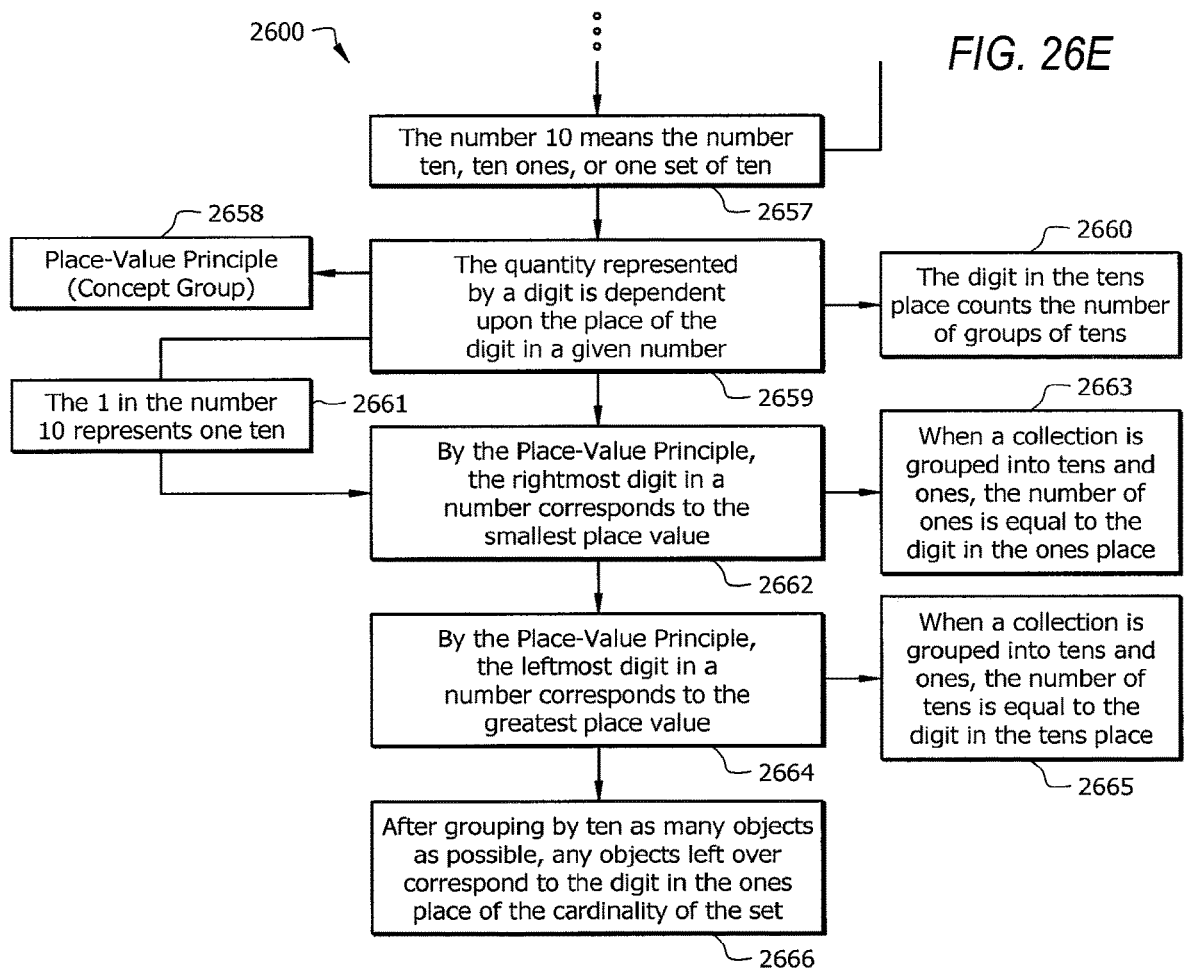

549. Zero represents the absence of quantity. (http://en.wikipedia.org/wiki/O_(number)) Automatic Construction of the Node-Arc Incidence Matrix Automatic Construction of the Node-Arc Incidence Matrix Phase 5. In Phase 5, analysts array concept line items into a directed graph organized by prerequisites and dependencies. Please see FIGS. 26A through 26E for an example of a directed graph 2600 that orders a subset of the concept line items (e.g. items 2601, 2602, 2604, etc.) listed above and a subset of concept groups (e.g. items 2603, 2609, 2610, etc.) by prerequisites and dependencies. For example, FIG. 26C shows CLI 2630 ("A counting number can be both the order of an object in an enumeration of a set (ordinality), and the size of the set (cardinality)" is a prerequisite of CLI 2632 ("Circling ten counted objects identifies them and sets them aside as one counted set of ten objects") because arrow 2667 is directed away from CLI 2630 and towards CLI 2632. Thusly, because arrow 2667 is directed towards CLI 2632, CLI 2632 is, in this example directed graph for prerequisites and dependencies, a dependency of CLI 2630. This same operation may also be accomplished by other methods such as one-to-one comparisons between pairs of CLIs, and direction construction of a node-arc incidence matrix.

Given a directed graph or a one-to-one comparison of pairs of CLIs, mathematics analysts direct the Ontology Editor System to automatically construct from the directed graph a node-arc incidence matrix populated with numeric data to describe the interrelationships of the CLIs. For a directed graph that depicts relationships of prerequisite and dependency among the CLI nodes, the Ontology Editor System enters a one at the intersection of any two concept line items that can be linked in the directed graph. For example, if one node in the directed graph points to another node, the first node can be the prerequisite node and the second node can be the dependency node. To continue the example, in the intersection between the same two nodes, a one appears in the cell in the row for the prerequisite node at the intersection of the column for the dependency node. In this example, if there is no link (also referred to as an arc or edge) between two nodes in the directed graph, the software and computer processor automatically enter a zero in the intersection between that row and column.

Please see FIG. 18 for an example of a node-arc incidence matrix 1800 that was derived from a subset of the directed graph 2600 exhibited in FIGS. 26A to 26E. Node-Arc Incidence Matrix 1800 of FIG. 18 shows a group of prerequisites as rows and a group of dependencies as columns, and the directional relationship (e.g. prerequisite/dependency relationship) of nodes (e.g. CLIs and/or Group Concepts) that are assigned numbers. In Node-Arc Incidence Matrix 1800, nodes are assigned a numbers (e.g. 1 through n), which make up rows of the matrix, and nodes are assigned numbers (e.g. 1 through n), which make up columns of the matrix. An example of the assigned numbering is shown below (see numbers 1-25 in the paragraph below). In the example below, CLI 2630 corresponds to the below assigned number 2 ("A counting number can be both the order of an object in an enumeration of a set (ordinality), and the size of the set (cardinality)" 2630 of FIG. 26C) and CLI 2632 corresponds to the below assigned number 12 ("Circling ten counted objects identifies them and sets them aside as one counted set of ten objects" 2632 of FIG. 26C"). At intersection 1801 of prerequisites row 2 and dependencies column 12, the numeral 1 is shown, indicating that in this example configuration there is a prerequisite/dependency relationship between CLI 2630 and CLI 2632. Conversely, at intersection 1802 of prerequisite row 1 ("A collection of objects of differing [distinguishing attribute class] can be sorted by [distinguishing attribute class]" item 2608 of FIG. 26A) and dependency column 25 ("Equals Sign" item 2648 of FIG. 26D), the numeral 0 is shown, thereby indicting that there is no prerequisite/dependency relationship between the nodes (e.g. CLIs and/or Concept Groups) assigned to prerequisite 1 and dependency 25. As discussed, the labels at the side and top of the node-arc incidence matrix refer to the list of concept line items listed in alphabetical order below (a list of the labels appears below and may be directly compared to the numbers at the top and side of the node-arc incidence matrix in FIG. 18). Note that some of the concept line items below can be a refined subset (per Phase 6 of the extraction process described above) of the example collection of 549 CLIs.

1. A collection of objects of differing [distinguishing attribute class] can be sorted by [distinguishing attribute class]. 2608 of FIG. 26A
2. A counting number can be both the order of an object in an enumeration of a set (ordinality), and the size of the set (cardinality). 2630 of FIG. 26C
3. A digit is a symbol used to write numbers. 2642 of FIG. 26D
4. A group of units can itself be considered to be a unit. 2611 of FIG. 26A

Figure 11:
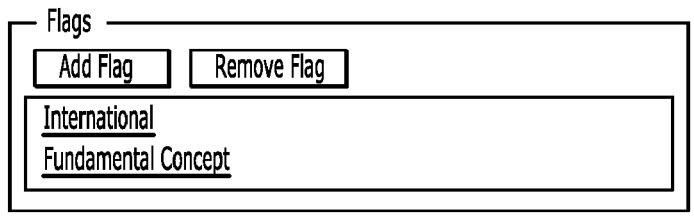
FIG. 11 is an exemplary screen shot of a flag component of the Ontology Editor System's graphic user interface.
Figure 12:
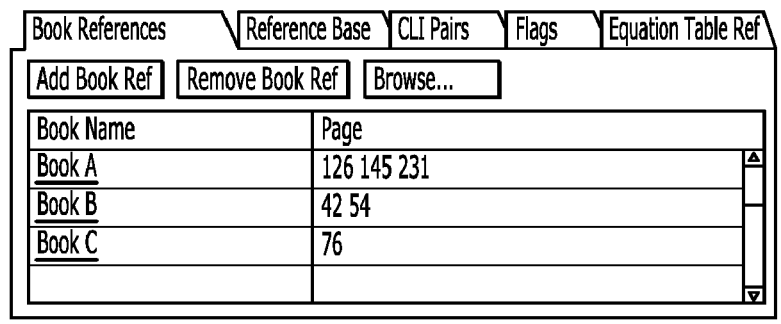
FIG. 12 is an exemplary screen shot of a book references component of the Ontology Editor System's graphic user interface.
Figure 17:
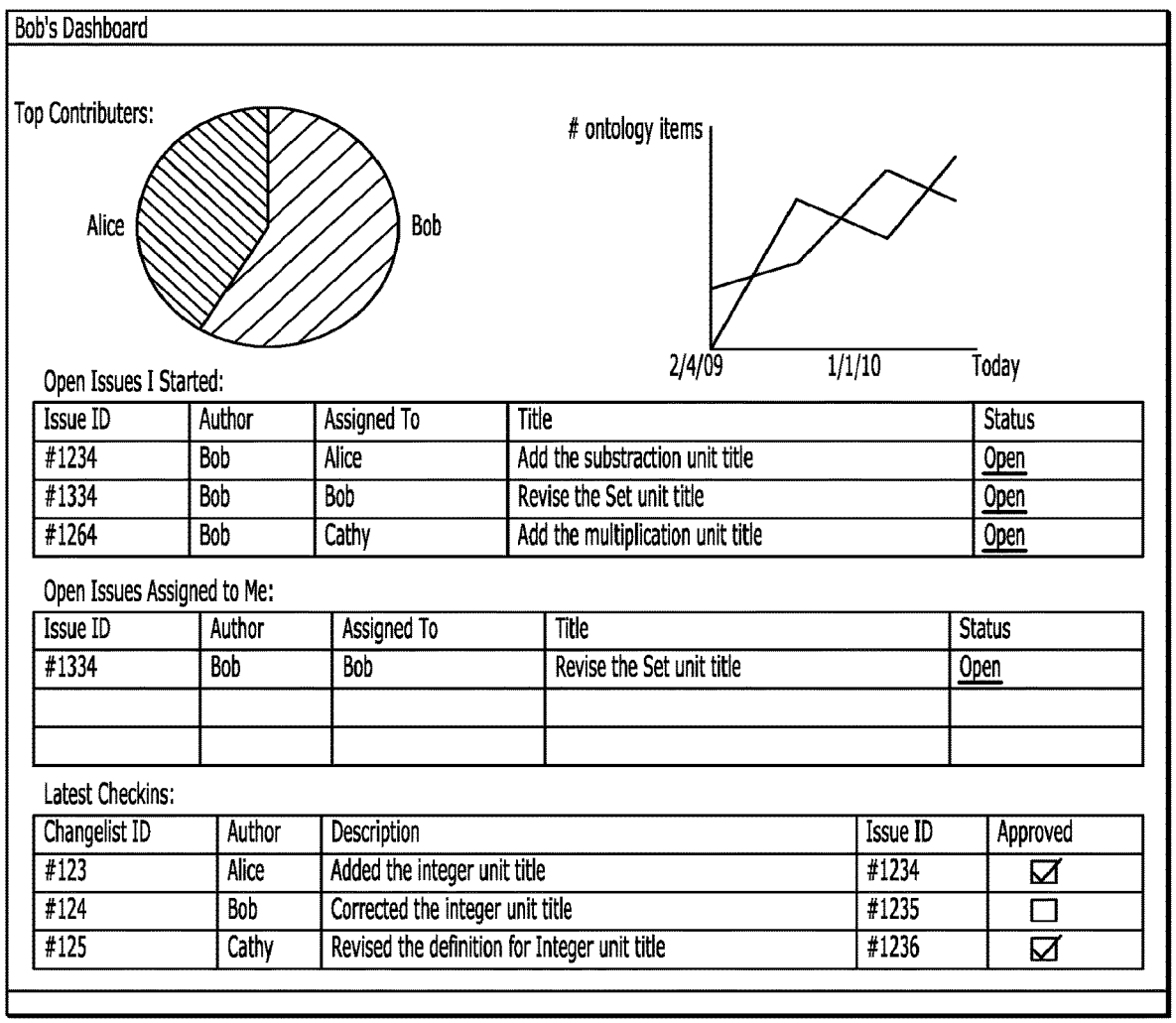
FIG. 17 is an exemplary screen shot of a dashboard window of the Ontology Editor System's graphic user interface.

5. A set is a collection of objects, also called elements or members. 2615 of FIG. 26B
6. A statement of equality is made with an equals sign. 2649 of FIG. 26D
7. A unit made up of other units is called a composed unit. 2612 of FIG. 26A
8. Grouping by ten as many objects as possible, objects left over correspond to the digit in the ones place of the cardinality of the set. 2666 of FIG. 26E
9. An ordinal number refers to the order of a specific object in a collection. 2625 of FIG. 26B
10. By the Place-Value Principle, the leftmost digit in a number corresponds to the greatest place value. 2664 of FIG. 26E
11. By the Place-Value Principle, the rightmost digit in a number corresponds to the smallest place value. 2662 of FIG. 26E
12. Circling ten counted objects identifies them and sets them aside as one counted set of ten objects. 2632 of FIG. 26C
13. Classifying a collection into counted and uncounted objects can be done by marking the objects as counted. 2620 of FIG. 26B
14. Combinatorial-Grouping Capacity 2615 of FIG. 26B
15. Composed Units 2610 of FIG. 26A
16. Counting 2619 of FIG. 26B
17. Counting from Five to Six 2624 of FIG. 26B
18. "Counting from one" suggests the count resets to one at the beginning of grouped sub-collections. 2623 of FIG. 26B
19. Counting from One versus Counting On 2627 of FIG. 26B
20. Counting objects in succession is how to apply the One-to-One Principle. 2621 of FIG. 26B
21. Counting to ten proceeds in the order one, two, three, four, five, six, seven, eight, nine, ten. 2618 of FIG. 26B
22. Digits 2643 of FIG. 26I)
23. Distinguishing characteristics of an object are differences between the object and other objects in a collection or outside a collection. 2602 of FIG. 26A
24. Equal values can be joined together by an equation. 2641 of FIG. 26C
25. Equals Sign 2648 of FIG. 26D

Figure 29:
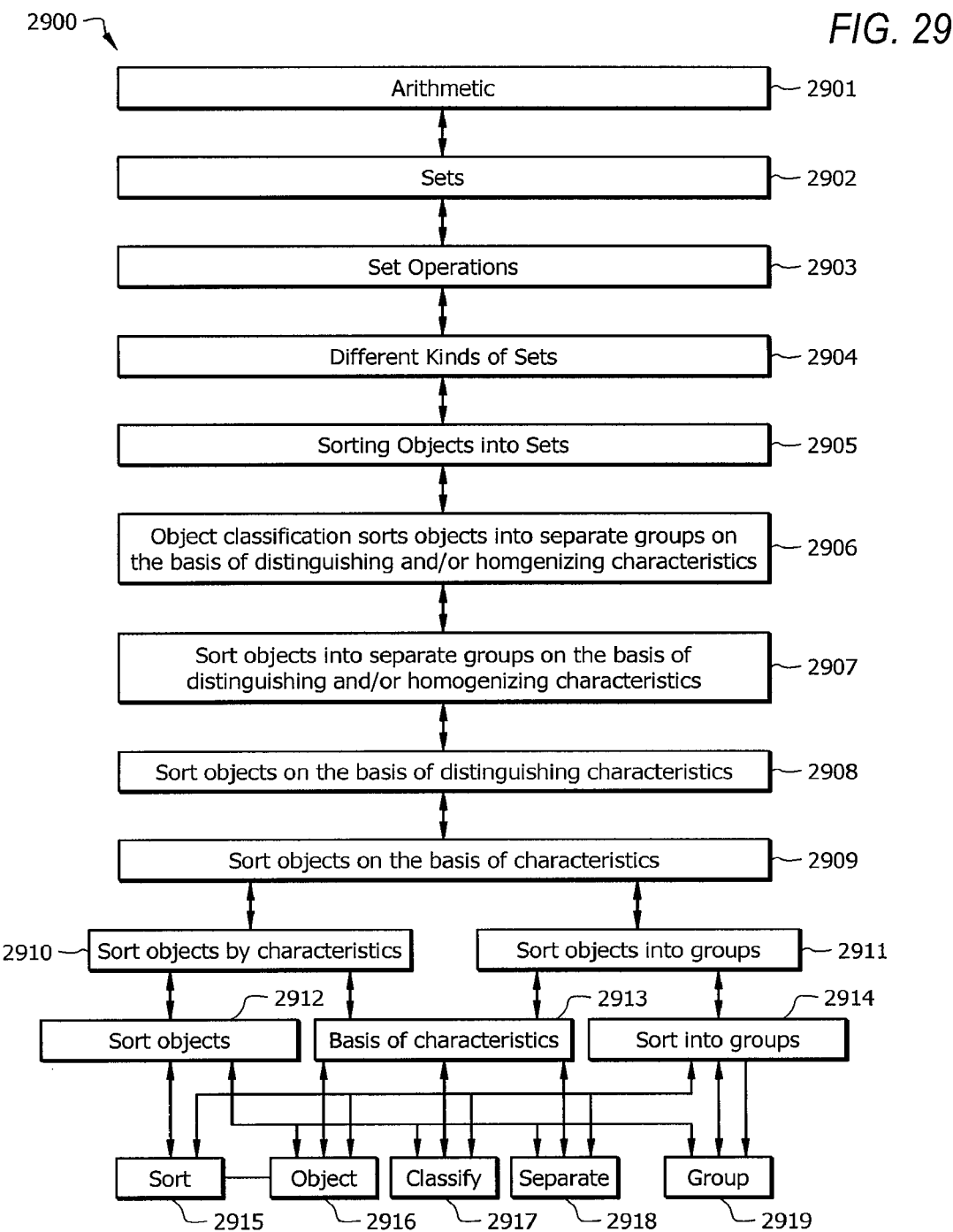
FIG. 29 is an exemplary undirected graph constructed on the basis of a concept line item extracted from a sample Kindergarten math problem and arranged into the hierarchy of the Ontology architecture.

With the Ontology Editor System, analysts can array concept line items of the Ontology of mathematics (and any section thereof) as nodes, and their interrelationships as edges, in, by way of non-limiting example, a directed graph (e.g., to represent relationships of prerequisite or dependency among concept line items that serve as nodes in the graph), and an undirected graph (e.g., to represent relationships among concept line items organized by the Ontology architecture presented in FIG. 25 (items 2501-2508); see also FIG. 29 (items 2901-2919) for an example of an undirected graph of a concept line item (e.g. item 2906 of FIG. 29 and item 2607 of FIG. 26A) in the context of the Ontology architecture; this graph can also be stored in a separate node-arc incidence matrix (similar to FIG. 18, by way of non-limiting example) to enable the Ontology Editor System to locate a concept line item within, for example, the context of a plurality of curricula and related publications, materials, and media for mathematics). The data set for such graphs can be stored in the Ontology Editor System's database in, by way of non-limiting example, a node-arc incidence matrix, an adjacency matrix, and an adjacency list data structure, including edge weights portrayed in a separate edge weight matrix and distance matrix. Data from the directed graph can be arrayed into a combination of a matrix and linked lists (including several linear, circular, and incidence adjacency lists drawn from the matrix) for special treatment by algorithms of the Ontology Editor System. The matrices can be a dynamic, multi-dimensional array data structure with a fixed-size array as a backend and backup and to allocate additional data to the reserved space.

A concurrent process and a concurrent system accompany the extraction process and fulfill supporting roles for the extraction process. Both can be repeatedly referenced at any time from any stage in the extraction process. Certain large and complex operations of mathematics can be extracted by specialized teams of mathematicians. These modules can be unique, can often be instantiated by other concepts of mathematics, and address more advanced topics of mathematics. Their development can therefore be the focus of projects performed by teams of math analysts. This process also applies to manualization 502 of calculator support. Exercise problems developed with dependency on calculator support for students to be able to perform them can be for the purposes of planned operations of the Research System returned to a manual process.

The concurrent system can include the Ontology Editor System databases 101 that house data for the various stages of development and preparation of the Ontology for the Research System. The databases support the extraction process and house the data. They can include an online research base, a database of previous extractions and existing CLIs, a database of established prerequisite and dependency relationships, a database of concept line items organized into the architecture of the Ontology, constructed root systems, modules, work to manualize calculator-dependent math problems, and data for managers to review the audit trails of concept line item development. The databases can be centrally located, remotely located and connected via a network (e.g. local area network, wide area network, cellular network, etc.) or any combination thereof. The Ontology Editor System processor interconnects the databases, recalculates and transforms the data and updates the databases.

Features of the Ontology Editor System

This section presents numerous user interfaces and features as nonlimiting examples that can be possible with the Ontology Editor System. The Ontology Editor System can be a system operable on a client-server desktop which executes an application used for Ontology development. A tree control displays the open Ontology or Ontology component. The Ontology Editor System allows an analyst-user to edit the Ontology by utilizing the computer processor and the system database and data manipulation capabilities to add and delete concept line items, re-order CLIs, create links between CLIs, map CLIs, and develop a network among those CLIs, among other operations.

FIG. 1 is a depiction of a tiered architecture 100 for the Ontology Editor System and Research System as connected to the Internet. An embodiment of the Ontology Editor System and Research System comprises OES database 101 and File Storage 102. User/Analyst 109 can use computer processor 110, which is connected to the Internet 113 via a connection point (e.g. modem 112), to access and/or edit data and information within OES database 101 and File Storage 102. The system may also comprise various servers (e.g. servers 103-107) and firewall 108, if desired.

1. Ontology Component Panel

Figure 7:
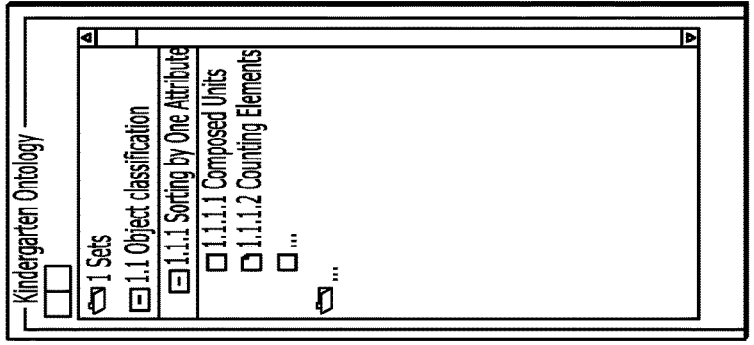
FIG. 7 is an exemplary Ontology tree panel component of the Ontology Editor System graphic user interface (FIG. 6 and other figures).
Figure 8:
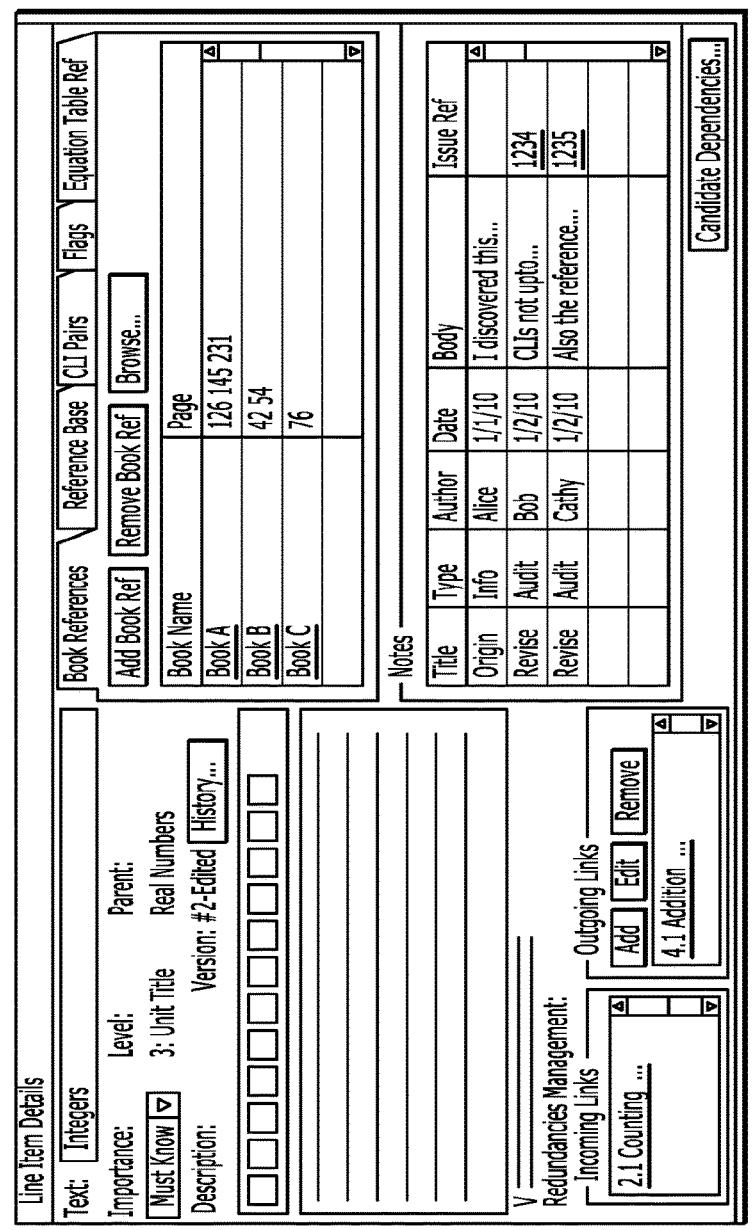
FIG. 8 is an exemplary screen shot the line item entry component of an extraction workspace of the Ontology Editor System (FIG. 6).

The Ontology Component Panel can be the primary interface of the Ontology Editor System while editing the Ontology or an Ontology component. Please see FIG. 6, FIG. 7, and FIG. 8 for examples of the main graphic user interface (or "GUI") of the Ontology Editor System; FIG. 7 and FIG. 8 can be components of the graphic user interface screen that depicted in FIG. 6. Several features can be made available through a toolbar and menu items, for example:

Search—A search box can be included in the toolbar. i. Ontology Search for terms in any part of the Ontology, including, but not limited to Ontology concept line item titles, book details (please see the book details GUI component in FIG. 13), notes, references (please see FIG. 12), and flags. Flags (please see FIG. 11) can be analyst configurable and available as drop down options in the search panel. ii. Web Search for an entered term on the web by launching a search engine in the system default browser.

Workspace A workspace can be based on a particular Ontology component at a particular version. It also includes any local edits to the Ontology component and information about the state of the user interface, such as which line item can be selected.

Workspace Backup A user may backup his workspace. With Workspace Backup selected, the local edits the user has in his workspace can be uploaded to the server and stored in the database. Workspaces can also be stored locally.

Share A user may share his workspace with another user. The recipient may open the received workspace in the same window, replacing his current context, or in a new window so that he can drag and drop line items from the shared workspace into their own workspace.

Open Workspace The user can be prompted with a list of named local workspaces, including the default workspace. The user selects a workspace, and can be prompted to choose whether to open the workspace in the same window or in a new window. Opening in the same window changes the context of the application to the selected workspace. Opening in a new window allows the user to drag and drop line items from one workspace into another in order to merge them manually. The user may save a new workspace at any time from their currently open workspace (like a "Save As" . . . operation).

Equation Table The Equation Table (please see FIG. 16) item opens a list of equations and word or other types of problems associated with the Ontology component. With a particular equation or math problem selected in the upper table, a template for listing information to solve the given equation or problem can be shown in the lower portion of the panel. Equation Tables can be associated with an Ontology component and may be linked to Ontology concept line items. If an existing concept line item is dragged to create a new Ontology concept line item, the existing concept line item remains extant. An icon appears indicating that it was used to create an Ontology line item.

Promote highlighted text to a new Ontology concept line item The new concept line item can be linked to the item where the text came from, such as a note.

Check Out The Check Out operation retrieves a fresh copy of a selected Ontology component from the server. A new workspace can be created for working on the Ontology component. Anyone may check out and edit an Ontology component locally; the owner of the Ontology component may commit their changes.

Update The update operation fetches the most recent version of the open Ontology component from the server. If the user has local edits, they can be warned that they may be lost if they continue with the update.

Commit The commit operation transfers a user's local changes to the server, overwriting whatever may be in the database with the user's changes. i The Ontology revision number can be incremented with successive commits. ii MSCICs can be re-computed automatically on Commit. If local edits can be made, such as changing the hierarchy of concept line items, the affected concept line items can have invalidated MSCICs which can show as blank until committed. This ensures that users on the same revision number may refer to concept line items by their MSCIC number and be assured that if the number matches it can be the same concept line item.

2. Ontology Component History Panel

Figure 9:
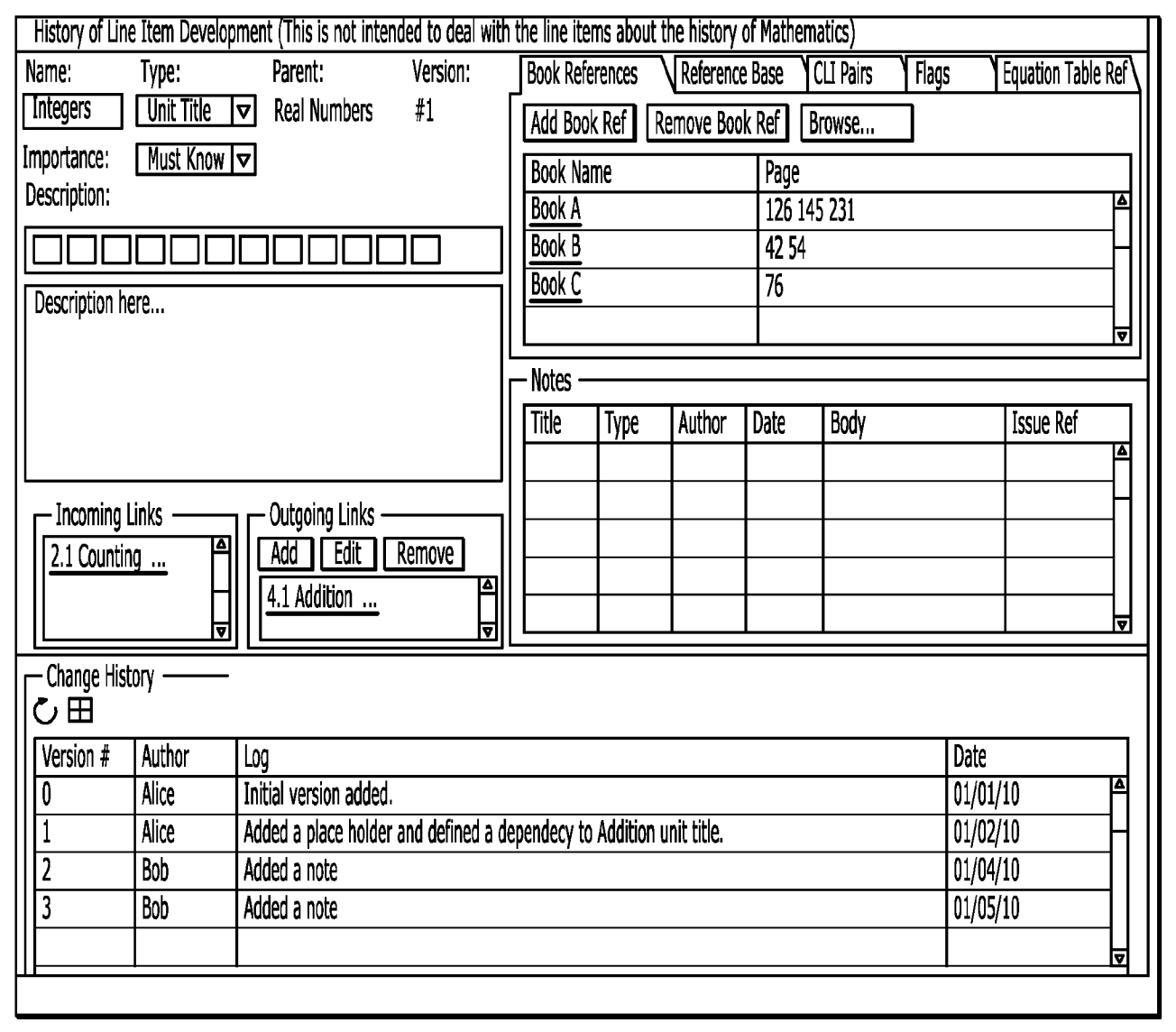
Figure 10:
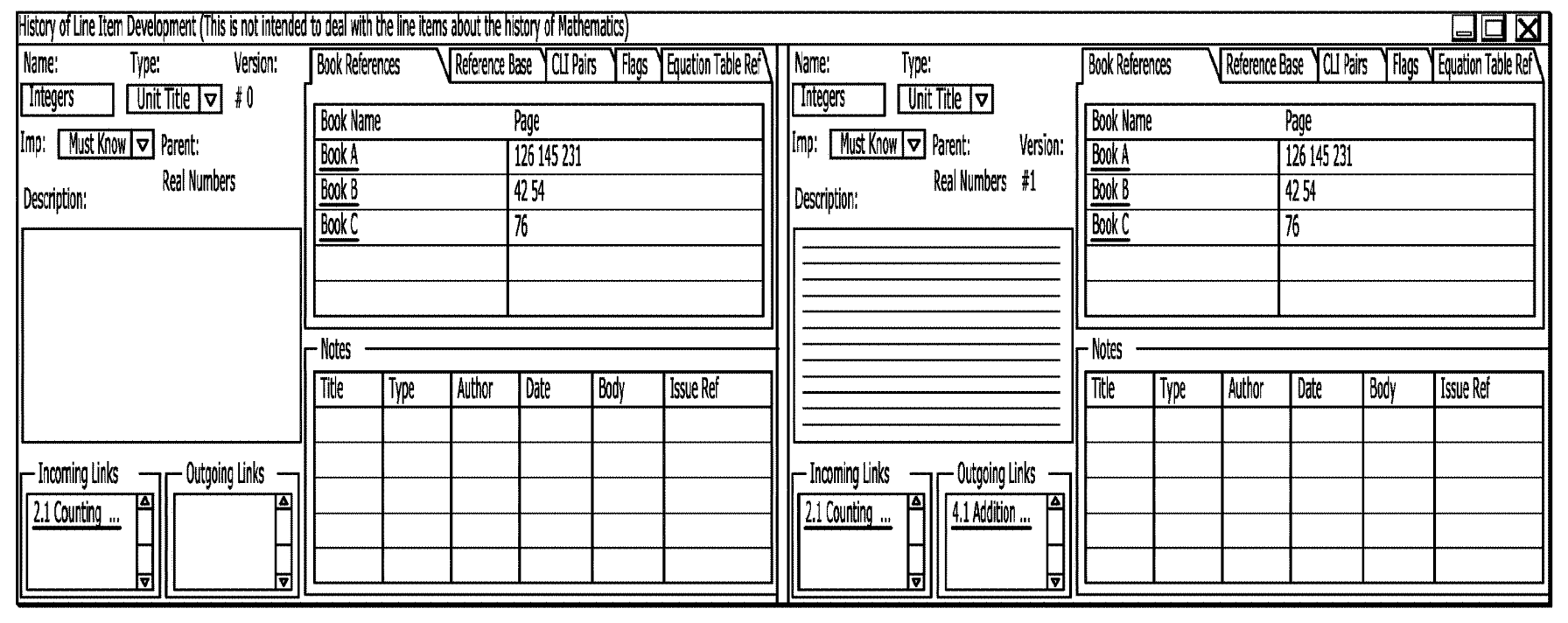

Two history panels appear in the figures collection (FIG. 9 and FIG. 10). The first shows a list of revision numbers, authors, and date stamps. The second depicts a side-by-side comparison between the histories of two concept line items.

3. Ontology Tree Panel

The Ontology Tree Panel (FIG. 7) displays the Ontology tree and supports the actions below with buttons on the toolbar. Actions that apply to a single concept line item can be available via a context sensitive (right click) menu.

Add an Ontology concept line item. A new Ontology concept line item can be added as a child of the selected concept line item.

Delete an Ontology concept line item. The selected Ontology concept line item can be deleted. In the database it can be marked as deleted and can be made to no longer appear in the Ontology tree, unless the user specifically chooses to show deleted concept line items. In that case deleted concept line items can be shown in gray.

Change the hierarchy of an Ontology concept line item. The user may drag and drop a concept line item to change its parent. Concept line items may be moved separately or in groups, whether or not the concept line items can be contiguous. Selected concept line items may also be moved up and down within siblings.

Undo and Redo. Editing actions may be undone and redone. The undo history does not have a limited size.

Bookmark Concept line items. The user may bookmark any number of concept line items and give the bookmarks names. This allows a user to quickly jump to a marked concept line item, wherever it may have been moved in the hierarchy.

Select one or more concept line items and create a note. A user may select one or more concept line items in the Ontology tree and create a note that can be associated with selected concept line items.

Select one or more concept line items and begin a discussion. A user may begin a discussion about the selected concept line items. A JIRA case can be created that sends notification to the recipients of the discussion. The case contains links back to the specific, selected concept line items. (JIRA is a commercially available issue tracking software package.)

4. Concept Line Item Details Panel

Selecting a concept line item in the Ontology tree causes the details for that concept line item, to be displayed in the Concept Line Item Details Panel.

This panel allows the user at least to:

Change the name of the concept line item,

View the level of the concept line item,

Change the description of the concept line item,

View links from other concept line items,

Mark the concept line item as important-to-know or nice-to-know or some other classification, Add or edit the notes for the concept line item, Add or remove Flags for the concept line item, (Flags include learning and teaching tools), Add or remove Book References for the concept line item, See the current version of the concept line item, View past versions of the concept line item, View the parent concept line item of the selected concept line item, Generate Candidate Dependencies for the concept line item, View a list of JIRA issues that reference the concept line item, 5. Concept Line Item History Panel This panel allows the user at least to:

Display a list of previous versions of a concept line item, and

Show details of the selected version

6. Concept Line Item History Comparison Panel

From the Concept Line Item History Panel the user may select any two previous versions to compare. Comparing them brings up the Concept line item History Comparison Panel. Both versions of the concept line item can be displayed side by side, with the differences highlighted.

7. Notes Panel

Filter by tag, type, author, or date

8. Note Details Panel

Specify type. Note types include, but are not be limited to, y-intersections, speed bumps, potholes, gaps, and chasms. Problem examples can also be entered as notes of type Problem Example.

Specify tags—Tags can be word tags, such as found in Amazon.com or Wikipedia. A note may be tagged with any number of tags. New tags may also be created on the fly for note tagging.

Other note references. Notes may refer to other notes.

IRA case references. Notification to other team members can be done through a JIRA case. Note contains links to SERA notification cases for the note.

9. Flags Panel

The Flags Panel shows a list of flags that mark the selected element. The user may add or remove flags for the concept line item. Selecting a flag brings up details about the flag itself, such as notes to explain why the element has been marked with a flag, and a list of any relevant references. The user selects the name and color of the new flag he adds.

10. Flag Details Panel

Notes. A flag has a list of notes about the flag.

Book References. A flag may have a list of book references pertaining to the flag.

11. Book References Panel

The Book References Panel shows a list of books and a list of page references within that book. These can be book references for the selected concept line item. If more than one concept line item can be selected, the book references in common among the selected concept line items can be shown. The user may add and remove book references for the selected concept line item. The books can be shown as links. Selecting a link can bring up the Book Details Panel.

12. Book Details Panel

The Book Details Panel displays information about a book, including: Title, Authors, ISBN, Publisher, City and State of the Publisher, Number of Pages, Copyright Date, Whether it is a textbook or supplementary information.

13. Candidate Dependencies Panel

Figure 19:
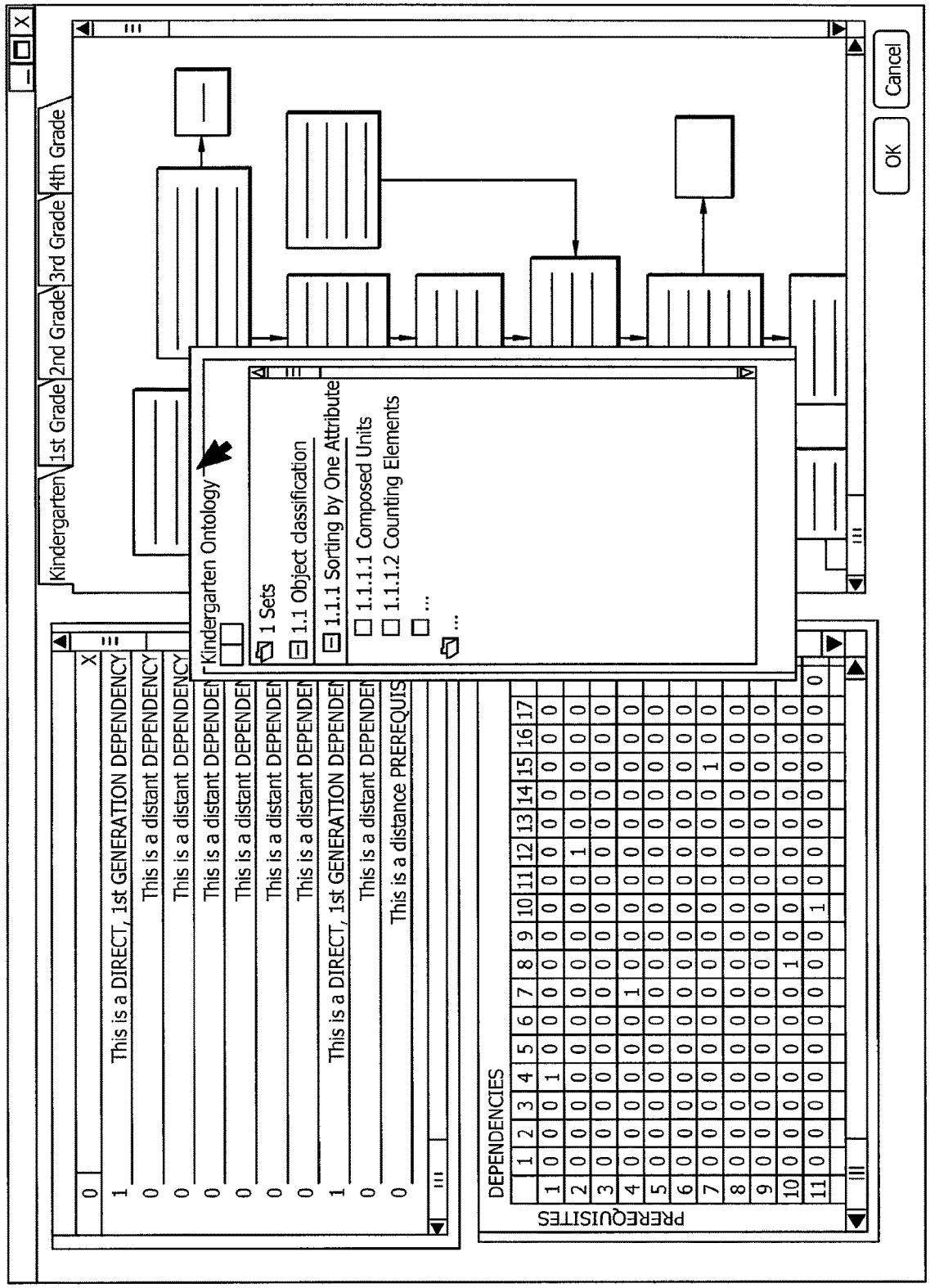
FIG. 19 is an exemplary screen shot of a composite window of a directed graph and node-arc incidence matrix with a floating Ontology tree window (on top) from the Ontology Editor System's graphic user interface.
Figure 20:
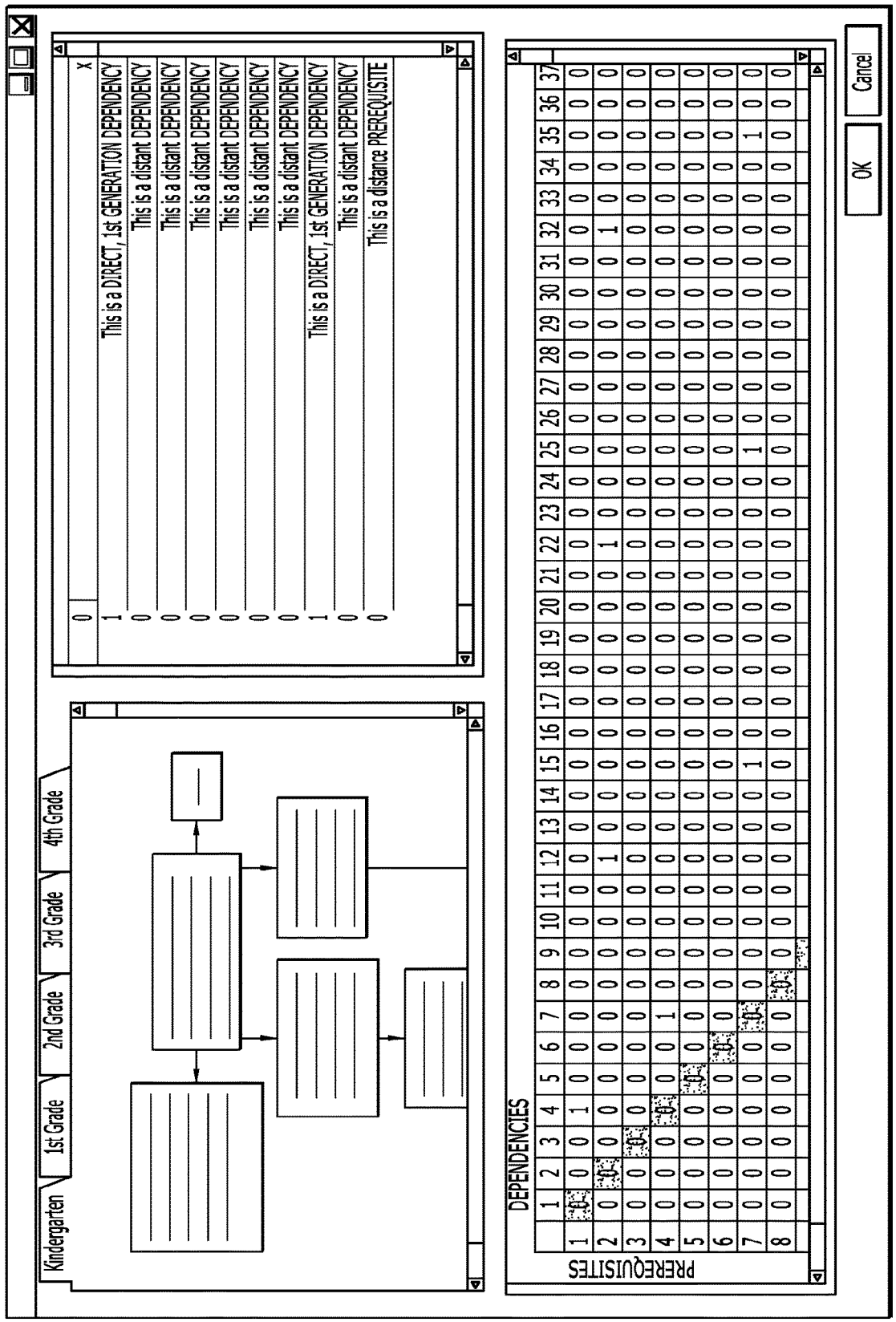
FIG. 20 is an exemplary screen shot of a composite window of a directed graph and node-arc incidence matrix with a line item panel from the Ontology Editor System's graphic user interface.

The Candidate Dependencies Panel (FIG. 14) can interface with the node-arc incidence matrix and the directed graph panels of the graph construction and matrix generation panels (FIGS. 19 and 20). It enables analysts to tag concept line items and adjust their order in a sequence of prerequisites and dependencies. Those changes can flow through to graphic and matrix representations.

Checklist of words or phrases

Words and phrases can be marked as important-to-know or nice-to-know or some other classification.

The user may sort by the sequence number or by the important-to-know and nice-to-know column 14. Parking Lot Panel The Parking Lot Panel (FIG. 15) acts as a clipboard where the user may temporarily "park" concept line items and sub-trees from the Ontology Tree Panel. The user may add any number of tabs to the tabbed deck. Tabs contain trees in the same form as the Ontology tree. The user may drag and drop concept line items or sub-trees back and forth between the Ontology tree and a parking lot tree. The parking lot can be a private, temporary holding area. It may not be included if a user shares his workspace.

The Parking Lot Panel may be docked or undocked. It may also be shown or hidden while docked.

15. Equation Table Panel

The Equation Table item (FIG. 16) opens a list of equations and other math problems associated with an Ontology component. If a particular equation or problem can be selected in the upper table, a template for listing important information to solve the given equation or problem can be shown in the lower portion of the panel. Equation Tables can be associated with an Ontology component and may be linked to from Ontology concept line items. Concept line items in the Distillations section may be double clicked to pop up concept line item details. This pop-up can be very similar to the Concept Line Item Details Panel in the main application frame. It allows a user to enter notes, bibliographic information, etc. about a concept line item in the Distillations section. If one of these concept line items can be dragged onto the Ontology Tree to create a new concept line item, the associated notes, etc. comes along with it.

16. Ontology Data

A central database 101 acts as a repository for the Ontology and its entire history.

Starting the Ontology Editor System for the first time, the user logs in, and selects an Ontology Component so that the Ontology tree for that component can be retrieved from the database. The user may work offline and commit his changes later.

A batch process can populate the database initially from concepts in Excel files.

17. Dashboard

The Ontology Editor System's dashboard (FIG. 17) can reflects the status of an extraction project and provide information that can help managers to adjust extraction operations to improve production.

Customized by users

Data pulled from JIRA

Feed for check-in messages

18. Administration Console

Create Users

Create Groups

Assign Users to Groups

Assign Groups to Ontology Components

Tag Ontology for release

Create Public and Private checklists

19. Node-Arc Incidence Matrix Panel

The Node-Arc Incidence Panel (see FIG. 20, and FIG. 2 and FIG. 18 for closer images of the data details of the parent matrix) can present the 1s and 0s that describe the relationships of prerequisite and dependency among concept line items.

Click a "Make Changes Here" button to make direct entry

Direct entries flow through to the Tree Panel (see FIG. 7 and FIG. 19), the Directed Graph Panel, and the CLI Comparisons Panel Changes to the tree panel, the Direct CLI Comparisons Panel, or the directed graph panel can be reflected in the Node-Arc Incidence panel 20. Directed Graph Panel The Directed Graph Panel (a component of FIG. 19 and FIG. 20; the detail of a directed graph appears in 26A through 26E) can be one method to construct a node-arc incidence matrix. Changes made to the Directed Graph Panel (if the user clicks the Make Changes Here button) can flow through to the Tree Panel, the Direct CLI Comparisons Panel, and the Node-Arc Incidence Panel.

Click a "Make Changes Here" button to make direct entry

Direct entries flow through to the Tree Panel, the CLI Comparisons Panel, and the Node-Arc Incidence Panel.

Changes to the Tree Panel, the Direct CLI Comparisons Panel, or the Node-Arc Incidence Panel can be reflected in the Directed Graph Panel.

21. Direct CLI Comparison Panel

The Direct CLI Comparison Panel (a component of FIG. 19 and FIG. 20) can be another method to construct the Node-Arc Incidence Matrix. Changes made to the CLI Comparison Panel (if the user clicks the Make Changes Here button) can flow through to the Tree Panel, the Directed Graph Panel, and the Node-Arc Incidence Panel.

Click a "Make Changes Here" button to make direct entry

Direct entries flow through to the Tree Panel, the Directed Graph Panel, and the Node-Arc Incidence Panel.

Changes to the Tree Panel, the Directed Graph Panel, or the Node-Arc Incidence Panel can be reflected in the Directed Graph Panel.

22. Documentation

Help

Guidelines document

23. High Level Design

Figure 21:
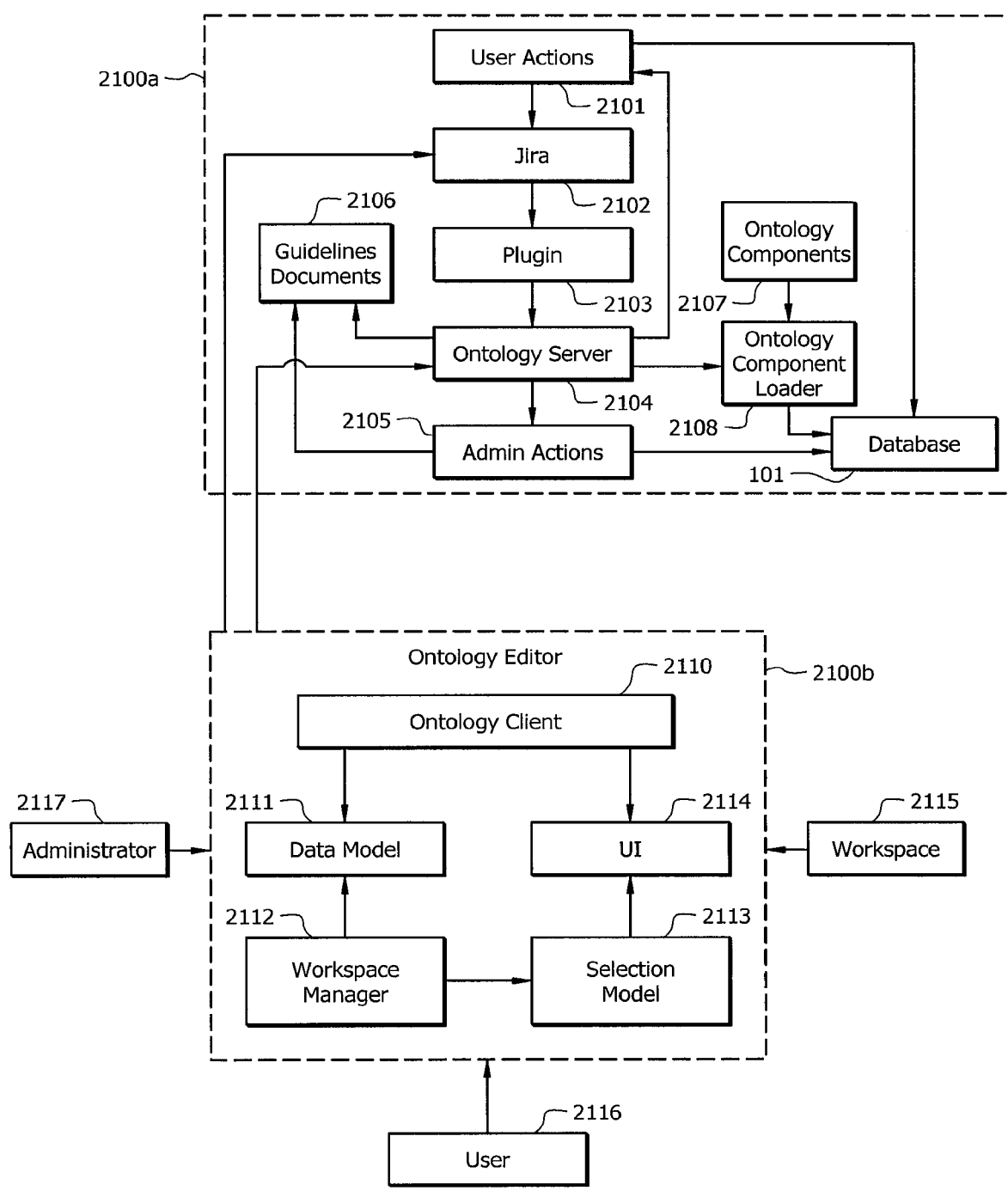
FIG. 21 is a high level design of the Ontology Editor System.

FIG. 21 reflects a high level design of the Ontology Editor System 2100b (in the box described by the dotted line) and its support of user interactions 2100a with the Ontology data. As can be seen, the Ontology Editor System 2100b may comprise an Ontology Client 2110, a Data Model 2111, a Workspace Manager 2112, a Selection Model 2113, and a UI 2114. User 2116, Administer 2117, and Workspace 2115 have access to the Ontology Editor System 2100b. 2100a shows a way that the Ontology Editor System 2100b is supported by user interactions and involves User Actions 2101, JIRA 2102, Plugin 2103, Ontology Server 2104, Admin Actions 2105, Guidelines Documents 2106, Ontology Components 2107, Ontology Component Loader 2108, and at least one Database 2109.

24. Partial Database Schema

Figure 22:
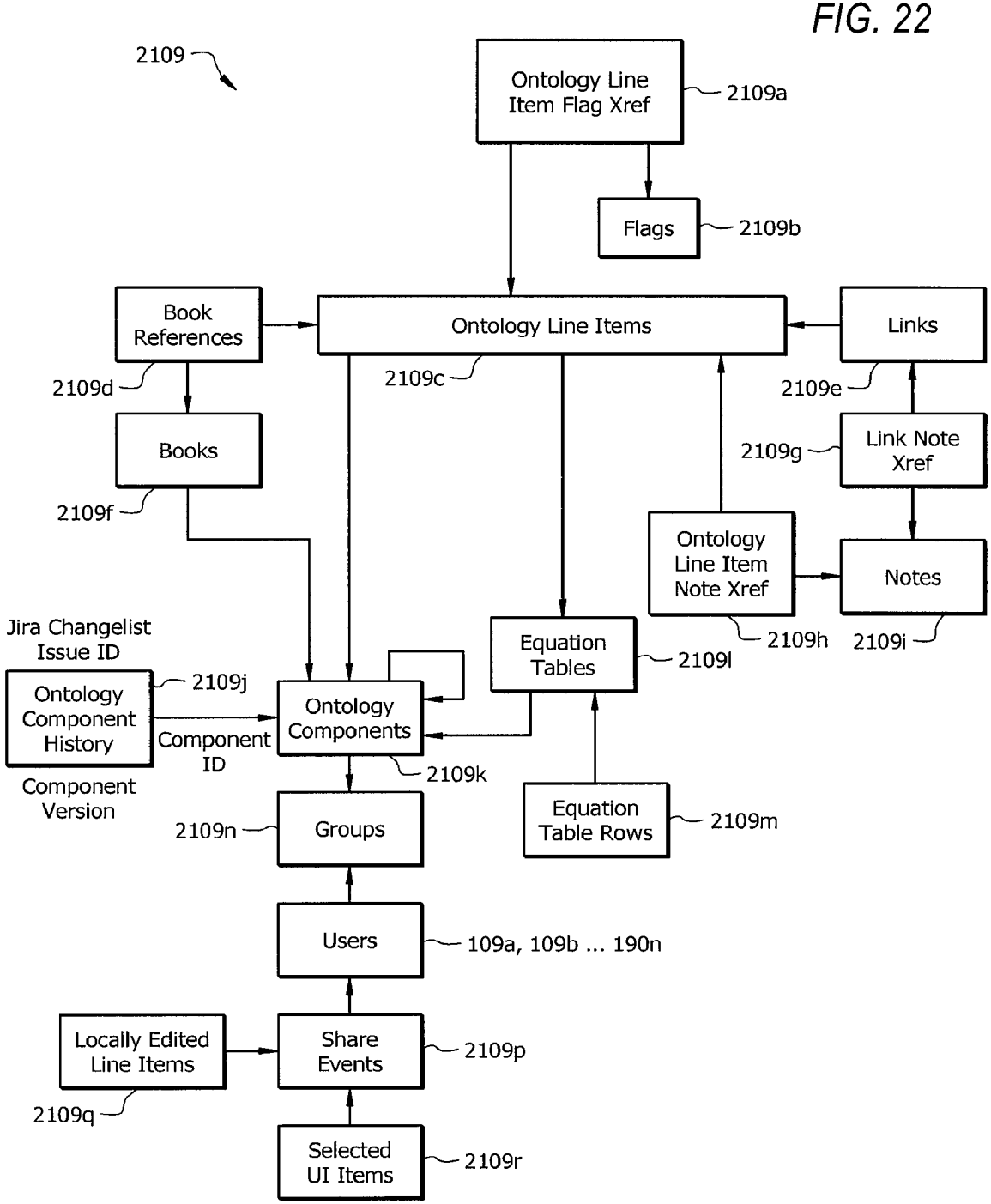
FIG. 22 is a database schema for the Ontology Editor System.

FIG. 22 can be a partial schematic of the database 2109 that stores and manages the data of the Ontology Editor System. At least one database 2109 is shown as managing and storing at least the following items: Ontology Line Item Flag Xref 2109a, Flags 2109b, Ontology Line Items 2109c, Book References 2109d, Books 2109f, Links 2109e, Link Note Xref 2109g, Notes 2109i, Ontology Line Item Note Xref 2109h, Equation Tables 2109l, Equation Table Rows 2109m, Ontology Components 2109k, Ontology Component History 2109j, Groups 2109n, Users (109a, 109b . . . 109n), Share Events 2109p, Locally Edited Line items 2109q, Share Events 2109p, Select UI Items 2109r.

25. Assembly Workflow

Figure 23:
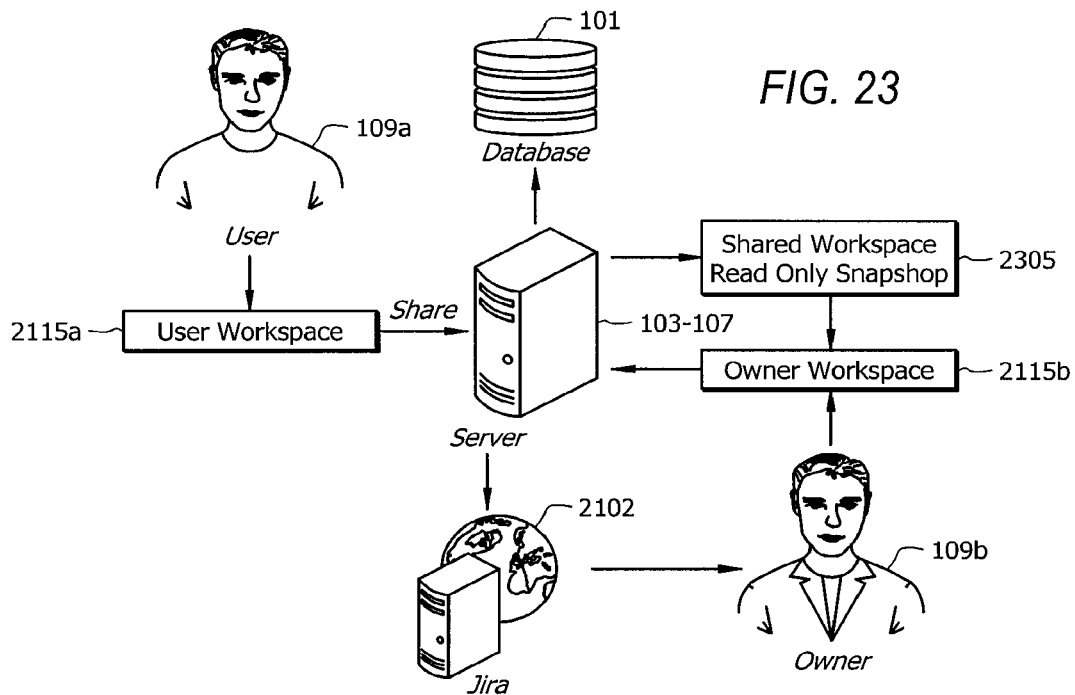
FIG. 23 is the assembly workflow for development of the Ontology.

As shown in FIG. 23, for a given Ontology component, one user at a time can be allowed to commit modifications. This user can be the Owner 109b of the Ontology component as specified in the Administration Console. Other users 109a may still check out the Ontology component (e.g. using the User Workspace 2115a) and make local changes. They pass their changes to the owner by sharing their workspace with the owner via a Shared Workspace Read Only Snapshot 2305. The owner receives notification via a JIRA case 2102 and/or a server (e.g. any of servers 103-107) about the share. The owner may open the other user's workspace in a new window and drag and drop concept line items from the received workspace into his own workspace. Merging of work from multiple users can be done manually like this and uploaded to at least one Database 101.

26. Feedback Workflow

Figure 24:
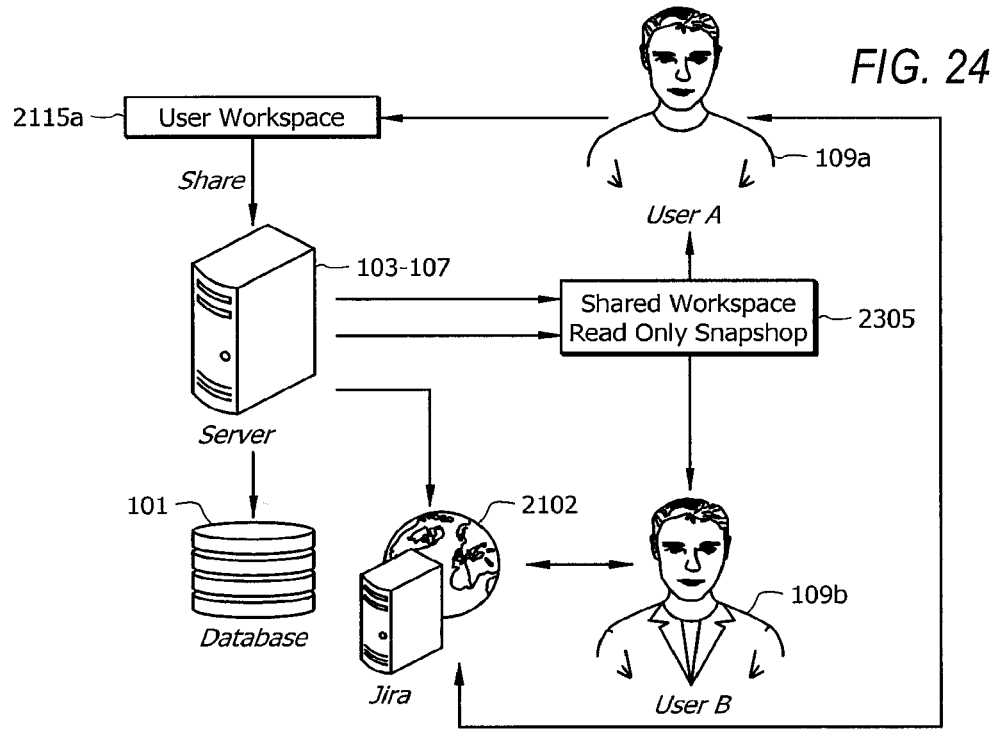
FIG. 24 is the feedback workflow for the Ontology Editor System.

As shown in FIG. 24, if a user (User A) 109a wants to get feedback about his work from another user (User B) 109b they can share their workspace (e.g. User Workspace 2115a and/or Shared Workspace Read Only snapshot 2305) and receive comments.

i. User A 109a has local edits he wants to get feedback about from User B 109b.

ii. User A 109a shares his workspace with User B 109b (e.g. Shared Workspace Read Only snapshot 2305). This causes User A's 109a local edits to be uploaded to the database 101 into share tables.

iii. A JIRA case 2102 can be generated and assigned to User B 109b. The case contains a reference to the workspace ID that was shared.

iv. User B 109b receives notification about the case. Upon reading the case, User B 109b can see what User A 109a may be asking User B 109b to comment on. User B 109b can click on a link in the case to open the shared workspace (e.g. Shared Workspace Read Only snapshot 2305).

v. In the shared workspace 2305, User B 109b may make comments about specific concept line items by right clicking the concept line item and selecting Send Comment. This can create a new JIRA case assigned to User A 109a with a link to the concept line item. User B 109b enters his comment and continues. In this way, new cases can be created for comments User B 109b makes. This allows the comments to turn into a discussion thread that can be passed back and forth or even to other users (e.g., users 109c, 109d, . . . 109n).

vi. User B 109b may also make general comments about the shared workspace 2305 that may not be about a specific concept line item.

vii. If User B 109b has no more comments to make, he marks the original JIRA case (from iii.) as implemented and assigns it back to User A 109a.

viii. User A 109a receives a case for the comments received from User B 109b. If User A 109a receives such a case he may click the link in the case to jump to the concept line item the comment may be about. He may do this either in his current workspace, which may have been edited since the comment was written, or he can open the same snapshot of his own workspace that he shared with User B 109b originally and view the concept line item as it existed. Both the current working workspace and the previous workspace snapshot may be open together. If the link to the concept line item can be clicked in the JIRA case, open workspaces can jump to that concept line item (if it exists in that workspace) so that they can be easily compared.

The Research System: The Ontology Applied

The Research System, run on computer software and incorporating a computer processor and extensive database storage and manipulation capabilities comprises three components, including:

- an online reference source and search engine designed to enable, for example, linguistic, metric, proximity, LaTex, natural language (on the basis of proximity and concept text-mining algorithms), Boolean, and other types of searches of concepts of mathematics and science that comprise the Ontology of math concepts and any data that may be appended to the database from automated online searches (explained below);
- an online search engine that, by the method of automated web crawler or web spider software searches for, tags with MSCICs, stores references to, and responds to user online queries about online content that incorporates concepts of mathematics and their applications (e.g., applications of mathematics to the sciences) (the "Ontology Search Engine"); and
- a downloadable software product that performs similar search-and-tagging operations on content in electronic documents stored offline, as well as content in private databases, with concepts of mathematics from the Ontology (e.g., with MSCICs) (the "Ontology Bot").

The Research System deploys the Ontology and its Math & Science Concept Identification Coded concept line items as a large database of knowledge tags and applies query, automated search engine, and bot capabilities to render the Ontology operational and interactive for online and offline users. The three components (listed above) apply the Ontology in its various configurations (e.g., and without limitation by way of example, directed and undirected graphs, prerequisites and dependencies, the Ontology architecture, node-arc incidence matrices, adjacency matrices, inverted indices, adjacency list data structures including edge weights portrayed in a separate edge weight matrices and distance matrices, linked lists, etc.) to enable users to, by way of non-limiting example, identify granular concepts of mathematics, their logical progressions, and supporting content on the Internet and in their own databases and content, and apply them to their own purposes (e.g., lesson plans, studies, course curricula, standards assessment, etc.).

Online Reference Source. By way of non-limiting example, the types of queries of the Ontology database that the Research System can enable include keyword, noun phrase, verb phrase, concept, natural language, LaTex (because extracted CLIs can be paired with mathematical expressions of their concepts in LaTex), interrelationship by prerequisite/dependency, interrelationship by location within the Ontology architecture, Boolean, and proximity searches, and special tag searches such as important-to-know concepts, nice-to-know concepts, and concept range by topic, country, grade level, and math subject. These queries can be applications of the various data structures described in this application (e.g., the directed and undirected graphs, the node-arc incidence matrix, other matrices, and lists, etc.).

For online users, the applications can be varied. If, for example, a PSTT wants to know what might be missing from his conception of some math topic, the Research System can provide him with that information, arrayed in a graphic, tabular, or report format, and on the basis of a plurality of query types. A course administrator, professor, teacher, or tutor may also assess the quality of his course curriculum, lesson plan, or some unique application of mathematics by the online Research System.

Online Search Engine. The Research System can include a web crawler or spider to search the Internet for content that, for example, pertains to mathematics and application of mathematics. The crawler returns web pages to servers, which can be centrally located or dispersed throughout the world, where the Research System indexes and analyzes the information and, on the basis of the concept line items that comprise the Ontology, tags the information with MSCICs (data that does not match an MSCIC can be directed to analysts for review, research, and possible inclusion in the Ontology). As the web crawler returns data, cached pages can be stored with indexed information in a corpus. The dynamic, multi-dimensional array data structure and fixed-size array described above accommodates the new data and allocates it to reserved space. That way the database of the Research System can automatically adjust to store additional data.

The concept line items that comprise the Ontology can be ordered into an inverted index. Data captured by the web crawler and indexed by the Research System can be text-mined for matches with the Ontology. Matches, guided by the parameters of user queries, identify MSCICs, and the Research System returns the search results to the user. Given search results, users may also elect to locate identified CLIs in an overall directed or undirected graph. In such case, the Research System locates the MSCIC(s) in the central node-arc incidence matrices and returns a graph similar to the one depicted in FIGS. 37-1 through 37-5 where the subject CLIs and neighboring nodes and edges can be highlighted.

Returned results from searches with the Research System can include a list of CLIs with relevancy computed on the basis of a vector spaces, popularity on the basis of historical searches, and percentage match on the basis of proximity metrics and word frequencies.

Downloadable Ontology Bot. The downloadable Ontology bot performs on private content, and within intranets, the functions similar to the search engine described above. A user may download from the online Research System the downloadable Ontology bot software, and run it on a computer or network of computers to analyze content on computer hard drives or system databases, set up analyses on hard drives or servers, tag the content with MSCICs, and respond to queries about the content. A human-computer process supported by the Ontology Bot enables users to tag their multi-media content (e.g., video files, audio files, games, etc.) with MSCICs and thereby make them searchable by the public. Users can enter searches that describe their content and, on the basis of the returned concept line items and associated MSCICs, direct the Ontology Bot to associate their multi-media files with a text file that lists the MSCICs. Users can have the option of reporting their content, including multi-media content, tagged with MSCICs, sent back to the online Research System for assimilation into the system's databases and inclusion in future queries (if the content cannot be publicly accessed on the user's system(s), it can, by this method, become available as cached content on the servers of the Research System).

Users may also download the bot to perform similar search-and-tagging operations on online content and have it reported to Research System servers for assimilation into the system's databases and inclusion in future queries.

Figure 30:
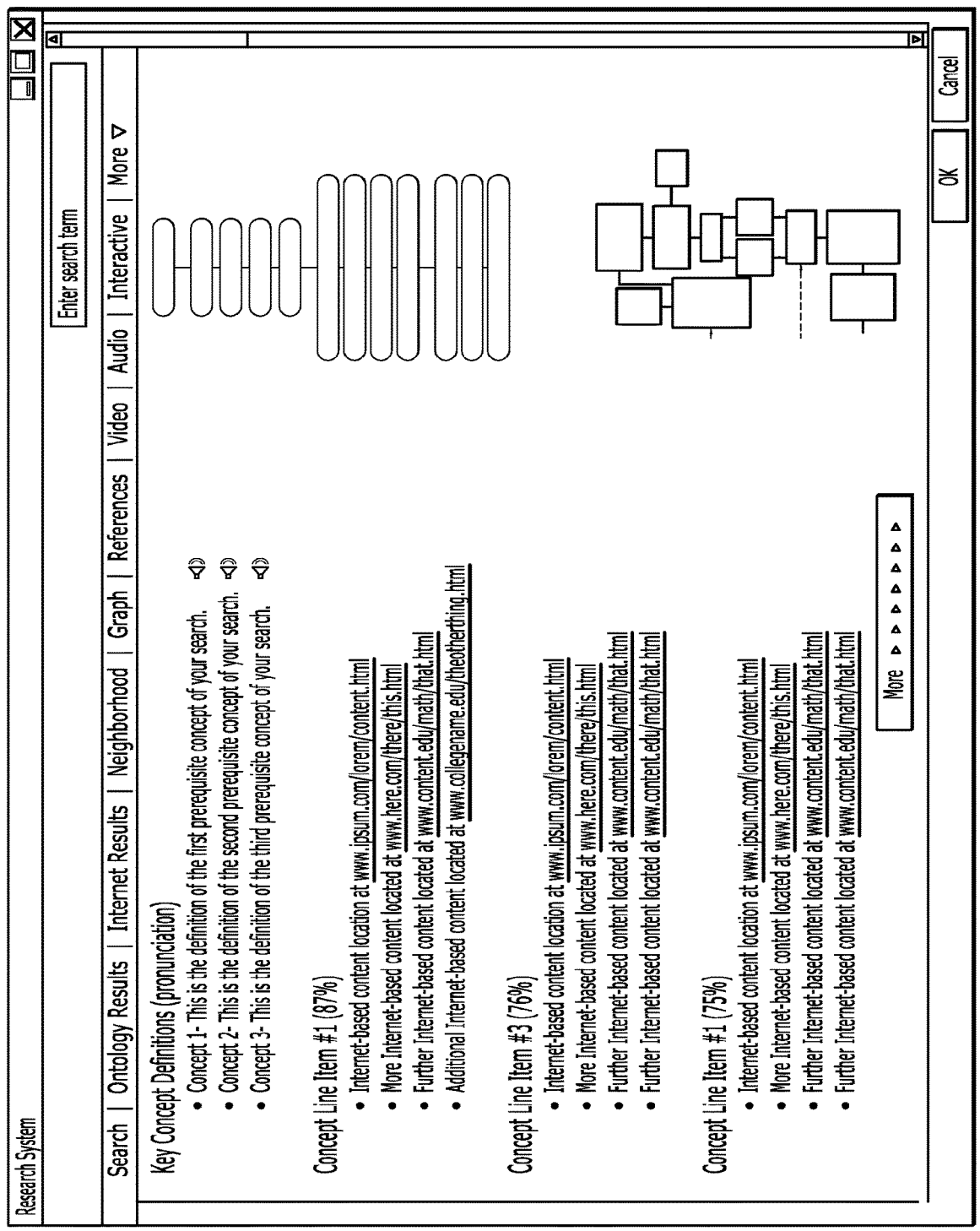
FIG. 30 is an exemplary screen shot of the graphic user interface for the Research System search engine.

FIG. 30 illustrates an example of the screen design for returned results of a search performed on the Research System. At the upper right-hand corner, the user enters, by way of non-limiting example, a natural language search term, a concept, or perhaps an expression in LaTex. Search results can begin with identification and definition of concepts with speaker icons for users to click to hear audio files that demonstrate pronunciation of the terms. Users may also hear the definitions read aloud. Below the definitions section of the results screen, the search results can appear from the Internet beginning with the search term entered by the user, and followed by concept line items that, in the database of the Ontology, can be in close proximity (e.g., by importance score, weight score, prerequisite or dependency relationship, level in the Ontology architecture, etc.) to the search term. Concept line items can be followed by titles and URLs of content located on the Web that includes and pertains to the user's search term(s).

At the top of the search results page, a menu can appear with various options for users to browse. For example, options can include results from the Ontology, results from the internet, historical results had the search been performed some user-defined period of time prior to the current date (not shown), concepts in the neighborhood of the search term(s), graphic representations of the search results, references for the concepts (e.g., textbooks, other publications, supplementary materials for classrooms, manipulatives, etc.), video content about the search term(s), audio content about the search term(s), interactive content about the search term(s), and a dropdown list for more options. At the bottom of the page can be a link to more pages that contain the balance of the search results. To the right can be graphic representations of the concepts' locations within the Ontology architecture and a directed graph of prerequisites and dependencies of the concept(s).

We claim:

1. A method of extracting mathematical concepts from mathematical exercise representations, the method comprising the steps of:
   accessing at least one document including a plurality of mathematical exercise representations, wherein each mathematical exercise representation comprises one or more algorithmic, linguistic, geometric, and graphic mathematical exercise representations;
   extracting each mathematical exercise representation to identify one or more mathematical concepts;
   identifying a relationship between a first mathematical concept and a second mathematical concept to identify a plurality of concept groups;
   populate an optimization table to associate at least one of the mathematical concepts and concept groups with one or more of the plurality of mathematical exercise representations; and
   optimize the optimization table to remove redundancies.

2. The method of claim 1, further comprising the step of identifying mathematical meaning data to be extracted from each mathematical concept.

3. The method of claim 2, wherein the step of identifying a relationship comprises the step of identifying a relationship between a first mathematical concept or mathematical meaning data and a second mathematical concept or mathematical meaning data to identify a plurality of concept groups.

4. The method of claim 1, further comprising the step of graphically mapping concept groups.

5. The method of claim 4, further comprising the step of dividing the mapped concept groups.

6. The method of claim 4, further comprising the step of dividing the mapped concept groups by divisions of topics.

7. The method of claim 1, wherein the relationship between the first mathematical concept or mathematical meaning data and the second mathematical concept or mathematical meaning data includes an overlapping portion that connects the first mathematical concept or mathematical meaning data to the second mathematical concept or mathematical meaning data in a logical progression.

8. The method of claim 7, further comprising the step of creating an inverted index of phrases, each phrase identified as being within a measured proximity of a beginning or an end of one of a plurality of mathematical concepts or mathematical meaning data.

9. The method of claim 1, wherein the first mathematical concept is a disaggregation of the second mathematical concept.

10. A method of extracting mathematical concepts from mathematical exercise representations, the method comprising the steps of:
    accessing at least one document including a plurality of mathematical exercise representations, wherein each mathematical exercise representation comprises one or more algorithmic, linguistic, geometric, and graphic mathematical exercise representations;
    extracting each mathematical exercise representation to identify one or more mathematical concepts;
    identifying a relationship between a first mathematical concept and a second mathematical concept to identify a plurality of concept groups;
    parse concept groups into Concept Line Items (CLIs);
    identify a relationship between each CLI and the extracted mathematical concept;
    graphically array the CLIs to illustrate the relationships; and
    optimize the optimization table to remove redundancies.

11. The method of claim 10, further comprising the step of identifying any questions that could be raised about the extracted mathematical concept, wherein any questions are noted in the optimization table.

12. The method of claim 10, further comprising the step of identifying any application of the extracted mathematical concept, wherein any applications are noted in the optimization table.

13. The method of claim 10, further comprising the step of identifying any root systems of the extracted mathematical concept, wherein any root systems are noted in the optimization table.

14. The method of claim 10, further comprising the step of identifying any alternative solutions, wherein any alternative solutions are noted in the optimization table.

15. The method of claim 10, further comprising the step of identifying the relationship between each CLI and the extracted mathematical concept CLIs as an original concept, a derivative of original concept, or an application of original concept.

16. A method of extracting mathematical concepts from mathematical exercise representations, the method comprising the steps of:
    accessing at least one document including a plurality of mathematical exercise representations, wherein each mathematical exercise representation comprises one or more algorithmic, linguistic, geometric, and graphic mathematical exercise representations;
    extracting each mathematical exercise representation to identify one or more mathematical concepts;
    identifying a relationship between a first mathematical concept and a second mathematical concept to identify a plurality of concept groups;

populate an optimization table to associate at least one of the mathematical concepts and concept groups with one or more of the plurality of mathematical exercise representations;

identifying any questions that could be raised about the extracted mathematical concept, wherein any questions are noted in the optimization table;

identifying any application of the extracted mathematical concept, wherein any applications are noted in the optimization table;

identifying any root systems of the extracted mathematical concept, wherein any root systems are noted in the optimization table;

identifying any mathematical meaning data of the extracted mathematical concept, wherein any mathematical meaning data is noted in the optimization table;

identifying any concept groups of the extracted mathematical concept, wherein any concept groups are noted in the optimization table;

parse concept groups into Concept Line Items ("CLI's");

identify a relationship between each CLI and the extracted mathematical concept;

graphically array the CLIs to illustrate the relationships; and optimize the optimization table to remove redundancies.

* * * * *